(12) United States Patent  
Omata et al.

(10) Patent No.: US 10,557,707 B2  
(45) Date of Patent: Feb. 11, 2020

(54) ENCODER, DRIVING DEVICE, AND ROBOT APPARATUS

(71) Applicant: NIKON CORPORATION, Tokyo (JP)

(72) Inventors: Kenji Omata, Utsunomiya (JP); Takashi Nagase, Iruma (JP); Kou Ohno, Sendai (JP); Masami Kikyo, Tokyo (JP); Shintaro Hikichi, Sendai (JP)

(73) Assignee: NIKON CORPORATION, Tokyo (JP)

(*) Notice: Subject to any disclaimer, the term of this patent is extended or adjusted under 35 U.S.C. 154(b) by 1256 days.

(21) Appl. No.: 13/649,457

(22) Filed: Oct. 11, 2012

(65) Prior Publication Data

US 2013/0144553 A1 Jun. 6, 2013

Related U.S. Application Data

(63) Continuation of application No. PCT/JP2011/073429, filed on Oct. 12, 2011.

(Continued)

(30) Foreign Application Priority Data

Oct. 12, 2010 (JP) .................. 2010-229788  
Oct. 12, 2010 (JP) .................. 2010-229789

(Continued)

(51) Int. Cl.  
*G01C 1/00* (2006.01)  
*G06F 17/00* (2019.01)

(52) U.S. Cl.  
CPC .............. *G01C 1/00* (2013.01); *G06F 17/00* (2013.01)

(58) Field of Classification Search  
CPC ........ G06F 1/00; G01D 5/2454; H02K 7/003; H02K 7/116; H02K 11/22; H02K 9/06; G01C 1/00

(Continued)

(56) References Cited

U.S. PATENT DOCUMENTS 4,472,713 A 9/1984 Breslow  
4,700,062 A 10/1987 Ernst (Continued)

FOREIGN PATENT DOCUMENTS

JP    A-61-048718    3/1986  
JP    S63-210621 A    9/1988

(Continued)

OTHER PUBLICATIONS

Jun. 23, 2015 Office Action issued in Japanese Patent Application No. 2012-538695.

(Continued)

*Primary Examiner* — Mohamed Charioui  
*Assistant Examiner* — Eyob Hagos  
(74) *Attorney, Agent, or Firm* — Oliff PLC

(57) ABSTRACT

An encoder includes: a first scale which has a first index portion; a second scale which has a second index portion; a first detection unit which outputs a first signal based on the first index portion, regarding first relative rotation between a fixing member and a first rotating member; a second detection unit which outputs a second signal based on the second index portion, regarding second relative rotation between the fixing member and a second rotating member; and a signal-processing unit which calculates information regarding the first relative rotation on the basis of the first signal and which calculates information regarding the second relative rotation on the basis of the second signal.

21 Claims, 35 Drawing Sheets

Related U.S. Application Data

(60) Provisional application No. 61/546,300, filed on Oct. 12, 2011.

(30) Foreign Application Priority Data

Apr. 27, 2011 (JP) ................................. 2011-099944
May 10, 2011 (JP) ................................. 2011-105139

(58) Field of Classification Search
USPC ........................................................ 702/151
See application file for complete search history.

(56) References Cited

U.S. PATENT DOCUMENTS

| | | | | |
|---|---|---|---|---|
| 5,932,980 | A | 8/1999 | Siraky | |
| 8,124,928 | B2 | 2/2012 | Villaret | |
| 8,258,459 | B2 | 9/2012 | Yoshida et al. | |
| 2006/0170384 | A1* | 8/2006 | Kumagai | B25J 17/00 318/568.11 |
| 2006/0192092 | A1* | 8/2006 | Atsuta | G01D 5/24438 250/231.13 |
| 2007/0187582 | A1* | 8/2007 | Chin | G01D 5/24438 250/231.13 |
| 2007/0262250 | A1 | 11/2007 | Benner | |
| 2009/0002681 | A1* | 1/2009 | Hasegawa | G01D 11/245 356/28 |
| 2009/0108188 | A1* | 4/2009 | Urabe | G01D 5/34723 250/231.1 |
| 2009/0125141 | A1* | 5/2009 | Noda | H05K 13/08 700/121 |
| 2010/0163716 | A1* | 7/2010 | Villaret | G01D 5/34723 250/227.28 |
| 2010/0171028 | A1* | 7/2010 | Wong | G01D 5/34715 250/230 |
| 2010/0224768 | A1 | 9/2010 | Yoshida et al. | |

FOREIGN PATENT DOCUMENTS

| | | |
|---|---|---|
| JP | S63-237616 A | 10/1988 |
| JP | U-01-084015 | 6/1989 |
| JP | A-06-174493 | 6/1994 |
| JP | H08-043129 A | 2/1996 |
| JP | Y2-2522495 | 1/1997 |
| JP | H10-225159 A | 8/1998 |
| JP | 11132792 A * | 5/1999 |
| JP | A-11-132792 | 5/1999 |
| JP | B-3175054 | 6/2001 |
| JP | 2001304851 A * | 10/2001 |
| JP | A-2001-304851 | 10/2001 |
| JP | A-2003-070284 | 3/2003 |
| JP | A-2004-347382 | 12/2004 |
| JP | 2006-292728 A | 10/2006 |
| JP | A-2006-271189 | 10/2006 |
| JP | A-2007-298522 | 11/2007 |
| JP | 2010-500554 A | 1/2010 |
| JP | 2010-210316 A | 9/2010 |

OTHER PUBLICATIONS

International Search Report issued in International Application No. PCT/JP2011/073429 dated Dec. 27, 2011 (with translation).
Written Opinion of the International Searching Authority issued in International Application No. PCT/JP2011/073429 dated Dec. 27, 2011 (with translation).
Apr. 4, 2017 Office Action issued in Japanese Patent Application No. 2016-079065.
Jan. 16, 2018 Office Action issued in Japanese Application No. 2016-079065.

* cited by examiner

| TWO HIGH-ORDER BITS OF LIGHT-RECEIVING SIGNAL OF FIRST LIGHT-RECEIVING REGION 51 | REMAINDER R OF LIGHT-RECEIVING SIGNAL OF SECOND LIGHT-RECEIVING REGION 52 | LARGE NUMBER OF ROTATIONS | POSITION IN ONE ROTATION |
|---|---|---|---|
| LL | $0 \leq R < 360/(4 \times N)$ | T | P1 |
| LL | $\frac{(3 \times 360)}{(4 \times N)} \leq R < 0 \frac{(4 \times 360)}{(4 \times N)}$ | T-1 | P1 |
| LH | — | T | P1 |
| HL | — | T | P1 |
| HH | $0 \leq R < \frac{360}{(4 \times N)}$ | T+1 | P1 |
| HH | $\frac{(3 \times 360)}{(4 \times N)} \leq R < 0$ | T | P1 | ns
ENCODER, DRIVING DEVICE, AND ROBOT APPARATUS

CROSS-REFERENCE TO RELATED APPLICATION

This application is a Non-Provisional Application claiming priority to and the benefit of U.S. Provisional Application No. 61/546,300 filed on Oct. 12, 2011. In addition, this application is a Continuation Application of International Application No. PCT/JP2011/073429 filed on Oct. 12, 2011, of which priority is claimed on Japanese Patent Application No. 2010-229788 filed on Oct. 12, 2010, Japanese Patent Application No. 2010-229789 filed on Oct. 12, 2010, Japanese Patent Application No. 2011-099944 filed on Apr. 27, 2011, and Japanese Patent Application No. 2011-105139 filed on May 10, 2011. The contents of the above applications are incorporated herein by reference.

BACKGROUND

Field of the Invention

The present invention relates to an encoder, a driving device, and a robot apparatus.

Description of Related Art

In a driving part that requires high positioning accuracy in an industrial robot, a machine tool, or the like, a gear motor (driving device) configured to output the output rotation of a motor via a reducer having high transmission accuracy may be used. As the gear motor, for example, as described in Japanese Utility Model (Registered) Publication No. 2522495, Japanese Unexamined Patent Application, First Publication No. 2003-70284, and Japanese Unexamined Patent Application, First Publication No. 2006-271189, a gear motor having a motor body, a reducer coaxially connected to the rotating shaft of the motor body, and an output shaft coaxially connected to the output side of the reducer is disclosed.

The motor as described above needs to control the rotation angle of the output shaft of the reducer with high accuracy in order to perform positioning and the like with good accuracy. Therefore, a first encoder is mounted to the rotating shaft of the motor, and a second encoder is mounted to the output shaft of the reducer.

SUMMARY

However, in the motor (driving device) as described above, there are problems in that the output shaft provided in the reducer is relatively long in the axial direction, and shaft shaking occurs at the tip end portion of the output shaft, and thus information regarding rotation may not be detected with high accuracy.

In addition, in the motor (driving device) as described above, there are problems in that the first and second encoders are disposed to be lined up in the axial direction and a detection unit for detecting a signal from each of the encoders and a processing unit for processing the signal have to be provided for each of the encoders, resulting in increases in the size and cost of the device.

An object of aspects of the present invention is to provide a driving device and a robot apparatus capable of detecting information regarding the rotation of a power transmission unit such as a reducer connected to a motor and the like with high accuracy.

In addition, another object thereof is to provide an encoder, a driving device, and a robot apparatus capable of contributing to a reduction in the size of the device.

According to a first aspect of the present invention, an encoder is provided, including: a first scale which is provided in a fixing member or a first rotating member and which has a first index portion; a second scale which is provided in the fixing member or a second rotating member and which has a second index portion, the second rotating member being mechanically connected to the first rotating member; a first detection unit which outputs a first signal based on the first index portion, regarding first relative rotation between the fixing member and the first rotating member; a second detection unit which outputs a second signal based on the second index portion, regarding second relative rotation between the fixing member and the second rotating member; and a signal-processing unit which calculates information regarding the first relative rotation on the basis of the first signal and which calculates information regarding the second relative rotation on the basis of the second signal.

According to a second aspect of the present invention, a driving device is provided, including: a motor which rotates a motor rotating shaft member having a hollow portion about a rotation axis line; a power transmission unit which has a power rotating shaft member inserted into the hollow portion and which is connected to a load side of the motor via the motor rotating shaft member; a first detector which is disposed on one end side in a direction of a rotation axis line of the motor rotating shaft member and which detects information regarding rotation of the motor; a second detector which is disposed on one end side in a direction of a rotation axis line of the power rotating shaft member and which detects information regarding rotation of the power transmission unit; and an adjustment unit which is able to adjust eccentricity of the power rotating shaft member with respect to the rotation axis line of the power rotating shaft member.

According to a third aspect of the present invention, an encoder is provided, including: a first detector which is disposed on one end side in a rotation axis line direction of a motor rotating shaft member having a hollow portion; and a second detector which is disposed on one end side in a rotation axis line direction of a power rotating shaft member inserted into the hollow portion, wherein the first detector includes a first scale that is rotated integrally with the motor rotating shaft member and includes a first sensor unit that measures information regarding rotation of the first scale, the second detector includes a second scale that is rotated integrally with the power rotating shaft member and includes a second sensor unit that measures information regarding rotation of the second scale, and the first sensor unit and the second sensor unit are provided in the same board.

According to a fourth aspect of the present invention, a driving device is provided, including: a motor which rotates a motor rotating shaft member about a rotation axis line; a power transmission unit which has a power rotating shaft member and which is connected to a load side of the motor via the motor rotating shaft member; and a detection device which detects information regarding rotation of the motor and information regarding rotation of the power transmission unit, wherein the detection device is the encoder according to the second aspect of the present invention.

According to a fifth aspect of the present invention, a robot apparatus is provided, including: a shaft member; and a driving device which drives the shaft member, wherein the driving device is the driving device according to the first aspect or the third aspect of the present invention.

According to a sixth aspect of the present invention, an encoder is provided, including: a first detection unit which includes a first light-receiving unit that receives first light via a first index portion provided in a first rotating shaft member that is rotated about a predetermined axis line; a second detection unit which includes a second light-receiving unit that receives second light via a second index portion provided in a second rotating shaft member that is connected to the first rotating shaft member via a power transmission unit; and a holding board which holds the first detection unit and the second detection unit, wherein the holding board has a discontinuous portion in which at least one of the first detection unit and the second detection unit is disposed on a side of an incidence surface onto which the first light and the second light are incident.

According to a seventh aspect of the present invention, a driving device is provided, including: a motor which rotates a motor rotating shaft member about a predetermined axis line; a power transmission unit which has a power rotating shaft member and which is connected to a load side of the motor via the motor rotating shaft member; and a detection device which detects information regarding rotation of the motor and information regarding rotation of the power transmission unit, wherein the detection device is the above-described encoder.

According to an eighth aspect of the present invention, a robot apparatus is provided, including: a shaft member; and a driving device which drives the shaft member, wherein the driving device is the above-described driving device.

According to a ninth aspect of the present invention, an encoder is provided, including: a light-receiving unit which has a first light-receiving region that receives light via a first index portion provided in a first rotating shaft member that is rotated about a predetermined axis line, and which has a second light-receiving region that receives light via a second index portion provided in a second rotating shaft member that is connected to the first rotating shaft member via a power transmission unit; and a detection unit which has the light-receiving unit and which detects information regarding rotation of the first rotating shaft member and information regarding rotation of the second rotating shaft member.

According to a tenth aspect of the present invention, a driving device is provided, including: a motor which rotates a motor rotating shaft member about a predetermined axis line; a power transmission unit which has a power rotating shaft member and which is connected to a load side of the motor via the motor rotating shaft member; and a detection device which detects information regarding rotation of the motor and information regarding rotation of the power transmission unit, wherein the detection device is the encoder according to the first aspect of the present invention.

According to an eleventh aspect of the present invention, a robot apparatus is provided, including: a shaft member; and a driving device which drives the shaft member, wherein the driving device is the driving device according to the second aspect of the present invention.

According to a twelfth aspect of the present invention, an encoder is provided, including: a first encoder disk which is mounted to a first rotating shaft member that is rotated about a predetermined axis line and in which a first index portion is formed; a second encoder disk which is mounted to a second rotating shaft member that is connected to the first rotating shaft member via a power transmission unit and in which a second index portion is formed; a first light source which illuminates the first index portion of the first encoder disk; a second light source which illuminates the second index portion of the second encoder disk; and a detection unit which selectively receives first light via the first index portion and second light via the second index portion.

According to a thirteenth aspect of the present invention, a driving device is provided, including: a motor which rotates a motor rotating shaft member about a predetermined axis line; a power transmission unit which has a power rotating shaft member and which is connected to a load side of the motor via the motor rotating shaft member; and a detection device which detects information regarding rotation of the motor and information regarding rotation of the power transmission unit, wherein the detection device is the above-described encoder.

According to a fourteenth aspect of the present invention, a robot apparatus is provided, including: a shaft member; and a driving device which drives the shaft member, wherein the driving device is the above-described driving device.

According to a fifteenth aspect of the present invention, an encoder is provided, including: a first scale which has a first index portion and which is rotated integrally with a first rotating shaft member that is rotated about a predetermined axis line; a second scale which has a second index portion and which is rotated integrally with a second rotating shaft member that is connected to the first rotating shaft member via a power transmission unit; a first control board which has a first detection unit that outputs a first signal based on the first index portion; a second control board which has a second detection unit that outputs second signal based on the second index portion; and a signal-processing unit which is provided in one board of the first control board and the second control board, and which calculates information regarding rotation of the first scale on the basis of the first signal and which calculates information regarding rotation of the second scale on the basis of the second signal, wherein the first control board and the second control board are disposed to be parallel to each other in a predetermined direction.

In the aspects of the present invention, the information regarding the rotation of the power transmission unit such as a reducer connected to the motor can be detected with high accuracy.

In addition, according to the aspects of the present invention, the encoder, the driving device, and the robot apparatus capable of contributing to a reduction in the size of the device can be provided.

DESCRIPTION OF EMBODIMENTS

Hereinafter, embodiments of the present invention will be described with reference to the drawings.

First Embodiment

Figure 1:
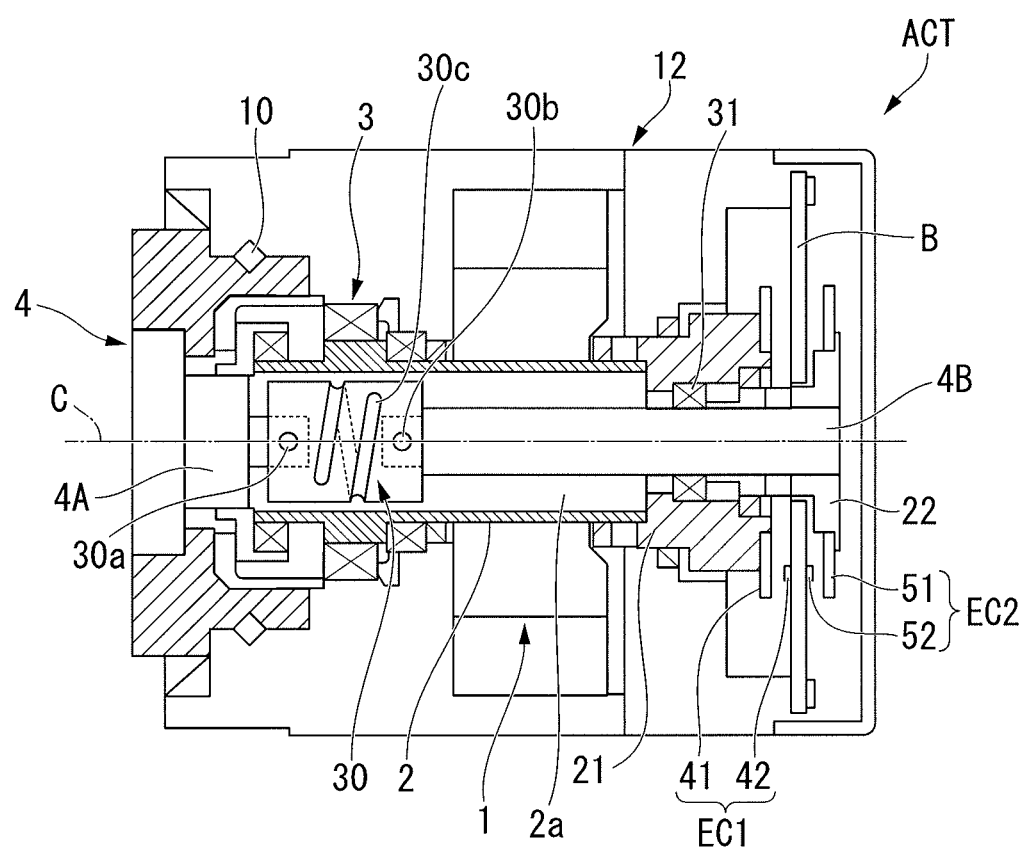
FIG. 1 is a diagram illustrating the configuration of a driving device according to a first embodiment of the present invention.

FIG. 1 is a cross-sectional view illustrating the schematic configuration of a driving device according to a first embodiment.

A driving device ACT includes a motor 1, a motor shaft (first rotating shaft member, motor rotating shaft member) 2, a reducer (power transmission unit) 3, an output shaft (second rotating shaft member, power rotating shaft member) 4, a first detector (encoder) EC1, a second detector (encoder) EC2, and a housing 12 for accommodation thereof.

The driving device ACT rotates the output shaft 4 at a rotational speed reduced from the rotation of the motor 1 by the reducer 3 provided on the load side. The motor shaft 2 and the output shaft 4 rotate about a rotation axis line (predetermined axis line) C.

Hereinafter, in the description of each figure, an XYZ orthogonal coordinate system is set, and the positional relationship of each member will be described with reference to the XYZ orthogonal coordinate system. The direction of the rotation axis line of the motor shaft 2 and the output shaft 4 is referred to as the Z-axis direction, and orthogonal directions on a plane perpendicular to the Z-axis direction are referred to as the X-axis direction and the Y-axis direction, respectively. In addition, the rotational (tilt) directions about the X axis, the Y axis, and the Z axis are referred to as θX, θY, and θZ directions, respectively.

The motor shaft 2 is formed in a hollow, substantially cylindrical shape and is rotated about the rotation axis line C by the rotational driving of the motor 1 to transmit the power of the motor 1 to the reducer 3. The end portion on the +Z side of the motor shaft 2 is provided integrally with a rotating hub (first hub unit) 21.

The output shaft 4 is supported by the housing 12 via a bearing member 10 such as a cross roller bearing. The output shaft 4 includes a first shaft member 4A and a second shaft member 4B. The first shaft member 4A and the second shaft member 4B are inserted into a hollow portion 2a of the motor shaft 2 in a state of aligning their axis lines with the rotation axis line C (in a coaxial state). The first shaft member 4A and the second shaft member 4B are connected integrally by a coupling member 30 as an adjustment unit that is able to adjust the eccentricity of the output shaft 4 with respect to the rotation axis line C.

The coupling member 30 has a substantially cylindrical shape. In the coupling member 30, a fastening unit 30a at the end portion on the −Z side is fastened and fixed to the first shaft member 4A, and a fastening unit 30b at the end portion on the +Z side is fastened and fixed to the second shaft member 4B. A spiral groove 30c formed around the rotation axis line C is provided between the fastening units 30a and 30b in the coupling member 30. The spiral groove 30c is formed to penetrate through the outer peripheral surface side and the inner peripheral surface side of the coupling member 30. Due to the presence of the spiral groove 30c, the coupling member 30 connects the first shaft member 4A and the second shaft member 4B, such that the first shaft member 4A and the second shaft member 4B can be integrally rotated about the rotation axis line C, and such that the axis line of the first shaft member 4A and the axis line of the second shaft member 4B can be relatively displaced.

The second shaft member 4B is fixed to the coupling member 30 at the −Z side end portion and is supported by the rotating hub 21 via a rotating bearing (first bearing member) 31 closer to the +Z side than the center portion. The end portion on the +Z side of the second shaft member 4B is provided integrally with a rotating hub 22.

The first detector EC1 detects information regarding the rotation of the motor 1, and includes a rotating plate (first scale, first encoder disk, first rotating member) 41 which extends in a direction orthogonal to the rotation axis line C and which is provided in the rotating hub 21, and a detection unit (first sensor unit) 42 provided in a control board (board, fixing member) B to oppose the rotating plate 41. In the rotating plate 41, a surface opposing the detection unit 42 is provided with an index pattern (index portion, pattern, not shown) along the circumferential direction. The detection unit 42 receives detection light reflected from the index pattern of the rotating plate 41 by a light-receiving element such as a photodiode, thereby detecting information regarding the rotation of the rotating plate 41, that is, information regarding the rotation of the motor shaft 2 and the motor 1.

The second detector EC2 detects information regarding the rotation of the reducer 3, and includes a rotating plate (second scale, second encoder disk, rotating member) 51 which extends in the direction orthogonal to the rotation axis line C and which is provided in the rotating hub 22 with a gap from the rotating plate 41, and a detection unit (second sensor unit) 52 provided in the control board B to oppose the rotating plate 51. In the rotating plate 51, a surface opposing the detection unit 52 is provided with an index pattern (index portion, pattern, not shown) along the circumferential direction. The detection unit 52 receives detection light reflected from the index pattern of the rotating plate 51 by a light-receiving element such as a photodiode, thereby detecting information regarding the rotation of the rotating plate 51, that is, information regarding the rotation of the output shaft 4 and the reducer 3.

The control board B is disposed substantially in parallel to the rotating plate 41 and the rotating plate 51 in the gap between the rotating plate 41 and the rotating plate 51 and is fixed to the housing 12.

Next, the operation of the driving device ACT will be described.

When the motor shaft 2 is rotated by the driving of the motor 1, the output shaft 4 is rotated at the number of rotations corresponding to the reduction ratio of the reducer 3 via the reducer 3.

The rotating hub 21 and the rotating plate 41 are rotated by the rotation of the motor shaft 2. By detecting the information regarding the rotation of the rotating plate 41 using the detection unit 42, the information regarding the rotation of the motor 1 can be detected. Similarly, the rotating hub 22 and the rotating plate 51 are rotated by the rotation of the output shaft 4. By detecting the information regarding the rotation of the rotating plate 51 using the detection unit 52, the information regarding the rotation of the reducer 3 can be detected.

Regarding the rotation of the output shaft 4, the first shaft member 4A and the second shaft member 4A integrally rotate. In the vicinity of the end portion on the +Z side where the rotating plates 41 and 51 are disposed, the second shaft member 4B is supported by the rotating hub 21 provided with the rotating plate 41 via a rotating bearing 31. Therefore, even in a case where the second shaft member 4B is relatively long and the tip end thereof on the second detector EC2 side is displaced from the rotation axis line C due to an error such as squareness, shaft shaking does not substantially occur. As a result, the rotating plate 41 and the rotating plate 51 are rotated about the rotation axis line C with high concentricity and coaxiality and rarely have eccentricity. In addition, the second shaft member 4B is connected to the first shaft member 4A via the coupling member 30. Therefore, even in a case where the first shaft member 4A is eccentric with respect to the second shaft member 4B or even in a case where the axis line of the first shaft member 4A is tilted with respect to the axis line of the second shaft member 4B, the coupling member 30 is elastically deformed to adjust (absorb) the eccentricity and tilt. As a result, the second shaft member 4B can be rotated about the rotation axis line C with high concentricity and coaxiality without substantially having an adverse effect on the position and tilt of the axis line of the first shaft member 4A.

As such, in this embodiment, the rotating plate 41 and the rotating plate 51 are rotated about the rotation axis line C with high concentricity and coaxiality with reduced eccentricity. Therefore, the information regarding the rotation of the motor 1 and the like and the information regarding the rotation of the reducer 3 can be detected with high accuracy. In addition, in this embodiment, since the detection units 42 and 52 are provided in the same control board B, reductions in size and cost of the device are realized compared to a case where the detection unit 42 and the detection unit 52 are provided in separate boards.

Second Embodiment

Next, a second embodiment will be described with reference to FIG. 2.

Figure 2:
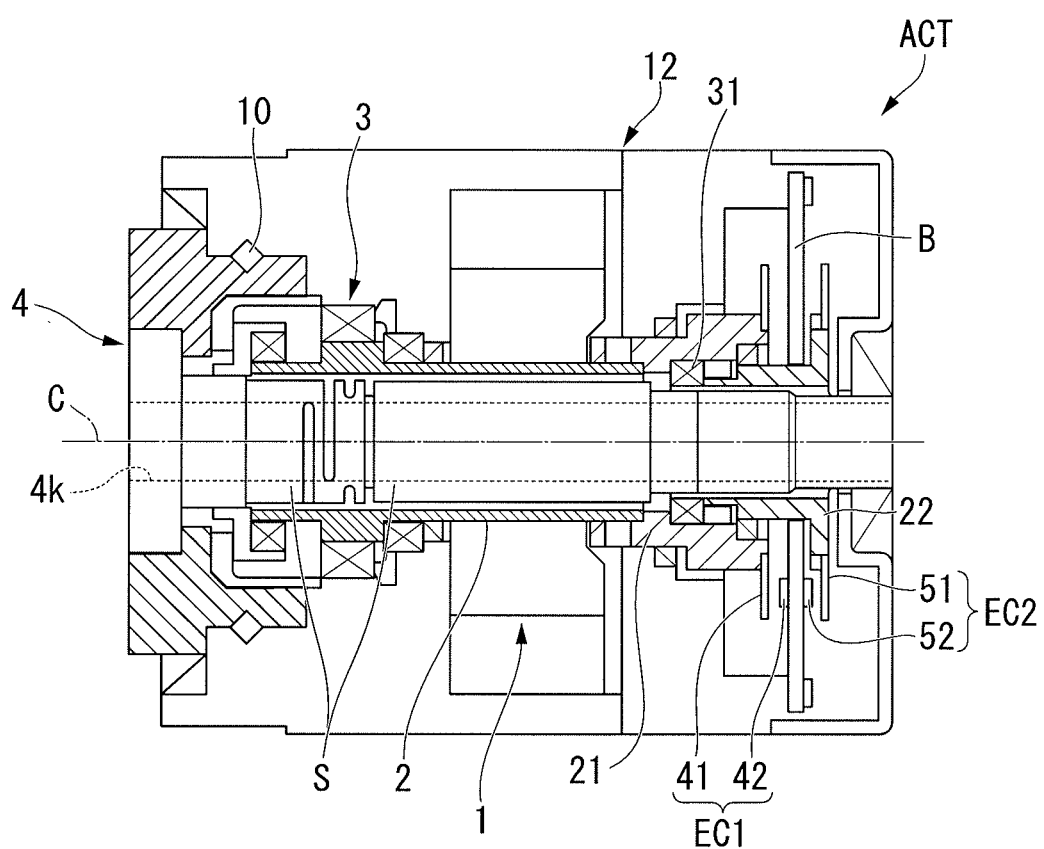
FIG. 2 is a diagram illustrating the configuration of a driving device according to a second embodiment.

In FIG. 2, like elements that are the same as or equivalent to the elements of the first embodiment illustrated in FIG. 1 are denoted by like reference numerals, and descriptions thereof will be omitted or simplified.

In the first embodiment, the output shaft 4 is constituted by the first shaft member 4A and the second shaft member 4B connected by the coupling member 30 as the adjustment unit. In this embodiment, an output shaft 4 includes an adjustment unit.

As illustrated in FIG. 2, in this embodiment, the output shaft 4 in a driving device ACT is formed in a substantially cylindrical shape having a through-hole 4k using the rotation axis line C as the center axis line. In the output shaft 4, in the vicinity of the position where a reducer 3 is disposed in the Z direction, a plurality of (in FIG. 2, four) slit portions S are provided as the adjustment unit at intervals in the direction of the rotation axis line C. Each of the slit portions S is formed around the rotation axis line C so as to penetrate through the outer peripheral surface and the inner peripheral surface of the output shaft 4 and open gaps in the circumferential direction not along the entire periphery (to partially form non-slit portions in the circumferential direction). In addition, the gaps (non-slit portions) in the plurality of slit portions S are formed at positions shifted from each other in the circumferential direction. Other configurations are the same as those of the first embodiment.

In the driving device ACT having the above configurations, the slit portions S can be elastically deformed to adjust (absorb) the eccentricity or tilt. The adjustment occurs, for example, in a case where the one end side where the rotating plate 51 is provided closer to the +Z side than the slit portions S in the output shaft 4 and the other end side closer to the −Z side than the slit portions S are integrally rotated and the other end side of the output shaft 4 is eccentric with respect to the one end side thereof. Otherwise, the adjustment occurs, for example, in a case where the axis line of the one end side of the output shaft 4 is tilted with respect to the axis line of the other end side thereof. As a result, the one end side of the output shaft 4 is rotated about the rotation axis line C with high concentricity and coaxiality without having an adverse effect on the position and tilt of the axis line of the other end side.

Even in this embodiment, the same actions and effects as those of the first embodiment are obtained. Moreover, in this embodiment, the output shaft 4 itself has the slit portions S which are the adjustment unit. Therefore, an operation of assembling a coupling member or the like is unnecessary. As a result, this contributes to improvement in operation efficiency, and further reductions in the size and cost of the device can be realized.

Third Embodiment

Next, a third embodiment will be described with reference to FIG. 3.

Figure 3:
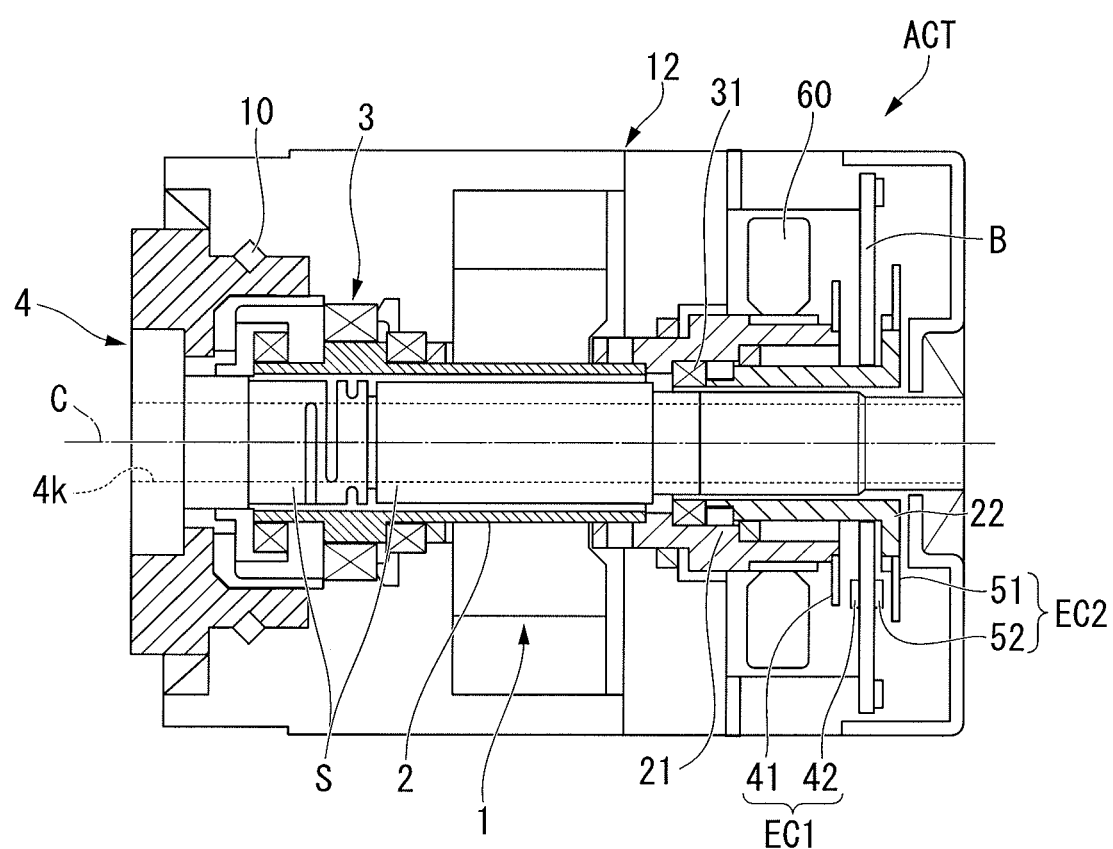
FIG. 3 is a diagram illustrating the configuration of a driving device according to a third embodiment.

In FIG. 3, like elements that are the same as or equivalent to the elements of the second embodiment illustrated in FIG. 2 are denoted by like reference numerals, and descriptions thereof will be omitted or simplified.

In this embodiment, a driving device ACT includes cooling fans (cooling units) 60 for cooling the first detector EC1 and the second detector EC2. A plurality of the cooling fans 60 are provided on the outer peripheral surface of the rotating hub 21 at predetermined intervals around the rotation axis line C. Other configurations are the same as those of the second embodiment.

In the driving device ACT having the above configurations, when the motor shaft 2 and the rotating hub 21 are rotated by the driving of the motor 1, the cooling fans 60 are rotated along with the rotating hub 21, and thus a flow of air occurs. Due to the flow of air, heat exchange between the rotating plates 41 and 51 and the detection units 41 and 42 in the first and second detectors EC1 and EC2 is efficiently performed, thereby cooling the rotating plates 41 and 51 and the detection units 41 and 42.

Even in this embodiment, the same actions and effects as those of the second embodiment are obtained. Moreover, in this embodiment, degradation in the detection accuracy of the first and second detectors EC1 and EC2 due to heat such as thermal expansion can be suppressed, and thus it is possible to detect the information regarding the rotation of the output shaft 4 with higher accuracy. In addition, in this embodiment, since the cooling fans 60 are operated along with the rotation of the rotating hub 21, an additional driving source of the cooling fans 60 does not need to be provided, and this further contributes to the reductions in the size and cost of the device.

In addition, in this embodiment, the configuration in which the rotating hub 21 is provided with the cooling fans 60 is exemplified, but this embodiment is not limited thereto. Alternatively and additionally, a configuration in which the cooling fans are provided in the rotating hub 22, the motor shaft 2, the output shaft 4, or the like due to limitations on the space or a configuration in which the cooling fans are provided in a plurality of the rotating hub 22, the motor shaft 2, the output shaft 4, and the like can be employed. Even in this case, the cooling fans 60 can be provided in the motor shaft 2 or the rotating hub 21, which has a large number of rotations and thus enables effective cooling.

Fourth Embodiment

Next, a fourth embodiment will be described with reference to FIGS. 4 and 5.

Figure 4:
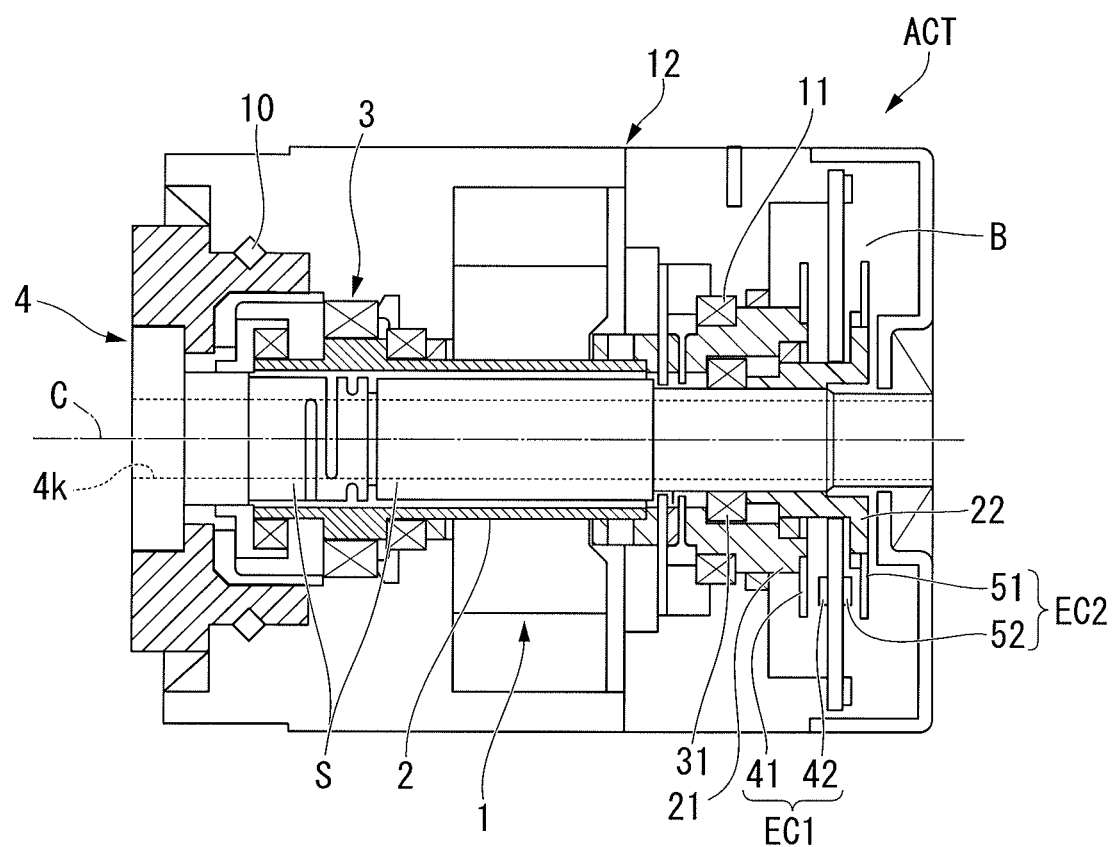
FIG. 4 is a diagram illustrating the configuration of a driving device according to a fourth embodiment.
Figure 5:
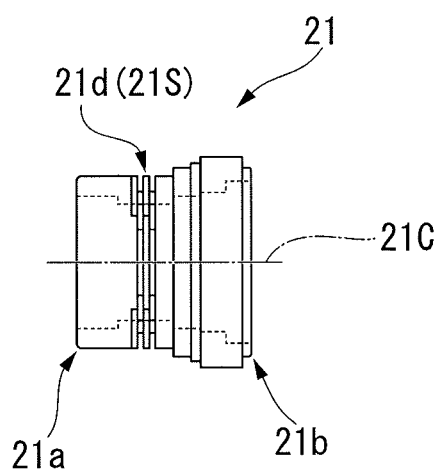
FIG. 5 is a front view of a rotating hub according to the fourth embodiment.

In FIGS. 4 and 5, like elements that are the same as or equivalent to the elements of the second embodiment illustrated in FIG. 2 are denoted by like reference numerals, and descriptions thereof will be omitted or simplified.

In this embodiment, a rotating hub 21 of a driving device ACT includes an adjustment unit which is able to adjust eccentricity with respect to the rotation axis line C of the motor shaft 2. As illustrated in FIG. 5, the rotating hub 21 of this embodiment is provided with a slit portion (elastic portion) 21S having slits 21d formed around a center axis line 21C between an end portion 21a to which the end portion on the +Z side of the motor shaft 2 is connected and an end portion 21b provided with the rotating plate 41, like the slit portions S in the output shaft 4.

In addition, as illustrated in FIG. 4, the rotating hub 21 is supported by the housing 12 via a rotating bearing (second bearing member) 11.

Other configurations are the same as those of the second embodiment.

In the driving device ACT having the above configurations, even in a case where the axis line in the end portion 21a is eccentric or is tilted with respect to the axis line in the end portion 21b of the rotating hub 21, the rotating hub 21 is elastically deformed at the slit portion 21S as the adjustment unit to adjust (absorb) the eccentricity or tilt. Therefore, the end portion 21b provided with the rotating plate 41 is rotated about the rotation axis line C with high concentricity and coaxiality without having an adverse effect on the eccentricity of the output shaft 4 or the tilt of the center axis line. Moreover, since the rotating hub 21 is supported by the housing 12 via the rotating bearing 11, eccentricity due to the deviation of the rotating hub 21 can be suppressed.

Therefore, in this embodiment, in addition to obtaining the same actions and effects as those of the second embodiment, the rotating plate 41 can be rotated about the rotation axis line C with high accuracy, and thus it is possible to detect the information regarding the rotation of the motor 1 also with high accuracy.

Fifth Embodiment

Next, a fifth embodiment will be described with reference to FIGS. 6 and 7.

In the figures, like elements that are the same as or equivalent to the elements of the second embodiment illustrated in FIG. 2 are denoted by like reference numerals, and descriptions thereof will be omitted or simplified.

Figure 6:
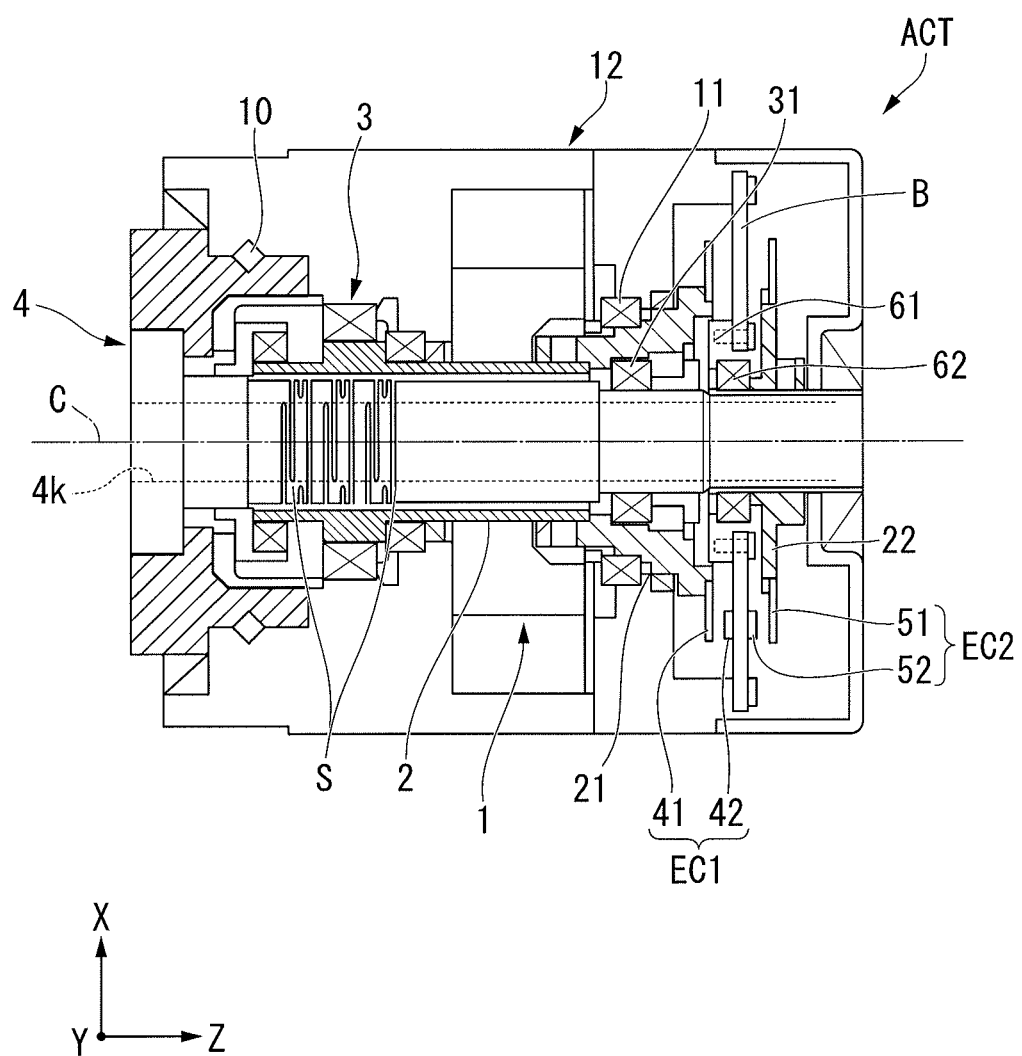
FIG. 6 is a diagram illustrating the configuration of a driving device according to a fifth embodiment.
Figure 7:
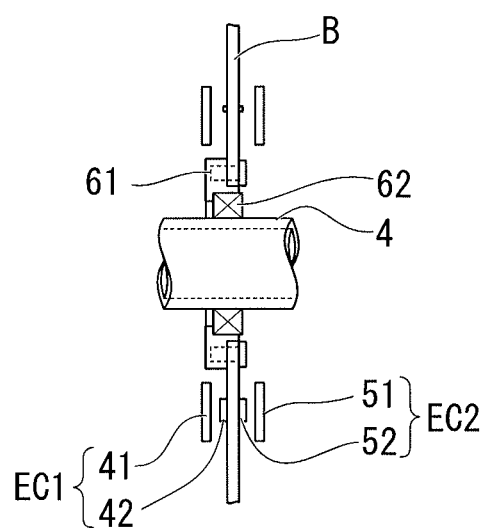
FIG. 7 is a partial enlarged view of the driving device according to the fifth embodiment.

In this embodiment, as illustrated in FIGS. 6 and 7, in a driving device ACT, the control board B is mounted to a support member 61, and the support member 61 is supported by the output shaft 4 via a rotating bearing (third bearing member) 62 (in FIG. 7, for facilitating understanding, illustration of the rotating hubs 21 and 22 is omitted). In addition, the control board B in this embodiment is disposed substantially in parallel to the rotating plate 41 and the rotating plate 51 between the rotating plate 41 and the rotating plate 51.

In the driving device ACT having the above configurations, the control board B is supported and positioned by the output shaft 4 via the support member 61 and the rotating bearing 62. In addition, the rotating plate 41 is supported and positioned by the output shaft 4 via the rotating hub 21 and the rotating bearing 31. In addition, the rotating plate 51 is supported and positioned by the output shaft 4 via the rotating hub 22. Therefore, all the rotating plate 41 and the detection unit 42 in the first detector EC1 and the rotating plate 51 and the detection unit 52 in the second detector EC2 are positioned with respect to the output shaft 4.

Therefore, in this embodiment, in addition to obtaining the same actions and effects as those of the second embodiment, the information regarding the rotation of the rotating plates 41 and 51 can be detected by the respective detectors EC1 and EC2 with high accuracy, and it is possible to match the correlations of the information regarding the rotation detected by the detectors EC1 and EC2 with high accuracy. Therefore, the information regarding the rotation of the motor 1 and the reducer 3 can also be detected with high accuracy. In addition, in this embodiment, for positioning the control board B, a highly accurate working shape of the housing 12 is unnecessary, and thus facilitation of assembly characteristics of the control board B can be achieved.

Sixth Embodiment

Figure 8:
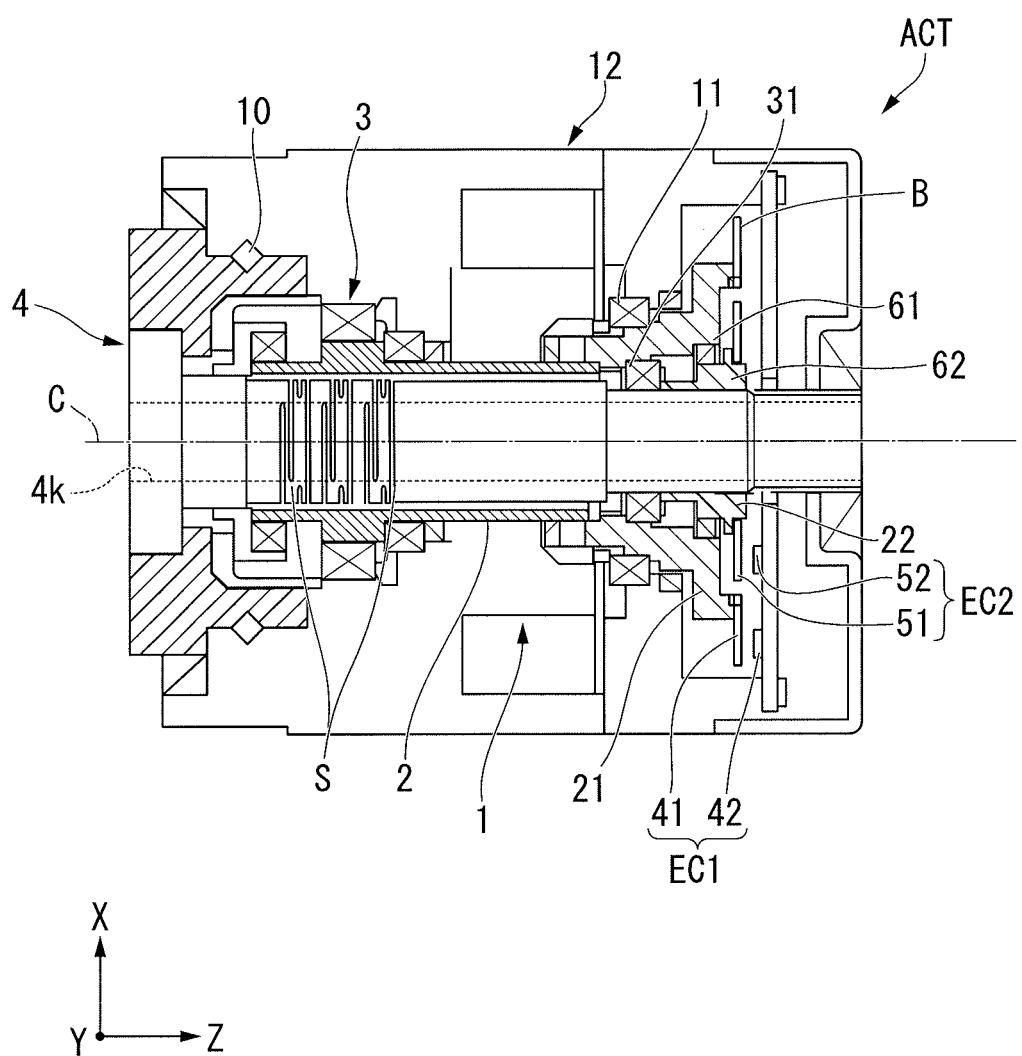
FIG. 8 is a diagram illustrating the configuration of a driving device according to a sixth embodiment.

Next, a sixth embodiment will be described with reference to FIG. 8.

In this figure, like elements that are the same as or equivalent to the elements of the second embodiment illustrated in FIG. 2 are denoted by like reference numerals, and descriptions thereof will be omitted or simplified.

In a driving device ACT in this embodiment, the rotating plate 41 and the rotating plate 51 are disposed substantially at the same position in the direction of the rotation axis line C to be substantially parallel to the control board B. In addition, the detection unit 42 and the detection unit 52 are disposed on the surface on the −Z side, which is the same side in the control board B, so as to oppose the surfaces on the +Z side of the rotating plates 41 and 51, respectively. In addition, the rotating hub 21 is supported by the housing 12 via the rotating bearing 11. In addition, the rotating plate 41 and the rotating plate 51 in this embodiment are substantially flush with each other at the positions opposing the control board B.

In the driving device ACT having the above configurations, since the control board B is disposed closer to the +Z side than the rotating hubs 21 and 22, it is possible to access the control board B or replace the control board B without detaching the rotating hub 22 from the output shaft 4.

Therefore, in this embodiment, in addition to obtaining the same actions and effects as those of the second embodiment, it is possible to simply perform operations for the control board B, thereby enhancing operation efficiency.

In addition, even in this embodiment, as in the fifth embodiment illustrated in FIGS. 6 and 7, the configuration in which the control board B is supported by the output shaft 4 via the support member 61 and the rotating bearing 62 is appropriate for enhancing detection accuracy.

Figure 9:
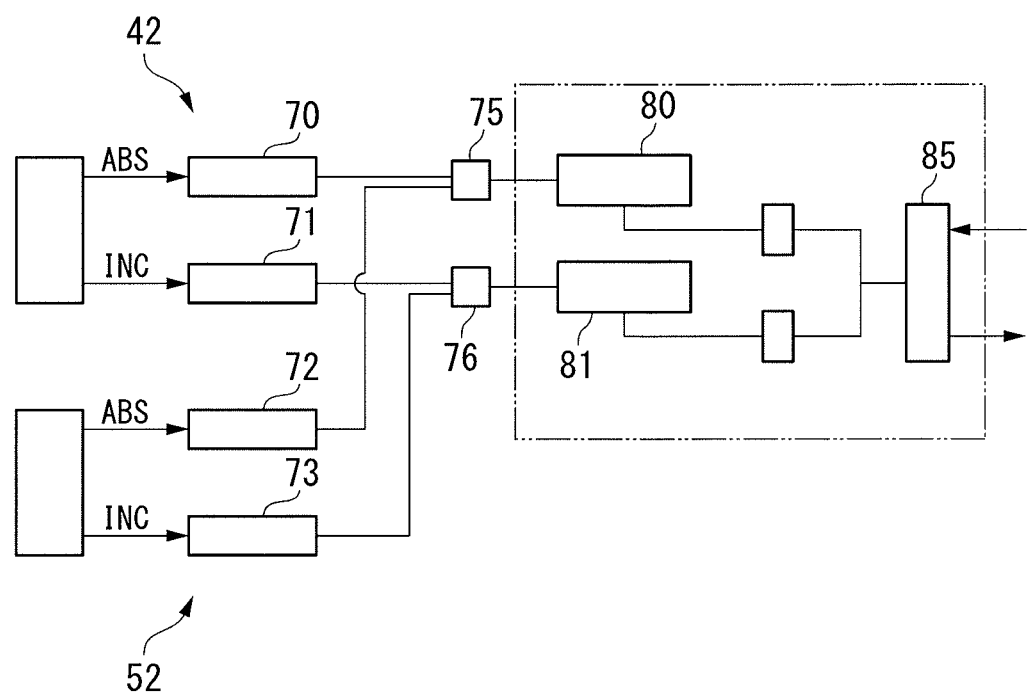
FIG. 9 is a block diagram illustrating an example of a control system applied to a detection process of this embodiment.

FIG. 9 is a block diagram illustrating an example of a control system applied to a detection process.

In FIG. 9, the index patterns detected by the light-receiving elements of the detection unit 42 and the detection unit 52 include absolute patterns (hereinafter, referred to as ABS patterns) and incremental patterns (hereinafter, referred to as INC patterns). Regarding the detection unit 42, a detection signal of the ABS pattern is input to, for example, a shift register 70, and a detection signal of the INC pattern is input to, for example, a holding circuit 71. Regarding the detection unit 52, a detection signal of the ABS pattern is input to, for example, a shift register 7272, and a detection signal of the INC pattern is input to, for example, a holding circuit 73. The signals from the shift registers 70 and 72 are input together to a conversion circuit 80 through a switching unit 75. The signals from the holding circuits 71 and 73 are input together to an interpolation circuit 81 through a switching unit 76. Position information calculated by a predetermined operation process is appropriately input and output via an interface unit 85. In the detection units 42 and 52 illustrated in FIG. 9, for example, the conversion circuit 80, the interpolation circuit 81, and the interface unit 85 are used in common (common units). The control board B (see FIG. 1) includes a semiconductor device such as an ASIC (Application Specific Integrated Circuit). Using at least a part of such a processing unit in common is advantageous in simplification, downsizing, and the like of configurations.

As described above, in this embodiment, the detection units 42 and 52 are provided in the same control board B. Alternatively, in another embodiment, the detection unit 42 and the detection unit 52 can be separately provided in individual boards provided in parallel. Even in this case, since at least a part of the processing unit including, for example, the ASIC and the like is used in common, the reductions in the size and cost of the device are achieved.

In addition, for example, as the coupling member 30 illustrated in the first embodiment, a slit type is exemplified, but the embodiment is not limited thereto. A configuration in which a disk type coupling member or a bellows type coupling member is used as long as the one end side and the other end side in the direction of the rotation axis line C are elastically deformed relative to each other may be employed.

In addition, in the fifth embodiment, the configuration in which the control board B is supported by the output shaft 4 via the rotating bearing 62 is exemplified. However, the embodiment is not limited thereto, and a configuration in which the control board B is supported by the motor shaft 2 via a rotating bearing depending on the arrangement thereof may be employed. This also applies to the sixth embodiment.

In addition, the first detector EC1 and the second detector EC2 in the embodiments described above are configured as optical detectors but may also be configured as magnetic detectors. In addition, the first detector EC1 and the second detector EC2 may be configured of an optical type and a magnetic type, respectively, and the first detector EC1 and the second detector EC2 may be configured of a magnetic type and an optical type, respectively.

In addition, in this embodiment, the detectors (encoders) EC1 and EC2 are reflective encoders and may also be transmissive encoders.

Seventh Embodiment

Next, a seventh embodiment will be described with reference to FIGS. 10 to 15.

In this figure, like elements that are the same as or equivalent to the elements of the above embodiments are denoted by like reference numerals, and descriptions thereof will be omitted or simplified.

Figure 10:
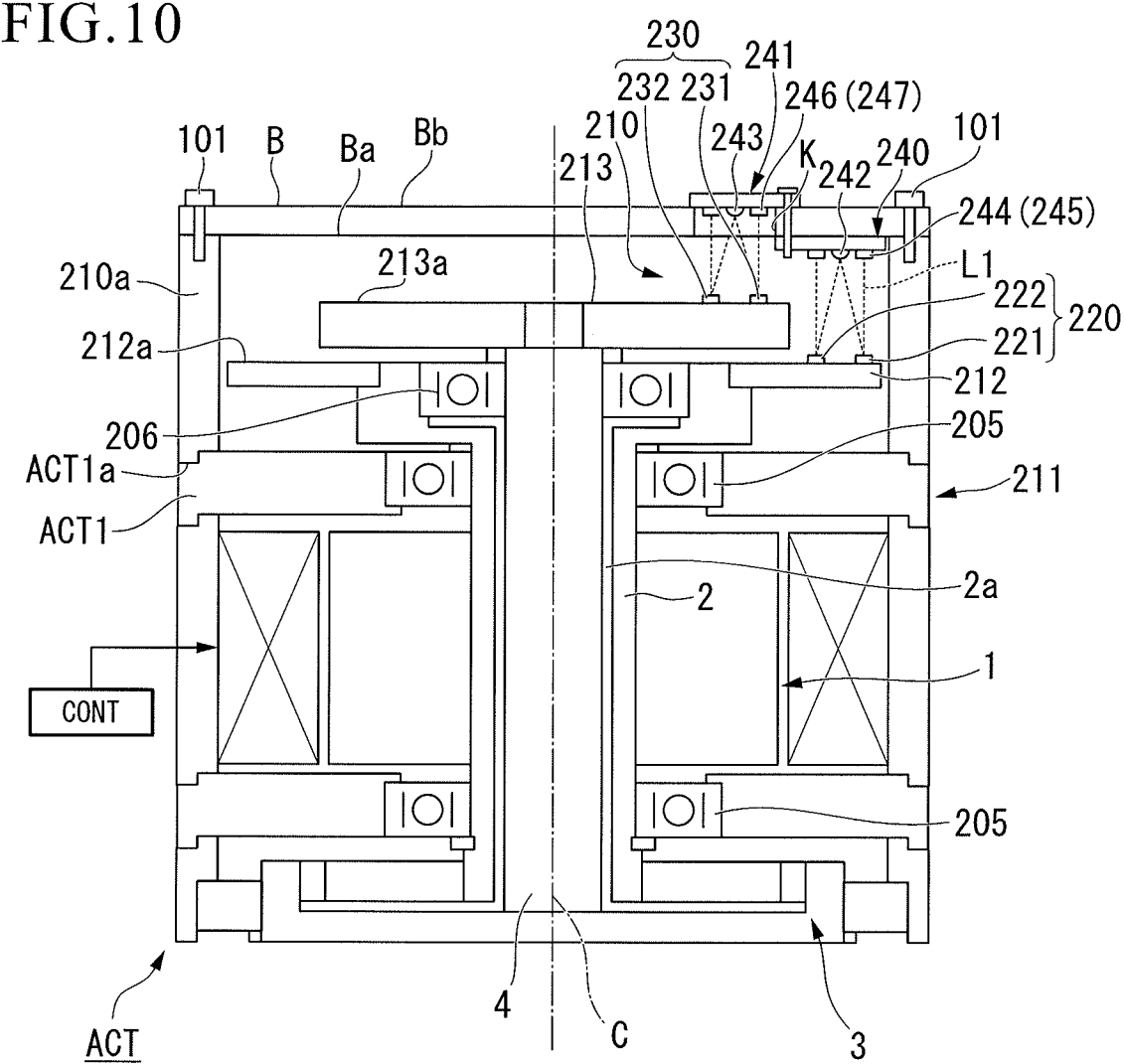
FIG. 10 is a cross-sectional view illustrating the schematic configuration of a driving device in a seventh embodiment.

As illustrated in FIG. 10, in this embodiment, a driving device ACT includes the motor 1, the motor shaft (first rotating shaft member, motor rotating shaft member) 2, the reducer (power transmission unit) 3, the output shaft (second rotating shaft member, power rotating shaft member) 4, and an encoder 210.

Even in this embodiment, the motor shaft 2 is formed in a hollow, substantially cylindrical shape, is rotated about the rotation axis line C by the rotational driving of the motor 1, and is rotatably supported by a casing 211 via a bearing 205. In this embodiment, the end portion on the +Z side of the motor shaft 2 is provided with an encoder disk (first encoder disk, first scale, first rotating member) 212 substantially in parallel to the XY plane. Details of the encoder disk 212 will be described later.

The output shaft 4 is formed in a substantially columnar shape and is rotated about the rotation axis line C by the rotational driving of the motor 1. In addition, the output shaft 4 is inserted into the hollow portion 2a of the motor shaft 2 coaxially with the motor shaft 2 (in a coaxial state). The end portion on the +Z side of the output shaft 4 is rotatably supported by the motor shaft 2 via the bearing 206. The end portion on the +Z side of the output shaft 4 is provided with an encoder disk (second encoder disk, second scale, second rotating member) 213 substantially in parallel to the XY plane. Details of the encoder disk 213 will be described later.

The motor shaft 2 and the output shaft 4 are connected to each other via the reducer 3. As the reducer 3, for example, a wave gear reducer is used. The rotation of the motor shaft 2 is output from the output shaft 4 via the reducer 3 as rotation with a reduced speed.

The encoder 210 includes a first index portion 220 provided on a surface 212a on the +Z side of the encoder disk 212, a second index portion 230 provided on a surface 213a on the +Z side of the encoder disk 213, and first and second detection units 240 and 241 provided in a detection signal control board B (fixing member) (hereinafter, may be referred to as a board B) to oppose the first and second index portions 220 and 230, respectively. In this embodiment, the encoder disk 213 is disposed on the +Z side of the encoder disk 212. In other words, the surface 213a of the encoder disk 213 is disposed in a state of protruding toward the +Z side from the surface 212a of the encoder disk 212. The axial position of the encoder disk 212 is different from that of the encoder disk 213.

The first index portion 220 includes an incremental pattern 221 (hereinafter, referred to as an INC pattern 221) positioned on the outer peripheral side of the encoder disk 212 and an absolute pattern 222 (hereinafter, referred to as an ABS pattern 222) positioned on the inner peripheral side (inner side in the radial direction, center side) of the encoder disk 212. Similarly, the second index portion 230 includes an incremental pattern 231 (hereinafter, referred to as an INC pattern 231) positioned on the outer peripheral side (outer side in the radial direction) of the encoder disk 213 and an absolute pattern 232 (hereinafter, referred to as an ABS pattern 232) positioned on the inner peripheral side (inner side in the radial direction, center side) of the encoder disk 213.

The ABS patterns 222 and 232 represent absolute position information in the rotational directions in the respective disks 212 and 213 and are configured as, for example, a predetermined number of M-series codes. The INC patterns 221 and 231 represent relative position information in the rotational directions in the respective disks 212 and 213 and are configured as, for example, patterns of pulses. Such a pattern is formed of light reflecting portions having a code of 1 (H) and light absorbing portions having a code of 0 (L). The light reflecting portion may be formed of a member having high reflectance such as gold, aluminum, chromium, or copper. The light absorbing portion may be formed of a layer that absorbs light such as a layer coated with a black paint, a black alumite layer, a plated layer (for example, nickel plated layer), or a chromium oxide layer.

Figure 11:
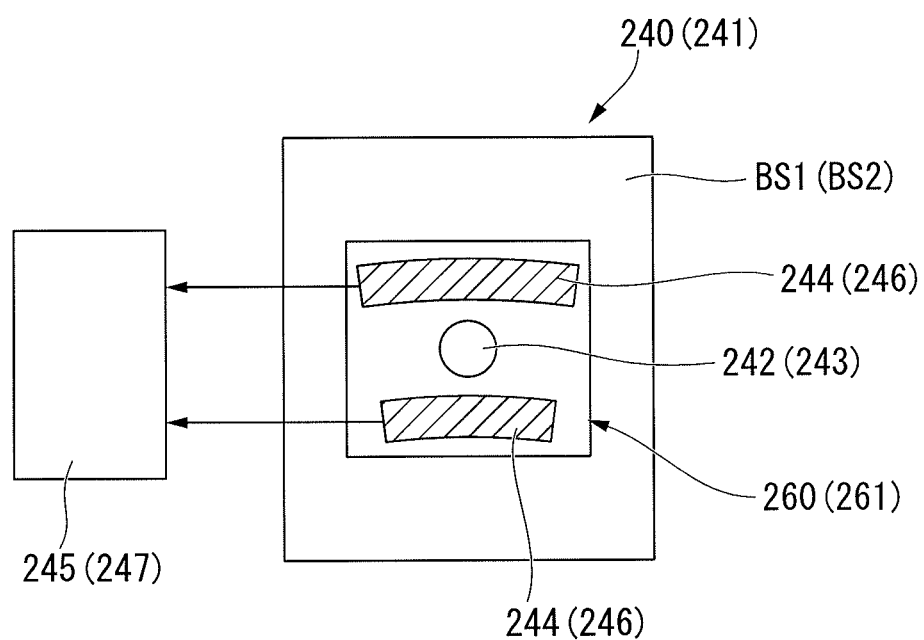
FIG. 11 is a block diagram illustrating an example of a detection unit in the seventh embodiment.

FIG. 11 is a plan view illustrating the schematic configurations of the first detection unit 240 and the second detection unit 241. As illustrated in FIG. 11, the first detection unit 240 has a semiconductor portion 260 which includes a first light source (first light source) 242 that is configured by a LED or the like and that irradiates the first index portion 220 with light, a light-receiving unit (first light-receiving unit) 244 that receives the reflected light (first light) of the first light source 242 via the first index portion 220, and a signal-processing unit 245, and has a base substrate BS1 which holds the semiconductor portion 260 and which has a substantially rectangular shape in a plan view.

On the other hand, the second detection unit 241 has a semiconductor portion 261 which includes a second light source (second light source) 243 that is configured by a LED or the like and that irradiates the second index portion 230 with light, a light-receiving unit (second light-receiving unit) 246 that receives the reflected light (second light) of the second light source 243 via the second index portion 230, and a signal-processing unit 247, and has a base substrate BS2 which holds the semiconductor portion 261 and which has a substantially rectangular shape in a plan view.

The light-receiving units 244 and 246 are configured as light-receiving elements such as photodiodes, and output light-receiving signals based on the received light to the signal-processing units 245 and 247, respectively. The signal-processing units 245 and 247 are configured by a semiconductor device such as an ASIC (Application Specific Integrated Circuit) including a binarization unit, a filter, an A/D (analog-digital) conversion unit, an operation-processing unit, and the like. The signal-processing units 245 and 247 perform predetermined signal processing on the light-receiving signals input from the light-receiving units 244 and 246, thereby detecting information regarding the rotation of each of the disks 212 and 213, that is, information on the rotation of the motor shaft 2 and the output shaft 4. The signal-processing units 245 and 247 output the detected information regarding the rotation of the motor shaft 2 and the output shaft 4 to a control unit CONT. The control unit CONT controls the driving of the motor 1 according to the output information regarding each rotation.

However, for example, in the configuration in which two detection units (corresponding to the first detection unit 240 and the second detection unit 241 of this embodiment) that detect the rotation of the motor shaft and the output shaft are provided, a large space on the board (corresponding to the board B of this embodiment) that holds the two detection units is necessary, and thus there is a problem in that the encoder itself is increased in size. Contrary to this, in the encoder 210 according to this embodiment, the size of the arrangement space of the first detection unit 240 and the second detection unit 241 on the board B is reduced to reduce the size of the board B itself, thereby achieving a reduction in the size of the entirety of the encoder 210 including the board B.

Figure 13:
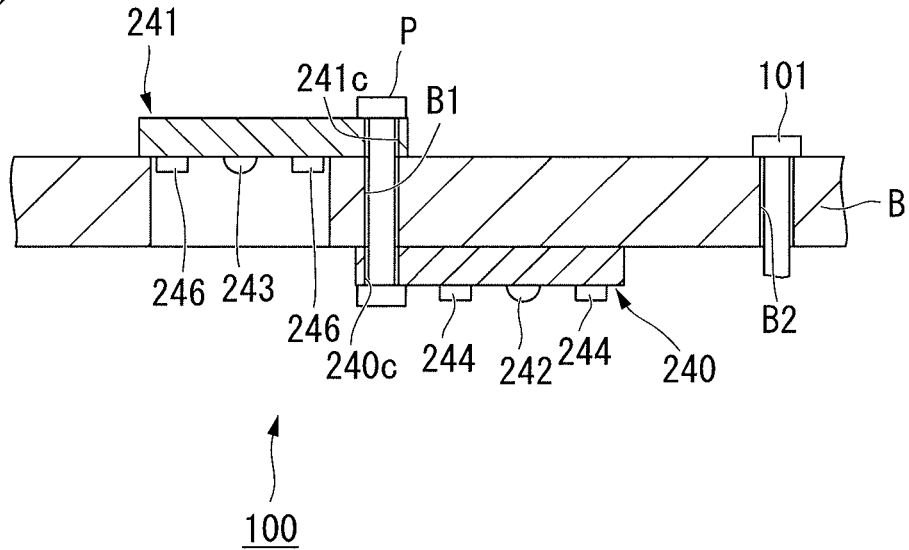
FIG. 13 is an enlarged cross-sectional view of the main part of the board in the seventh embodiment.

For example, the board B according to this embodiment has a discontinuous portion 100 (see FIG. 13). In this embodiment, the discontinuous portion 100 (110) is formed at least on the side of an incidence surface of the board B onto which the first light L1 and the second light L2 are incident. In addition, the discontinuous portion 100 (110) includes a discontinuous part and a surrounding region thereof in a first surface Ba which is continuous in the board B. In the discontinuous portion 100 (110), at least one of the first detection unit 240 and the second detection unit 241 is disposed. For example, in this embodiment, the discontinuous portion includes an opening portion K described later, which is a hole portion that penetrates from the first surface Ba to a second surface Bb of the board B, or a recessed portion B3 described later, which is a hole portion that is formed in the first surface Ba of the board B.

In this embodiment, the first detection unit 240 is mounted to the first surface Ba side (a surface toward the −Z direction, an inner surface) of the board B, and the second detection unit 241 is mounted to the second surface Bb side (a surface toward the +Z direction, an outer surface) of the board B. The second detection unit 241 is mounted to the detection signal control board B so that the semiconductor portion 261 faces the encoder disk 213 side. In the detection signal control board B, the opening portion K as a through-hole that faces the functional surface of the second detection unit 241 is formed. As such, in this embodiment, the opening portion K formed to penetrate through the board B is at least formed on the incidence surface side onto which the first light L1 and the second light L2 are incident. As a result, the first surface Ba of the board B has a discontinuous part, and thus the discontinuous portion 100 is configured.

In addition, in this embodiment, the surface 213a of the encoder disk 213 is disposed in the state of protruding from the surface 212a of the encoder disk 212. That is, the positions in the Z direction of the first index portion 220 and the second index portion 230 are shifted from each other. For this, the thickness of the board B is set to be the same as a position shift amount of the first index portion 220 and the second index portion 230. Accordingly, the distance from the first detection unit 240 disposed on the first surface Ba side of the board B to the first index portion 220 and the distance from the second detection unit 241 disposed on the second surface Bb side of the board B to the second index portion 230 are caused to be equal to each other.

Figure 12:
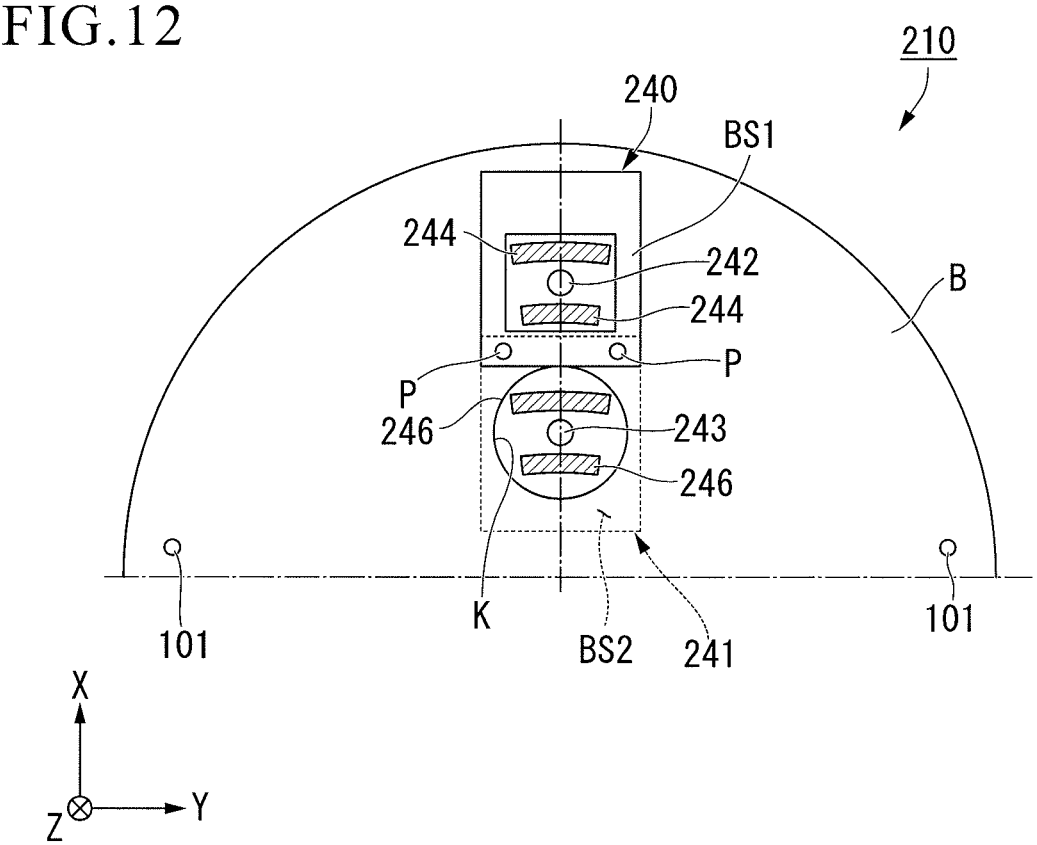
FIG. 12 is a diagram illustrating the planar configuration of a board in the seventh embodiment.

FIG. 12 is a diagram illustrating the planar configuration viewed from the first surface Ba side (motor shaft 2 side) in the direction of the rotation axis line C by the rotational driving of the motor 1 in the board B on which the first detection unit 240 and the second detection unit 241 are mounted. As illustrated in FIG. 12, the board B is configured from a discoid shape. The first detection unit 240 and the second detection unit 241 are disposed along the radial direction of the board B.

In addition, the first detection unit 240 and the second detection unit 241 are disposed so that parts thereof overlap each other in the radial direction (for example, the X direction) of the board B. The overlapping parts of the first detection unit 240 and the second detection unit 241 are parts excluding the semiconductor portion 260 and the semiconductor portion 261. In this embodiment, the base substrates BS1 and BS2 are mounted to the board B so that parts thereof overlap each other in a planar manner.

FIG. 13 is an enlarged cross-sectional view of the first detection unit 240 and the second detection unit 241 of the board B and surrounding parts thereof. As illustrated in FIG. 13, in the board B, through-holes B1 are formed through which fastening members P (for example, a bolt) are inserted for fixing the first detection unit 240 and the second detection unit 241 in a state of being positioned at predetermined positions. In addition, two through-holes B1 are formed through which the fastening members P are inserted in the board B. The fastening member P is inserted through the through-hole B1 and mounting holes 240c and 241c formed in the first detection unit 240 and the second detection unit 241. Accordingly, the first detection unit 240 and the second detection unit 241 are fixed to the board B via the same fastening member P.

In addition, the board B is fixed to a housing portion ACTT of the driving device ACT by being fastened via fixing members 101 (for example, screws). In the board B, two mounting holes B2 for inserting the fixing members 101 are formed.

Figure 14A:
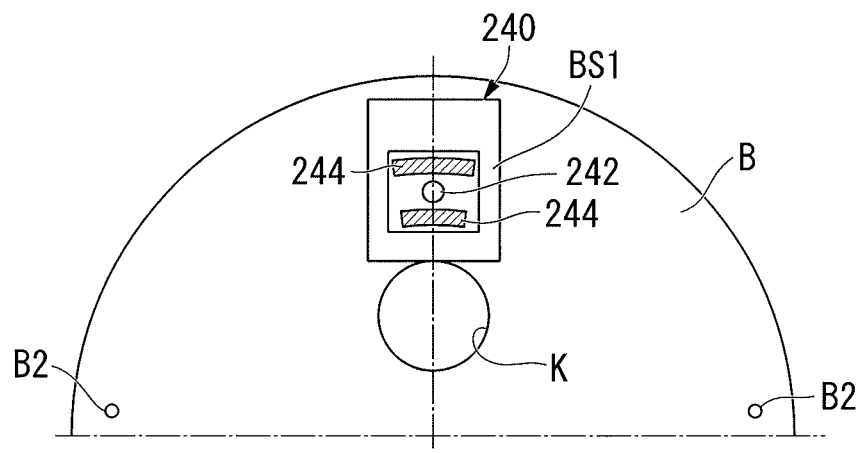
FIG. 14A is an explanatory view of a method of mounting a first detection unit and a second detection unit to the board in the seventh embodiment.
Figure 14B:
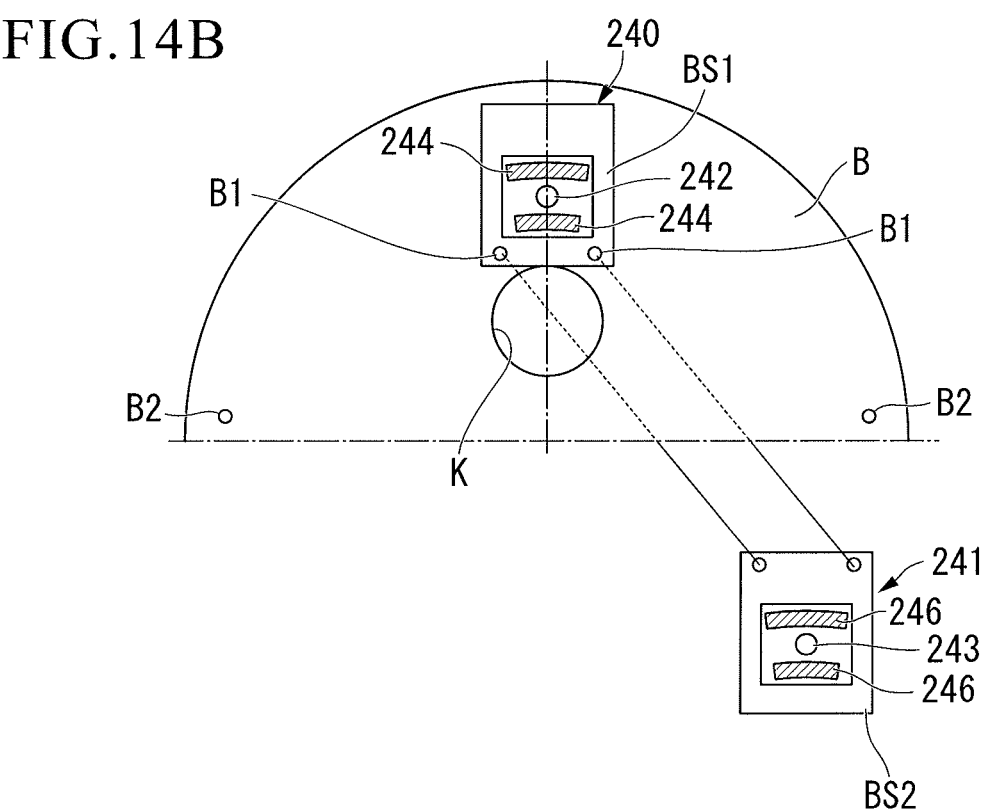
FIG. 14B is an explanatory view of the method of mounting the first detection unit and the second detection unit to the board in the seventh embodiment.

Here, a method of fixing the first detection unit 240 and the second detection unit 241 to the board B in a state of being positioned with good accuracy will be described. FIGS. 14A and 14B are explanatory views illustrating an example of the mounting method of the first detection unit 240 and the second detection unit 241.

First, as illustrated in FIG. 14A, the board B in which the opening portion K is formed is prepared, and the first detection unit 240 is mounted to a predetermined region specified with respect to the opening portion K. Subsequently, as illustrated in FIG. 14B, the through-holes B1 and the mounting holes B2 are formed at the same time with respect to the light-receiving unit 244 of the first detection unit 240 and the opening portion K. Here, the mounting holes 240c that penetrate through the base substrate BS1 of the first detection unit 240 are formed simultaneously with forming the through-holes B1 in the board B. In addition, for example, the mounting holes 240c may not be formed in a case where the base substrate BS1 is small or the like (this also applies to the case of FIG. 15 described later).

In addition, the mounting holes B2 are formed at the same time as, or before or after the formation of the through-holes B1. Accordingly, the board B fixed to the housing portion ACT1 of the driving device ACT via the mounting holes B2 can cause the opening portion K and the encoder disk 213 (second index portion 230) of the output shaft 4 assembled into the housing portion ACT1 to be in a state of being aligned with good accuracy.

Next, the mounting holes 241c that penetrate through the base substrate BS2 of the second detection unit 241 are formed with respect to the light-receiving unit 246 of the second detection unit 241 and the opening portion K. Accordingly, the second detection unit 241 enters a state of being appropriately aligned with respect to the opening portion K when being mounted to the board B via the mounting holes 241c.

Subsequently, by inserting the fastening member P through the through-hole B1 of the board B, the mounting hole 240c of the first detection unit 240, and the mounting hole 241c of the second detection unit 241, the second detection unit 241 is mounted to the rear surface (the second surface Bb) of the board B (see FIG. 12). The second detection unit 241 mounted to the board B in this manner is appropriately aligned with respect to the opening portion K. Therefore, the semiconductor portion 260 can be caused to face the opening portion K and thus is able to reliably receive the reflected light (the second light L2) from the second index portion 230.

Last, the board B to which the first detection unit 240 and the second detection unit 241 are mounted and an encoder body portion 210a fixed with respect to a joint portion ACT1a of the housing portion ACT1 are aligned, and the board B is fixed to the housing portion ACT1 by inserting the fixing members 101 through the mounting holes B2 (see FIG. 12). Accordingly, the first detection unit 240 and the second detection unit 241 mounted to the board B enters a state of being positioned at the positions opposing the first index portion 220 and the second index portion 230 of the encoder disks 212 and 213 with good accuracy. In addition, in this embodiment, the state of positioning the first detection unit 240 and the second detection unit 241 to the positions opposing the first index portion 220 and the second index portion 230 of the encoder disks 212 and 213 may be formed by inserting convex pins of the encoder body portion 210a fixed with respect to the joint portion ACT1a into the mounting holes B2 of the board B.

Next, the operations of the encoder 210 will be described.

First, during a start-up at which the encoder 210 is powered on, the first light source 242 and the second light source 243 are turned on such that the first light L1 is received by the first detection unit 240 and the second light L2 is received by the second detection unit 241.

The signal-processing unit 245 performs amplification, binarization, noise removal, and the like on the light-receiving signal based on the light via the ABS pattern 222 in the first light L1 and obtains pattern information configured of logic signals. In addition, the signal-processing unit 245 obtains absolute position information P1 in one rotation of the encoder disk 212, that is, the motor shaft 2 corresponding to the pattern information. Similarly, the signal-processing unit 247 performs binarization, noise removal, and the like on the light-receiving signal based on the light via the ABS pattern 232 in the second light L2 and obtains pattern information configured of logic signals. In addition, the signal-processing unit 247 obtains absolute position information P2 in one rotation of the encoder disk 213, that is, the output shaft 4 corresponding to the pattern information.

Subsequently, the normal operation of the encoder 10 after obtaining the absolute position information P1 and P2 during the start-up will be described. During the normal operation, the control unit CONT always turns on the first light source 242 and the second light source 243. The first detection unit 240 receives the light via the INC pattern 221 and the ABS pattern 222 as the first light L1 and outputs the light-receiving signal to the signal-processing unit 245. The signal-processing unit 245 performs amplification, binarization, noise removal, and the like on the output light-receiving signal to calculate high-resolution position information on the motor shaft 2, and stores the position information as data. The signal-processing unit 245 can detect the rotational direction of the motor shaft 2 on the basis of the absolute position information P1 during the start-up and the position information on the motor shaft 2. In addition, the signal-processing unit 245 can obtain a position in the rotational direction of the encoder disk 212, that is, the motor shaft 2 on the basis of the information. The signal-processing unit 245 stores position information in the rotational direction of the motor shaft 2. In addition, the position information stored in the signal-processing unit 245 is sequentially updated as the motor shaft 2 is rotated.

Similarly, the second detection unit 241 receives the light via the INC pattern 231 and the ABS pattern 232 as the second light L2 and outputs the light-receiving signal to the signal-processing unit 247. The signal-processing unit 247 performs amplification, binarization, noise removal, and the like on the output light-receiving signal, calculates high-resolution position information on the output shaft 4, and stores the position information as data. The signal-processing unit 247 can detect the rotational direction of the output shaft 4 on the basis of the absolute position information P2 during the start-up and the position information on the output shaft 4. In addition, the signal-processing unit 247 can obtain a position in the rotational direction of the encoder disk 213, that is, the output shaft 4 on the basis of the information. In addition, the position information stored in the signal-processing unit 247 is sequentially updated as the output shaft 4 is rotated.

As described above, the control unit CONT can control the driving of the driving device ACT or the motor 1 on the basis of the position information in the rotational directions of the motor shaft 2 and the output shaft 4 which is sequentially updated by the signal-processing units 245 and 247.

As such, the encoder 210 in this embodiment is disposed so that the second detection unit 241 disposed on the second surface Bb side of the board B is able to receive the second light L2 via the opening portion K where the discontinuous portion 100 is configured by the detection signal control board B and a part of the first detection unit 240 disposed on the first surface Ba side of the board B overlaps a part of the second detection unit 241 in a planar manner. Therefore, the size of the arrangement space of the first and second detection units 240 and 241 on the board B is reduced, and thus reductions in the size and cost of the encoder 210 including the board B can be realized. Therefore, even in the driving device ACT including the encoder 210 of this embodiment, the reductions in the size and cost of the device can be realized.

Modified Example

In addition, in this embodiment, the first detection unit 240 and the second detection unit 241 are disposed so that parts thereof overlap each other in the radial direction of the board B. Alternatively, as illustrated in FIG. 15, a configuration in which parts of the base substrates BS1 and BS2 of the first detection unit 240 and the second detection unit 241 are mounted to the board B so as to overlap each other in a planar manner in the circumferential direction (for example, the rotational direction of the motor shaft 2) of the board B can be employed.

Figure 15:
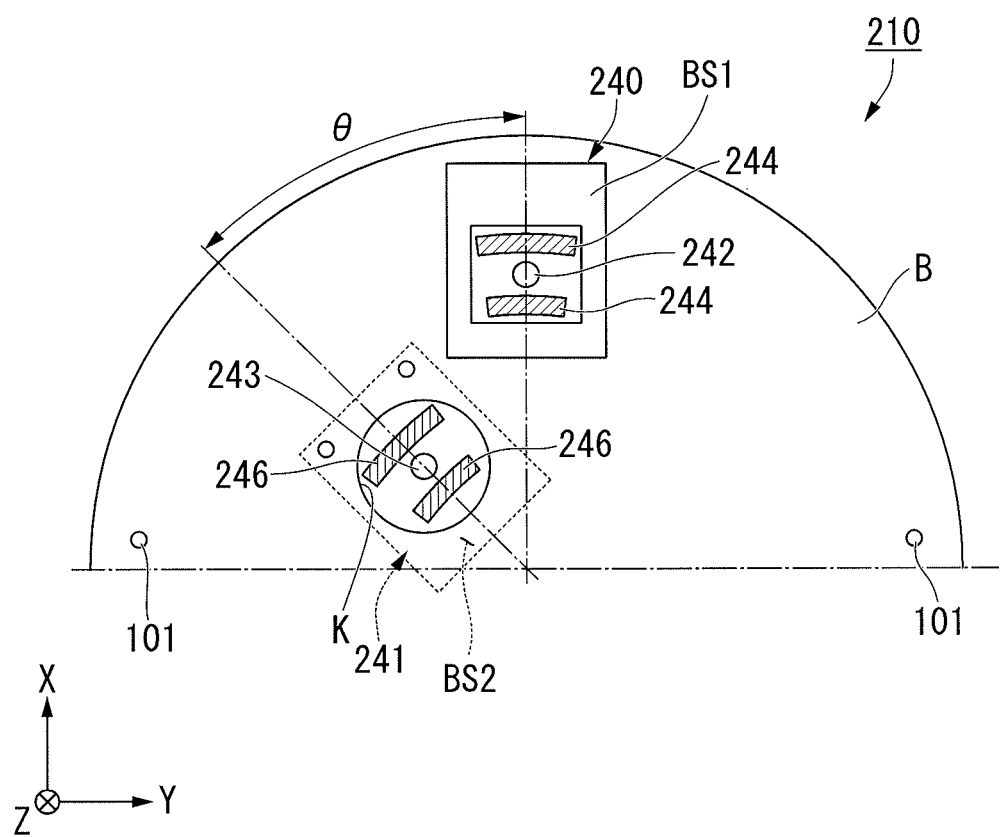
FIG. 15 is a planar configuration diagram of a board according to a modified example in the seventh embodiment.

As an example, as illustrated in FIG. 15, the second detection unit 241 is disposed at a position shifted about the Z axis by an angle θ with respect to the first detection unit 240 on the board B and thus is able to receive the second light L2 via the opening portion K. As such, when the second detection unit 241 is disposed at a position rotated in the circumferential direction of the board B by the angle θ, the semiconductor portion 261 of the second detection unit 241 and the semiconductor portion 260 of the first detection unit 240 do not overlap each other in a planar manner. Therefore, the arrangement position of the first detection unit 240 can be caused to approach the center direction (radial direction) of the board B.

Therefore, by disposing the first detection unit 240 closer to the center side (center portion) of the board B, the size of the board B can be reduced. Therefore, in this modified example of an embodiment, the size of the planar arrangement space viewed in the Z direction of the first and second detection units 240 and 241 on the board B is reduced. Therefore, the reductions in the size and cost of the encoder 210 including the board B can be realized. Moreover, even in the driving device ACT including the encoder 210 of this embodiment, the reductions in the size and cost of the device can be realized.

In addition, when the relationship in which the semiconductor portion 261 of the second detection unit 241 and the semiconductor portion 260 of the first detection unit 240 do not overlap each other in a planar manner is satisfied, the first detection unit 240 and the second detection unit 241 may also be disposed to be shifted relative to each other to positions that do not overlap each other in a planar manner in the circumferential direction of the board B. In this configuration, compared to the case where the first detection unit 240 and the second detection unit 241 are disposed along the circumferential direction of the board B, the first detection unit 240 can be disposed to approach the center direction of the board B. Therefore, the size of the board B can be reduced.

In addition, the first detection unit 240 and the second detection unit 241 may also be disposed at positions shifted on the same circumference of the board B. In this case, for example, the light-emitting surface of the first light source 242 may be configured to be tilted toward the first index portion 220 side so as to cause the first light source 242 of the first detection unit 240 disposed at a position that does not oppose the first index portion 220 to irradiate the first index portion 220 with light, and the first index portion 220 may be configured to be tilted toward the light-emitting surface side so as to cause the light-receiving unit 244 of the first detection unit 240 to receive the reflected light from the first index portion 220.

Figure 16:
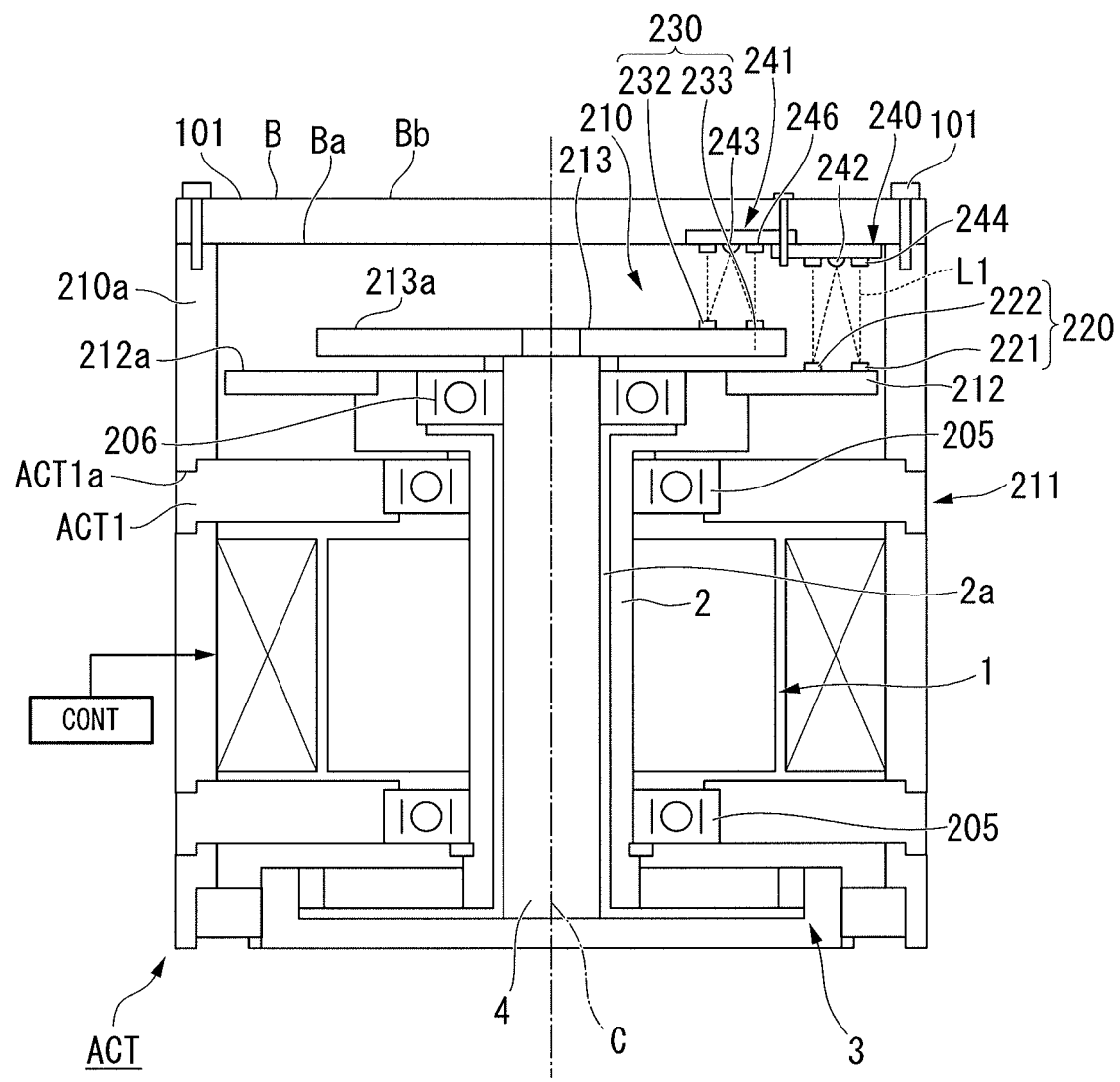
FIG. 16 is a planar configuration diagram of the board according to the modified example.
Figure 17:
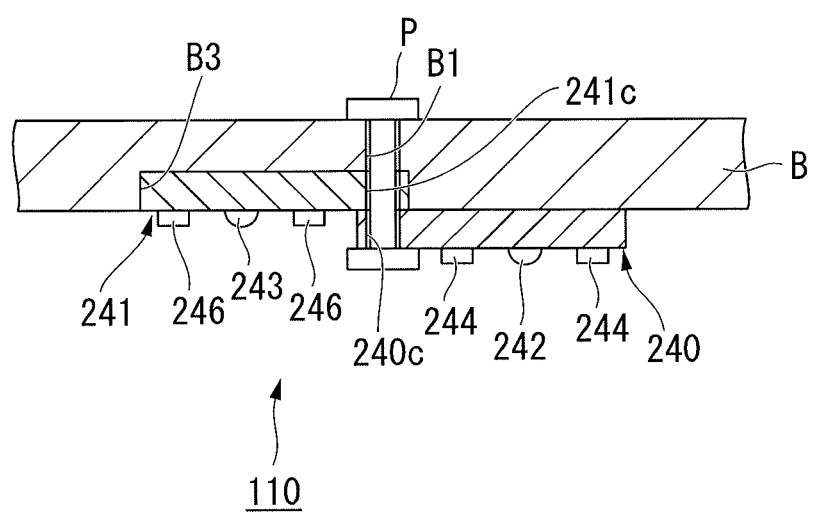
FIG. 17 is an enlarged cross-sectional view of the main part of the board illustrated in FIG. 16.

In addition, in the embodiments and the modified example, the case where the first detection unit 240 and the second detection unit 241 are disposed on both surfaces of the board B is exemplified. Alternatively, as illustrated in FIG. 16, a configuration in which the first detection unit 240 and the second detection unit 241 are disposed on the first surface Ba side of the board may also be employed. FIG. 17 is an enlarged cross-sectional view of the main parts of the board B illustrated in FIG. 16.

As illustrated in FIGS. 16 and 17, in the first surface Ba on the incidence surface side onto which the first light L1 and the second light L2 is incident, a recessed portion B3 for holding the second detection unit 241 is formed. The depth of the recessed portion B3 corresponds to the height of the second detection unit 241. The upper surface of the second detection unit 241 held in the recessed portion B3 is substantially flush with the first surface Ba of the board B. That is, on the first surface Ba side of the board B, an uneven structure is formed by the recessed portion B3. In addition, in this modified example of an embodiment, since both the first detection unit 240 and the second detection unit 241 are disposed on the first surface Ba side of the board B, the opening portion K does not need to be formed in the board B unlike the above embodiments.

In addition, the second detection unit 241 is disposed in the first surface Ba of the board B so that the base substrates BS1 and BS2 thereof overlap each other in the radial direction of the board B in a state in the plan view. The first detection unit 240 and the second detection unit 241 are fixed to the board B via the same fastening member P. That is, at least a part of the second detection unit 241 is disposed in a state of being stacked on the first detection unit 240. As such, in the form illustrated in FIGS. 16 and 17, the recessed portion B3 (uneven structure) formed on the inner surface side of the board B causes the discontinuous part of the first surface Ba and constitutes the discontinuous portion 110 in the present invention.

Even in this modified example, as illustrated in FIG. 16, the surface 213*a* of the encoder disk 213 is disposed in a state of protruding from the surface 212*a* of the encoder disk 213 in the Z direction. Therefore, the positions in the Z direction of the first index portion 220 and the second index portion 230 are shifted from each other. In this modified example, the position shift amount of the first index portion 220 and the second index portion 230 is set to the same value as the thickness of the second detection unit 241, that is, the depth of the recessed portion B3. Accordingly, the distance from the first detection unit 240 disposed in the first surface Ba of the board B to the first index portion 220 and the distance from the second detection unit 241 disposed in the recessed portion B3 of the board B to the second index portion 230 are equal to each other.

Even in the encoder 210 according to this modified example, the first detection unit 240 is able to receive the first light L1 and the second detection unit 241 disposed to overlap the first detection unit 240 is able to receive the second light L2. As a result, the size of the planar arrangement space viewed in the Z direction of the detection units 240 and 241 on the board B is reduced, and thus the reductions in the size and cost of the encoder 210 including the board B can be realized. Moreover, even in the driving device ACT including the encoder 210 of this embodiment, the reductions in the size and cost of the device can be realized.

In addition, in this embodiment, the configuration in which the light sources 242 and 243 are provided to correspond to the first and second index portions 220 and 230, respectively, is employed. In another embodiment, a configuration in which both the first and second index portions 220 and 230 are illuminated by a single light source can be employed. In addition, the encoder 210 in this embodiment is a reflective encoder but may also be a transmissive encoder. In addition, the encoder 210 in this embodiment may be configured so that a predetermined pattern (for example, the patterns 221 and 222 and the like) is formed on a side surface of the encoder disk 212 other than the surface 212*a* and a predetermined pattern (for example, the patterns 231 and 232 and the like) is formed on a side surface of the encoder disk 213 other than the surface 213*a*. In this case, the first detection unit 240 and the second detection unit 241 of the encoder 210 in this embodiment may be configured to be disposed opposing the corresponding side surfaces.

Eighth Embodiment

Next, an eighth embodiment will be described with reference to FIGS. 18 to 20.

In the following description, like elements that are the same as or equivalent to the elements of the above embodiments are denoted by like reference numerals, and descriptions thereof will be omitted or simplified.

Figure 18:
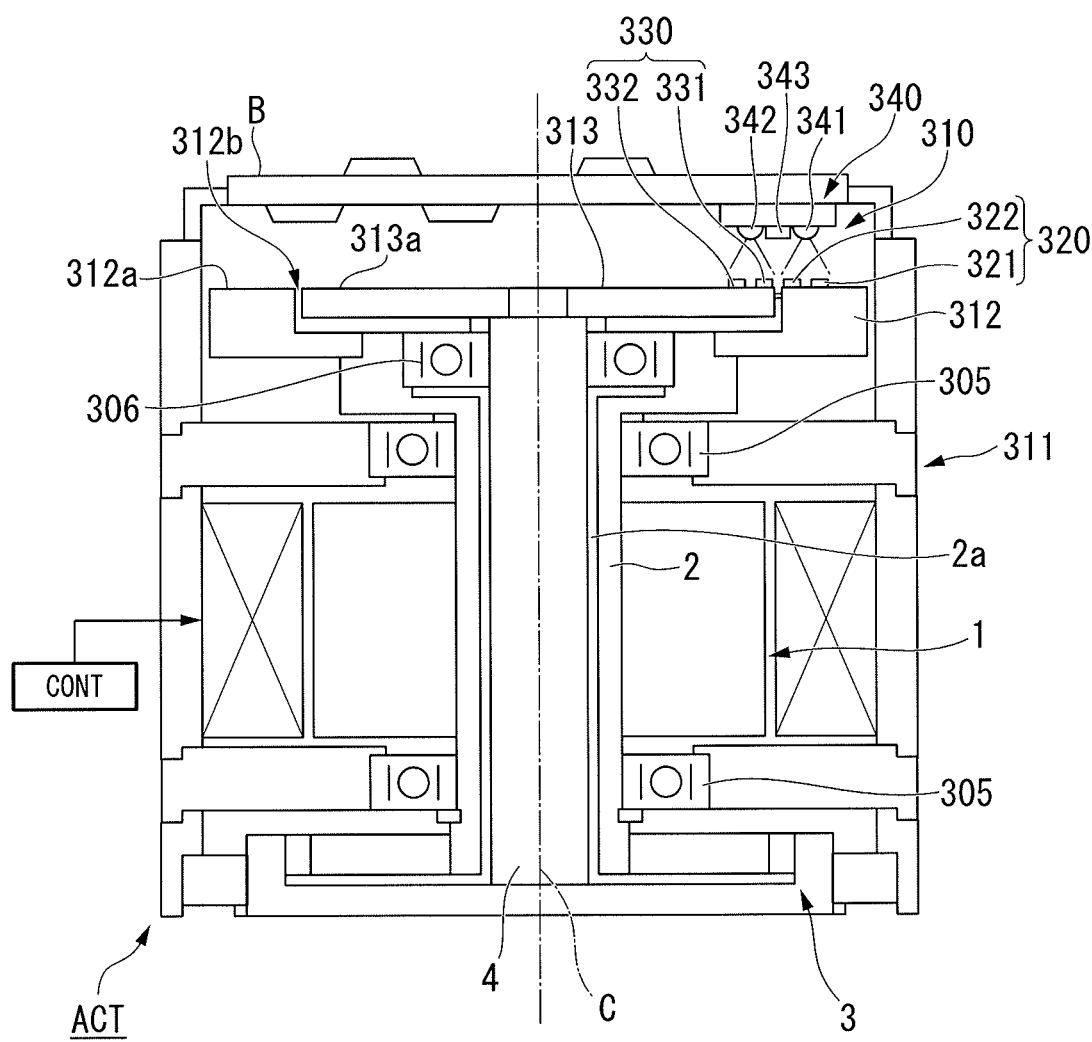
FIG. 18 is a diagram illustrating the configuration of a driving device according to an eighth embodiment.

FIG. 18 is a cross-sectional view illustrating the schematic configuration of a driving device according to the eighth embodiment.

As illustrated in FIG. 18, in this embodiment, a driving device ACT includes the motor 1, the motor shaft (first rotating shaft member, motor rotating shaft member) 2, the reducer (power transmission unit) 3, the output shaft (second rotating shaft member, power rotating shaft member) 4, and an encoder 310.

Even in this embodiment, the motor shaft 2 is formed in a hollow, substantially cylindrical shape, is rotated about the rotation axis line C by the rotational driving of the motor 1, and is rotatably supported by a casing 311 via a bearing 305. In this embodiment, the end portion on the +Z side of the motor shaft 2 is provided with an encoder disk (scale, rotating member) 312 substantially in parallel to the XY plane. Details of the encoder disk 312 will be described later.

The output shaft 4 is formed in a substantially columnar shape and is rotated about the rotation axis line C by the rotational driving of the motor 1. In addition, the output shaft 4 is inserted into the hollow portion 2a of the motor shaft 2 coaxially with the motor shaft 2 (in a coaxial state). The end portion on the +Z side of the output shaft 4 is rotatably supported by the motor shaft 2 via the bearing 306. The end portion on the +Z side of the output shaft 4 is provided with an encoder disk (scale, rotating member) 313 substantially in parallel to the XY plane. Details of the encoder disk 313 will be described later.

The motor shaft 2 and the output shaft 4 are connected to each other via the reducer 3. As the reducer 3, for example, a wave gear reducer is used. The rotation of the motor shaft 2 is output from the output shaft 4 via the reducer 3 as rotation with a reduced speed.

The encoder 310 includes a first index portion 320 provided on a surface 312a on the +Z side of the encoder disk 312, a second index portion 330 provided on a surface 313a on the +Z side of the encoder disk 313, and a detection unit 340 provided in the detection signal control board (fixing member) B to oppose the first and second index portions 320 and 330.

The encoder disk 313 is disposed in a recessed portion 312b formed on the +Z side of the encoder disk 312 so that the surfaces 312a and 313a are at heights substantially flush with each other.

The first index portion 320 includes an incremental pattern 321 (hereinafter, referred to as an INC pattern 321) positioned on the outer peripheral side and an absolute pattern 322 (hereinafter, referred to as an ABS pattern 322) positioned on the inner peripheral side. Similarly, the second index portion 330 includes an incremental pattern 331 (hereinafter, referred to as an INC pattern 331) positioned on the outer peripheral side and an absolute pattern 332 (hereinafter, referred to as an ABS pattern 332) positioned on the inner peripheral side.

The ABS patterns 322 and 332 represent absolute position information in the rotational directions in the respective disks 312 and 313 and are configured as, for example, a predetermined number of M-series codes. The INC patterns 321 and 331 represent relative position information in the rotational directions in the respective disks 312 and 313 and are configured as, for example, patterns of pulses. Such a pattern is formed of light-reflecting portions having a code of 1 (H) and light-absorbing portions having a code of 0 (L). The light-reflecting portion may be formed of a member having high reflectance such as gold, aluminum, chromium, or copper. The light-absorbing portion may be formed of a layer that absorbs light such as a layer coated with a black paint, a black alumite layer, a plated layer (for example, nickel plated layer), or a chromium oxide layer.

The detection unit 340 includes a first light source 341 that is configured by a LED or the like provided at a position opposing the first index portion 320, a second light source 342 that is configured by a LED or the like provided at a position opposing the second index portion 330, a light-receiving unit 343 that receives the light of the first light source 341 via the first index portion 320 and the light of the second light source 342 via the second index portion 330, and a signal-processing unit 344.

Figure 19:
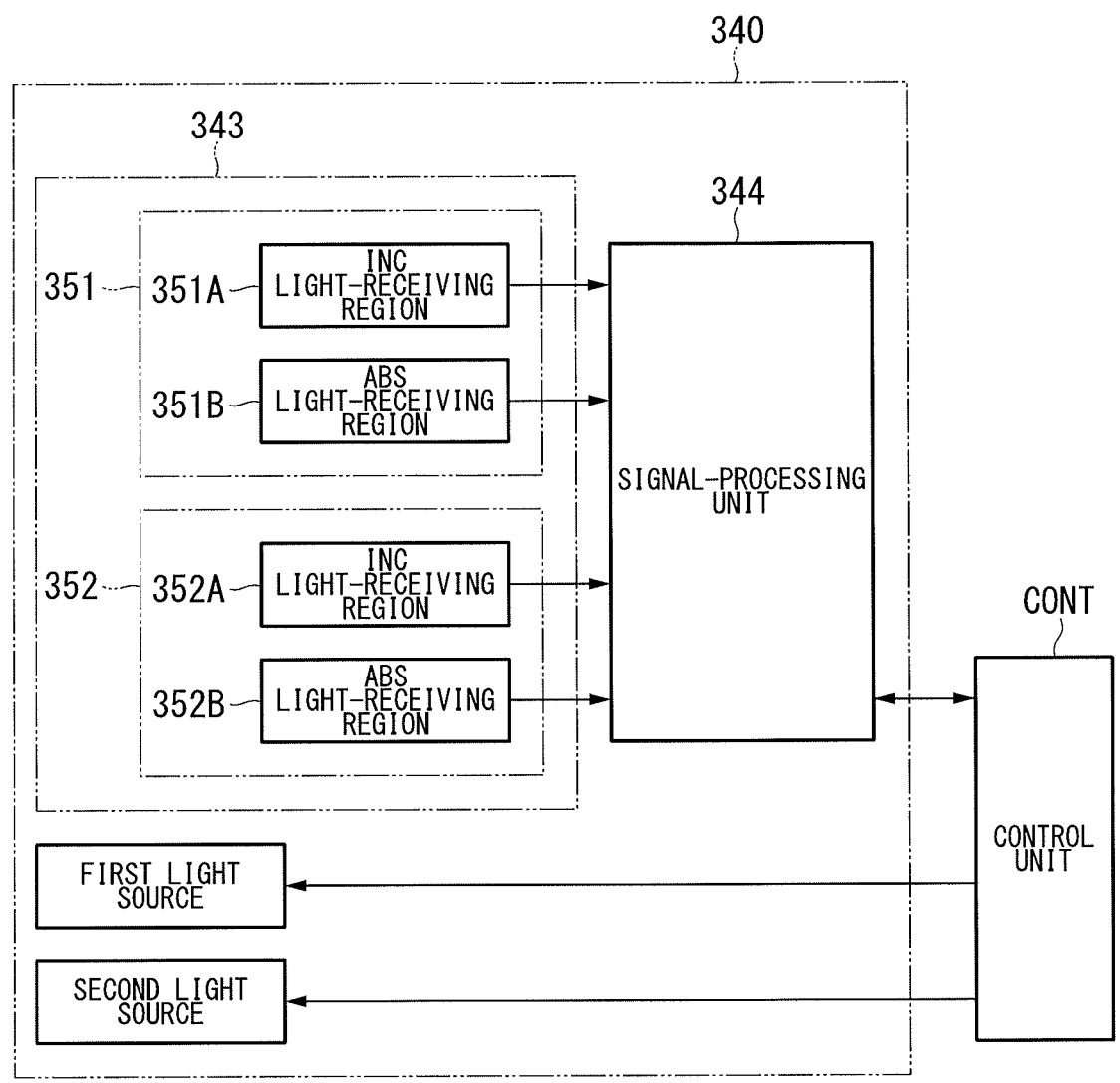
FIG. 19 is a block diagram simply illustrating a detection unit according to this embodiment.

FIG. 19 is a block diagram illustrating an example of the detection unit 340.

As illustrated in FIG. 19, in the light-receiving unit 343, a first light-receiving region 351 that receives the light of the first light source 341 via the first index portion 320 and a second light-receiving region 352 that receives the light of the second light source 342 via the second index portion 330 are integrally provided. The first light-receiving region 351 includes an INC light-receiving region 351A that receives the light via the INC pattern 321 in the first index portion 320 and an ABS light-receiving region 351B that receives the light via the ABS pattern 322 in the first index portion 320. Similarly, the second light-receiving region 352 includes an INC light-receiving region 352A that receives the light via the INC pattern 331 in the second index portion 330 and an ABS light-receiving region 352B that receives the light via the ABS pattern 332 in the second index portion 330. Each of the light-receiving regions 351A, 351B, 352A, and 352B are configured of a light-receiving element such as a photodiode and outputs a light-receiving signal to the signal-processing unit 344. In addition, the light-receiving regions 351A, 351B, 352A, and 352B in this embodiment are configured by dividing, for example, a single photodiode array into light-receiving regions for the light-receiving regions 351A, 351B, 352A, and 352B. Alternatively, a configuration in which each of the light-receiving regions 351A, 351B, 352A, and 352B has a photodiode array may be employed.

The signal-processing unit 344 is configured by a semiconductor device such as an ASIC (Application Specific Integrated Circuit) including a binarization unit, a filter, an A/D (analog-digital) conversion unit, an operation-processing unit, and the like. The signal-processing unit 344 performs predetermined signal processing on the light-receiving signals input from the light-receiving regions 351A, 351B, 352A, and 352B thereby detecting information regarding the rotation of each of the disks 312 and 313, that is, information on the rotation of the motor shaft 2 and the output shaft 4. The signal-processing unit 344 outputs the detected information regarding the rotation of the motor shaft 2 and the output shaft 4 to the control unit CONT. The control unit CONT controls the driving of the motor 1 according to the output information regarding each rotation.

Next, the operations of the encoder 310 of this embodiment will be described.

First, operations during a start-up of the encoder 310 will be described.

Here, the ABS pattern 322 is configured of, for example, 11 bits, and the ABS light-receiving region 351B performs detection in a range of 13 bits having 2 redundant bits added. In addition, the ABS pattern 32 is configured of, for example, 9 bits, and the ABS light-receiving region 352B performs detection in a range of 11 bits having 2 redundant bits added.

When the encoder 310 is powered on, for example, the ABS light-receiving region 51B receives the light via the ABS pattern 322 in the first index portion 320, and the ABS light-receiving region 352B receives the light via the ABS pattern 332 in the second index portion 330 and outputs the light-receiving signal to the signal-processing unit 344.

The signal-processing unit 344 performs amplification, binarization, noise removal, and the like on the light-receiving signal for each bit regarding the light-receiving signal of the ABS light-receiving region 351B, obtains pattern information configured of logic signals, and obtains absolute position information P1 in one rotation of the encoder disk 312, that is, the motor shaft 2 corresponding to the pattern information. Similarly, the signal-processing unit 344 performs binarization, noise removal, and the like on the light-receiving signal for each bit regarding the light-receiving signal of the ABS light-receiving region 352B, obtains pattern information configured of logic signals, and obtains absolute position information P2 in one rotation of the encoder disk 313, that is, the output shaft 4 corresponding to the pattern information.

Subsequently, operations during the normal operation of the encoder 310 after obtaining the absolute position information P1 and P2 during the start-up will be described.

During the normal operation, the INC light-receiving region 351A receives the light via the INC pattern 321 in the first index portion 320, and the INC light-receiving region 352A receives the light via the INC pattern 331 in the second index portion 330 and outputs the light-receiving signal to the signal-processing unit 344.

The signal-processing unit 344 performs amplification, binarization, noise removal, and the like on the light-receiving signal of the INC light-receiving region 351A to calculate high-resolution relative position information θ1, delays the light-receiving signal so as to be input, detects the rotational direction of the encoder disk 312, that is, the motor shaft 2 on the basis of the relative position information corresponding to each light-receiving signal, and obtains the position in the rotational direction of the encoder disk 312, that is, the motor shaft 2 on the basis of such information and the absolute position information P1 during the start-up. Similarly, the signal-processing unit 344 performs amplification, binarization, noise removal, and the like on the light-receiving signal of the INC light-receiving region 352A to calculate high-resolution relative position information θ2, delays the light-receiving signal so as to be input, detects the rotational direction of the encoder disk 313, that is, the output shaft 4 on the basis of the relative position information corresponding to each light-receiving signal, and obtains the position in the rotational direction of the encoder disk 313, that is, the output shaft 4 on the basis of such information and the absolute position information P2 during the start-up.

Figures 20, 21:
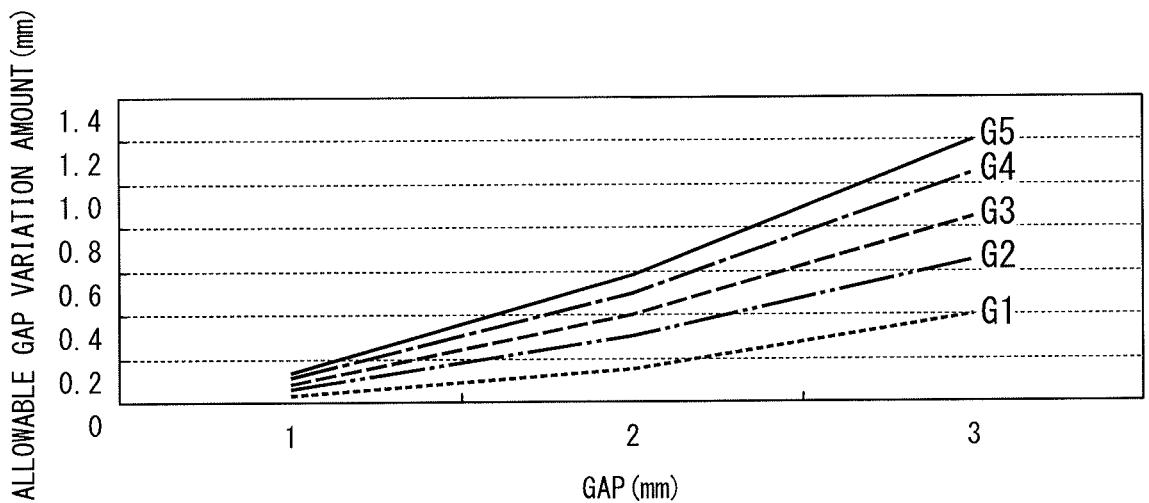
FIG. 20 is a diagram illustrating operations in a normal operation of the driving device according to this embodiment.
FIG. 21 is a diagram illustrating the relationship between the gap of an encoder and an allowable gap variation amount according to a ninth embodiment.

On the other hand, assuming that the reduction ratio of the reducer 3 is N, the number of rotations of the motor shaft 2 is N' and the quotient is T and the remainder is R when the position information P2 of the encoder disk 313 is divided by the reduction ratio N, the signal-processing unit 344 sets the number N' of rotations of the encoder disk 312, that is, the motor shaft 2 on the basis of the codes of two high-order bits in the position information P1 and the remainder R as illustrated in FIG. 20. For example, in a case where the codes of the two high-order bits in the position information P1 on the encoder disk 312 are L,L(0,0), N'=T is obtained when 0≤R≤360 degrees/(4×N) is satisfied. In addition, in a case where the codes of the two high-order bits are L,L(0,0) when (3×360 degrees)/(4×N)≤R<(4×360 degrees)/(4×N) is satisfied, N'=T−1 is obtained. In a case where the codes of the two high-order bits are L,H(0,1) and H,L(1,0), N'=T is obtained. In addition, in a case where the codes of the two high-order bits are H,H(1,1), N'=T+1 is obtained when 0≤R<(4×360 degrees)/(4×N) is satisfied, and N'=T is obtained when (3×360 degrees)/(4×N)≤R<0 degree is satisfied. The position in the rotational direction of the output shaft 4 is obtained by Expression (1) expressed as position P1+(the resolution of the first light-receiving region 51)×N'.

The control unit CONT checks the consistency between the positions in the rotational directions of the motor shaft 2 and the output shaft 4 output as a result of processing the light-receiving signals from the signal-processing unit 344 and the position in the rotational direction of the output shaft 4 output as a result obtained by Expression (1). When there is no problem with the consistency, the driving of the motor 1 is controlled according to the positions in the rotational directions of the motor shaft 2 and the output shaft 4.

As such, the encoder 310 in this embodiment includes both the first and second light-receiving regions 351 and 352 in the light-receiving unit 343 of the detection unit 340. Therefore, compared to the case where the motor shaft 2 and the output shaft 4 are provided with respective detection units, it is possible to realize the reductions in the size and cost of the device. Consequently, even in the driving device ACT including the encoder 310 of this embodiment, it is possible to realize the reductions in the size and cost of the device. In addition, in this embodiment, the first and second light-receiving regions 351 and 352 are provided on the surface on the same side. Therefore, it is possible to manufacture the first and second light-receiving regions 351 and 352 in the same process. As a result, time and cost related to the manufacture of the encoder 310 and the driving device ACT can be reduced, and this contributes to improvement in productivity. In addition, in the encoder 310 and the driving device ACT in this embodiment, the light-receiving unit that receives the light via the encoder disk 312 and the light-receiving unit that receives the light via the encoder disk 313 are configured of the same element array, thereby achieving the reductions in the size and cost of the device.

In addition, the encoder 310 in this embodiment may have a configuration in which the absolute position information P1 and P2 obtained by the signal-processing unit 344 is output to the control unit CONT and the control unit CONT obtains the positions in the rotational directions of the motor shaft 2 and the output shaft 4.

Ninth Embodiment

Next, a ninth embodiment will be described with reference to FIGS. 21 to 24.

In the following description, like elements that are the same as or equivalent to the elements of the above embodiments are denoted by like reference numerals, and descriptions thereof will be omitted or simplified.

In the eighth embodiment, it is described that the surface 312a of the encoder disk 312 provided with the first index portion 320 and the surface 313a of the encoder disk 313 provided with the second index portion 330 are substantially flush with each other. However, in this embodiment, a case where there is a height difference between the surfaces 312a and 313a will be described.

As illustrated in FIG. 18, the encoder disk 313 provided on the output shaft 4 has position variations of only about several tens of micrometers even in a case where an external force in the thrust direction (Z direction) is exerted. On the other hand, the encoder disk 312 provided on the motor shaft 2 needs to allow variations in units of 100 μm in order to allow thrust variations of the motor 1.

Here, for example, since the light-receiving unit 343 and the light sources 341 and 342 are manufactured in different manufacturing processes, there may be cases where there is a height difference between the two and they are disposed at different positions in the Z direction. In the case where the light-receiving unit 343 (the first light-receiving region 351 and the second light-receiving region 352) and the light sources 341 and 342 are at different positions in the Z direction, there is a possibility that variations in the position of the light that is reflected from the patterns of the first index portion 320 and that is incident onto the light-receiving unit 343 may occur.

FIG. 21 is a diagram illustrating the relationship between, in a case where the light sources 341 and 342 are at a position protruding toward the −Z side from the light-receiving unit 343 by 0.3 mm, the gap in the Z direction between the light-receiving unit 343 and the light sources 341 and 342 (horizontal axis, hereinafter, simply referred to as gap), and the allowable gap variation amount between the surface 312a of the encoder disk 312 and the surface 33a of the encoder disk 313 (vertical axis). In FIG. 21, a plurality of graphs G1 to G5 for each allowable variation amount at the edge position (or the light-receiving position) in the direction about the rotation axis line C of the pattern in each of the index portions 320 and 330 projected onto the light-receiving unit 343 are shown. The graph G1 is a graph in a case where an allowable variation amount of 5% is provided for 1 pitch of the pattern in each of the index portions 320 and 330. The graphs G2 to G5 are graphs in cases where allowable variation amounts of 10%, 15%, 20%, and 25% are provided for 1 pitch of the pattern, respectively.

For example, in the case where the allowable variation amount of 25% (the graph G5) is provided for 1 pitch of the pattern in each of the index portions 320 and 330, when the gap is 2 mm, the allowable gap variation amount is 0.6 mm. In addition, when it is assumed that the thrust variation of the motor 1 described above is 0.3 mm (300 μm), the allowable value of the difference between the positions in the Z direction of the encoder disks 312 and 313 is 0.3 mm. As illustrated in FIG. 21, when the gap is increased, the allowable gap variation amount is increased. However, since the strength of the light-receiving signal in the light-receiving unit 240 is reduced, the gap is appropriately 2 to 3 mm.

Figure 22:
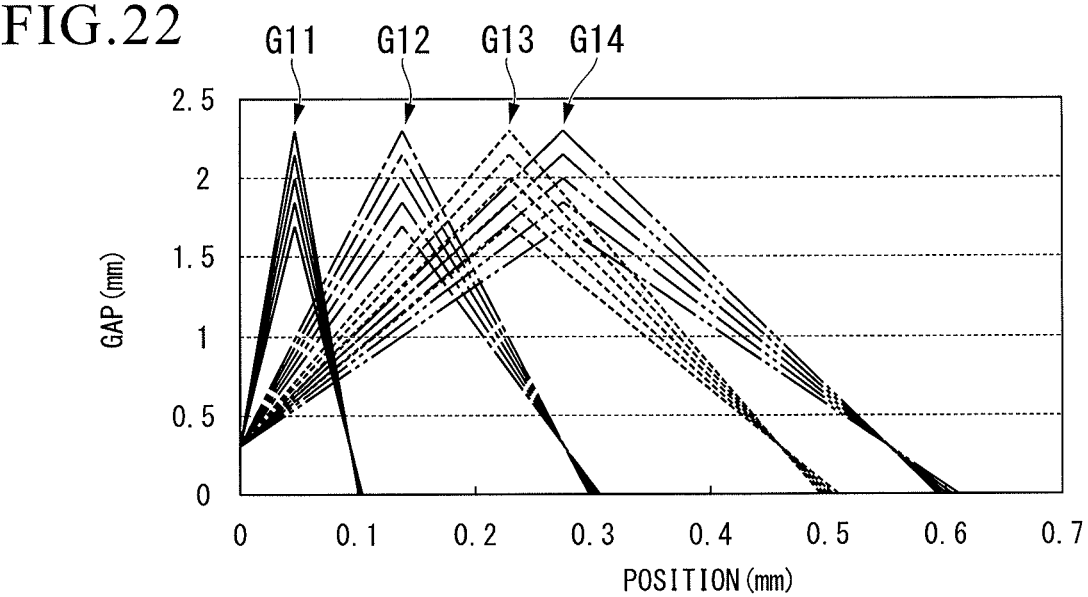
FIG. 22 is a diagram illustrating a light path of light of the encoder according to this embodiment.

In addition, FIG. 22 is a diagram illustrating the light path of the light that is emitted from the light sources 341 and 342, is reflected by the encoder disks 312 and 313, and is incident onto the light-receiving regions 351 and 352, where the horizontal axis represents the position from the center of each of the light-receiving regions 51 and 52 in the direction about the rotation axis line C and the vertical axis represents the gap in the Z direction between the light-receiving regions 351 and 352 and the light sources 341 and 342. The light paths of codes G11 to G14 in FIG. 22 represent the light paths of light that irradiates the patterns respectively positioned at the first pitch, the third pitch, the fifth pitch, and the sixth pitch from the center of each of the light-receiving regions 351 and 352 in the direction about the rotation axis line C. In addition, FIG. 22 illustrates light paths in a case where there are 5 types of gap variations (in the case of FIG. 5, 1.7 mm, 1.85 mm, 2 mm, 2.15 mm, and 2.3 mm) at the position of each pitch.

As illustrated in FIG. 22, in the light paths G11 to G14 at the position of each pitch, in the case where gap variations occur, the light-receiving positions of the light-receiving regions 351 and 352 are changed. Particularly, the variation amount of the light-receiving position at a pitch position having a large distance from the center in each of the light-receiving regions 351 and 352 is increased, and there is a possibility that the variation amount may exceed the above-described allowable variation amount depending on the cases.

Figure 23:
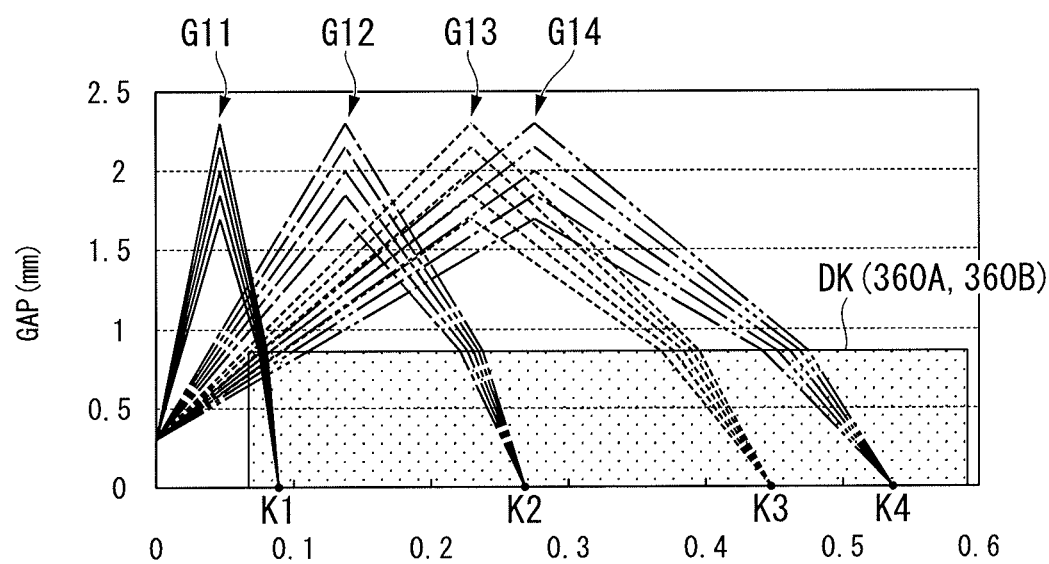
FIG. 23 is a diagram illustrating a light path of light of the encoder according to this embodiment.

Here, in this embodiment, as illustrated in FIG. 23, a light guide device DK which guides the light-receiving position of the light that is incident onto each of the light-receiving regions 351 and 352 to a predetermined position even in the case where gap variations occur is provided. The light guide device DK includes long optical elements 360A and 360B formed of, for example, a glass material. The optical elements 360A and 360B are provided to be respectively bonded to the first and second light-receiving regions 351 and 352 as illustrated in the schematic configuration diagram of FIG. 24. The light emitted from the light sources 341 and 342 is reflected from the encoder disks 312 and 313 (the first index portion 320, the second index portion 330) and is incident onto the light-receiving regions 351 and 352, and the light is guided to a predetermined position corresponding to the position in the direction about the rotation axis line C of the first and second index portions 320 and 330. In addition, in FIG. 24, the Z direction is reversed compared to FIG. 18 in the illustration.

The case where the light emitted from the light source 341 is reflected from the first index portion 320 and is incident onto the light-receiving region 351 and the case where the light emitted from the light source 342 is reflected from the second index portion 330 and is incident onto the light-receiving region 352 are the same. Hereinafter, only the case where the light emitted from the light source 341 is reflected from the first index portion 320 and is incident onto the light-receiving region 351 will be described.

Figure 24:
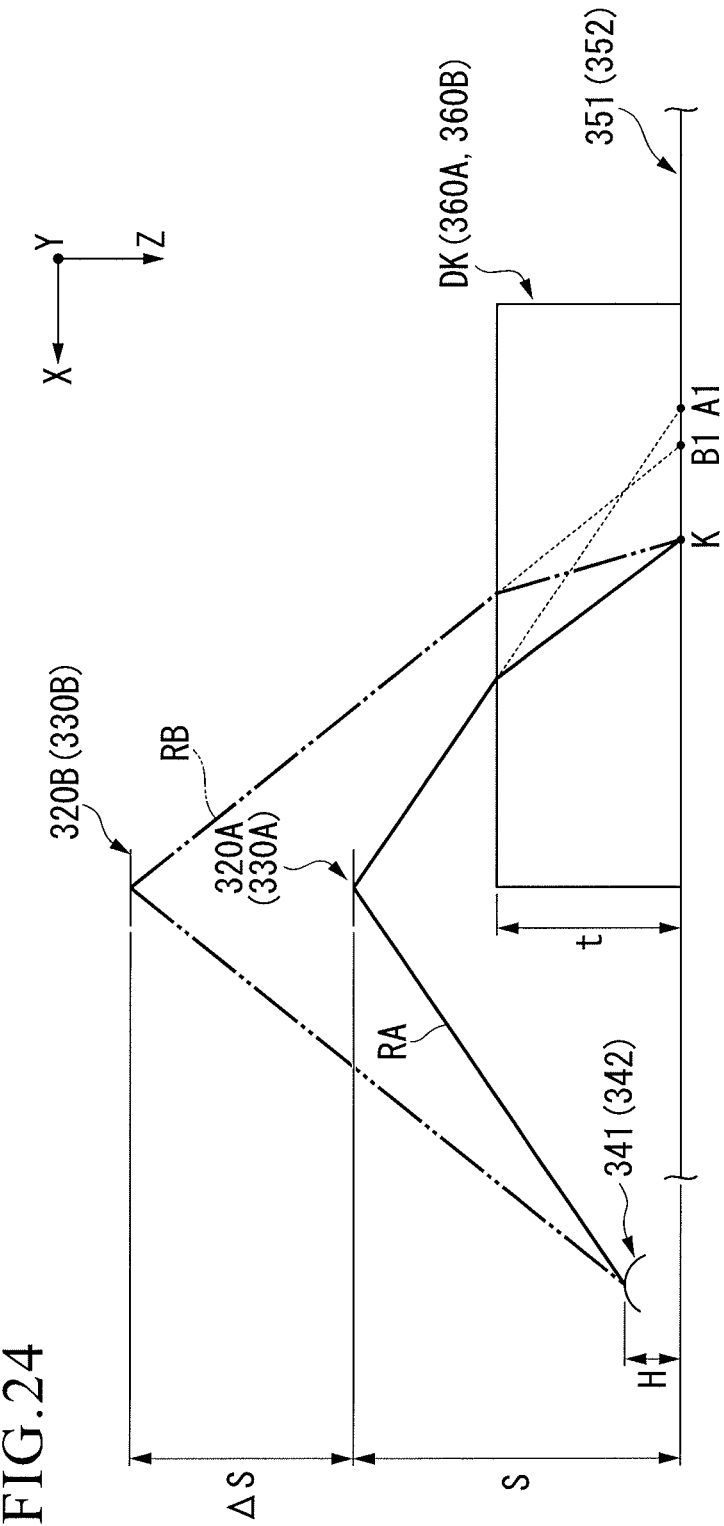
FIG. 24 is a schematic configuration diagram of the encoder according to this embodiment.

In FIG. 24, a position 320A at which the first index portion 320 is disposed at a predetermined gap S from the first light-receiving region 351, and a position 320B including a gap variation ΔS are illustrated, and light paths RA and RB of the light reflected from the positions 320A and 320B are illustrated.

In a case where the optical element 360A of the light guide device DK is not disposed, as illustrated by the broken lines, the light on the light path RA reflected from the position 320A is incident onto the first light-receiving region 351 at a light-receiving position A1, and the light on the light path RB reflected from the position 320B is incident onto the first light-receiving region 351 at a light-receiving position B1.

On the other hand, in the case where the optical element 360A is disposed, the light that is reflected from the position 320A and that is incident onto the optical element 360A and the light that is reflected from the position 320B and that is incident onto the optical element 360A are refracted according to the refractive index of the optical element 360A, and both the beams of the light are incident onto the first light-receiving region 351 at a light-receiving position K.

For example, in a case where the position in the first index portion 320 from which the light is reflected varies, by appropriately setting the refractive index and/or the thickness t in the Z direction of the optical element 360A according to the distance H from the first light-receiving region 351 to the light source 341, the gap S, and the gap variation ΔS, as illustrated in FIG. 23, it is possible to guide the light in the vicinity of the predetermined light-receiving position K (positions K1 to K4 in FIG. 23) to be incident onto the first light-receiving region 351. In this case, changing the refractive index causes changing the material of the optical element 360A and needs labor, and thus appropriately, the thickness of the optical element 360A is adjusted to easily adjust the light-receiving position of the light incident onto the first light-receiving region 351.

For example, assuming that the refractive index of the optical element 360A made of a glass material=1.5, the distance H=0.3 mm, the gap S=3.0 mm, and the gap variation ΔS=0.3 mm, by setting the thickness t of the optical element 360A to about 0.86 mm, it is possible to guide the light reflected from the first index portion 320 to be incident onto the first light-receiving region 51 in the vicinity of the predetermined light-receiving position K. This also applies to the case where the light emitted from the light source 342 is reflected from the second index portion 330 and is incident onto the light-receiving region 352.

As such, in this embodiment, in addition to obtaining the same actions and effects as those of the first embodiment, it is possible to cause the light-receiving position in the first and second light-receiving regions 351 and 352 of the light reflected from the first and second index portions 320 and 330 to be the predetermined position even in the case where thrust variations of the motor 1 occur or the positions of the light sources 341 and 342 are set to arbitrary heights. Therefore, in this embodiment, even in a case where the allowable variation amount of the gap is small, it is possible to reliably detect the information regarding the rotation of the motor shaft 2 and the output shaft 4.

In addition, the optical elements 360A and 360B do not need to be formed of the same material, and a configuration in which the optical elements 360A and 360B are formed of different materials having different refractive indexes and have different thicknesses regarding the thickness may be employed.

Tenth Embodiment

Next, a tenth embodiment will be described with reference to FIG. 25.

In the following description, like elements that are the same as or equivalent to the elements of the above embodiments are denoted by like reference numerals, and descriptions thereof will be omitted or simplified.

In the ninth embodiment, the configuration in which the first index portion 320 is provided on the surface 312a on the +Z side of the encoder disk 312 and the second index portion 330 is provided on the surface 313a on the +Z side of the encoder disk 313 is employed. In this embodiment, a case where index portions are provided on the side surfaces (peripheral surfaces) of encoder disks 412 and 413 will be described.

Figure 25:
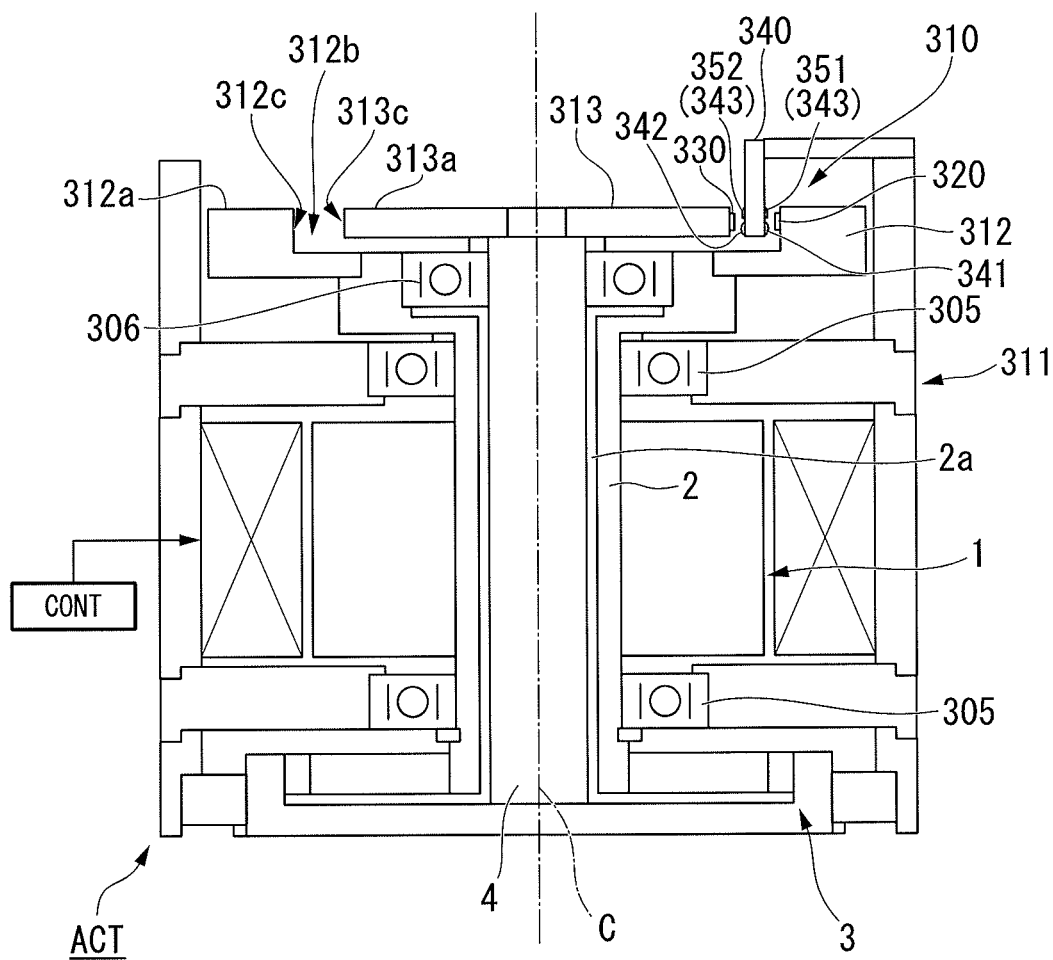
FIG. 25 is a diagram illustrating the configuration of a driving device according to a tenth embodiment.

As illustrated in FIG. 25, in an encoder 310 of this embodiment, an inner peripheral surface 312c of a recessed portion 312b in an encoder disk 312 is provided with the first index portion 320. An outer peripheral surface 313c of an encoder disk 313 is provided with the second index portion 330. In addition, in FIG. 25, illustration of the first and second index portions 320 and 330 is simplified.

Between the inner peripheral surface 312c and the outer peripheral surface 313c, a detection unit 340 that extends in the Z direction is inserted from the +Z side into a gap from each of the indexes 320 and 330. The surface of the detection unit 340 that opposes the first index portion 320 is provided with the light source 341 and the first light-receiving region 351. In addition, the surface of the detection unit 340 that opposes the second index portion 330 is provided with the light source 342 and the second light-receiving region 352. Other configurations are the same as those of the ninth embodiment.

In this embodiment, in addition to obtaining the same actions and effects as those of the ninth embodiment, even in a case where the detection unit 340 and the like cannot be disposed on the rotation axis line C of the output shaft 4 due to the limitations on the space, it is possible to easily detect the information regarding the rotation of the motor shaft 2 and the output shaft 4.

In addition, in this embodiment, the configuration in which the signal-processing unit 344 performs signal processing on both the light-receiving signals received by the first and second light-receiving regions 351 and 352 is employed, but the embodiment is not limited thereto. Alternatively, a configuration in which signal-processing units are respectively provided in the light-receiving regions 351 and 352 to individually detect the information regarding the rotation of the motor shaft 2 and the output shaft 4 may be employed. In this case, for example, a configuration in which absolute position information detected by the one signal-processing unit is output to the other signal-processing unit, and the other signal-processing unit obtains the positions in the rotational directions of the motor shaft 2 and the output shaft 4 on the basis of both pieces of the absolute position information may be employed. Otherwise, a configuration in which the absolute position information detected by each of the signal-processing units is output to the control unit CONT and the control unit CONT obtains each of the positions in the rotational directions of the motor shaft 2 and the output shaft 4 using such absolute position information may be employed.

In addition, in this embodiment, the configuration in which the light sources 341 and 342 are provided to respectively correspond to the first and second index portions 320 and 330 is employed, but the embodiment is not limited thereto. As described below, a configuration in which both the first and second index portions 320 and 330 are illuminated by a single light source may be employed.

Eleventh Embodiment

Figure 26:
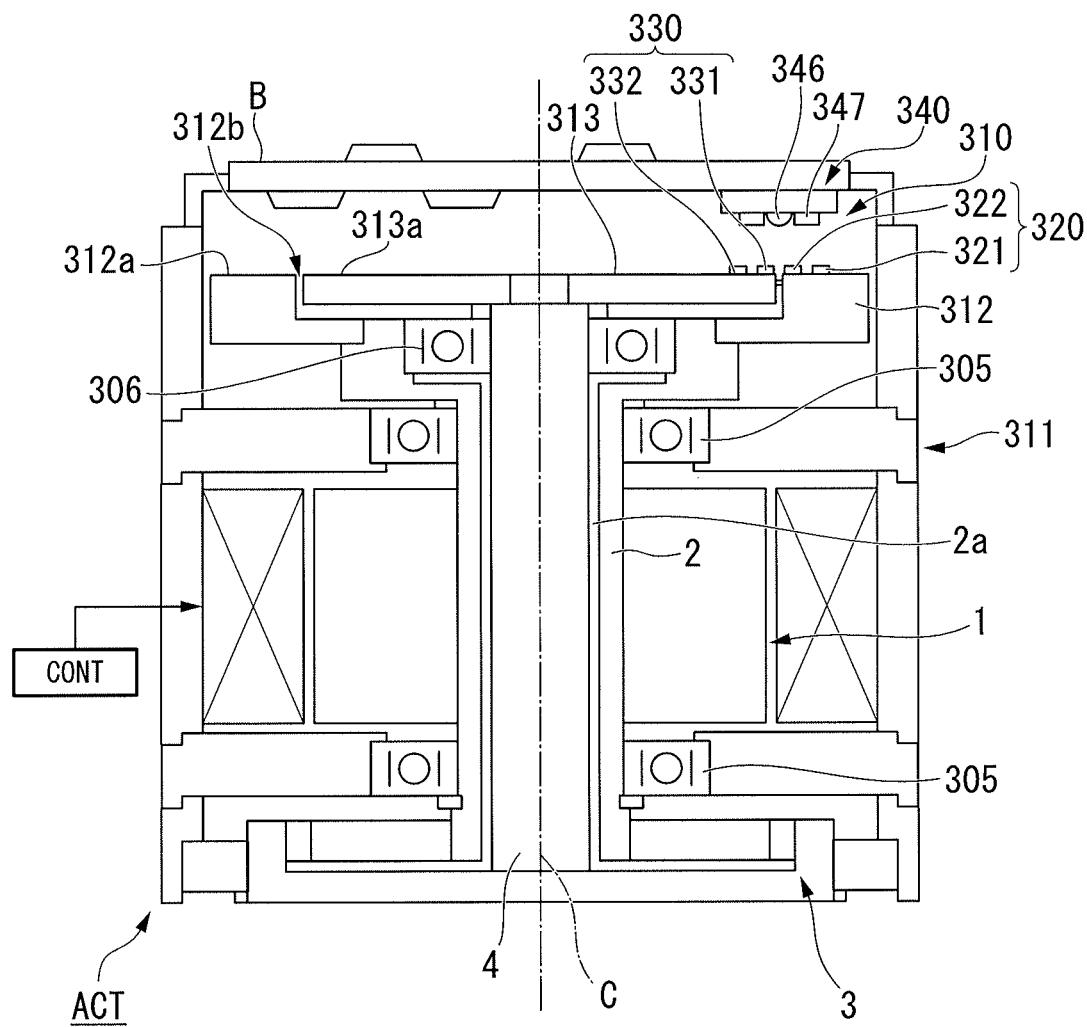
FIG. 26 is a diagram illustrating the configuration of a driving device according to an eleventh embodiment.

In an eleventh embodiment illustrated in FIG. 26, an encoder 310 includes a single light source 346 that illuminates both the first and second index portions 320 and 330 and a light-receiving unit (sensor) 347. Other configurations are the same as the configurations of FIG. 18. In this embodiment, light from the light source 346 is reflected from each of the index portions 320 and 330 of the encoder disks 312 and 313 and the reflected light is incident onto a predetermined region in the light-receiving unit 347. Alternatively and/or additionally, the configuration illustrated in FIG. 26 is able to be combined with the configurations according to the other embodiments.

Twelfth Embodiment

Next, a twelfth embodiment will be described.

In the following description, like elements that are the same as or equivalent to the elements of the above embodiments are denoted by like reference numerals, and descriptions thereof will be omitted or simplified.

Figure 27:
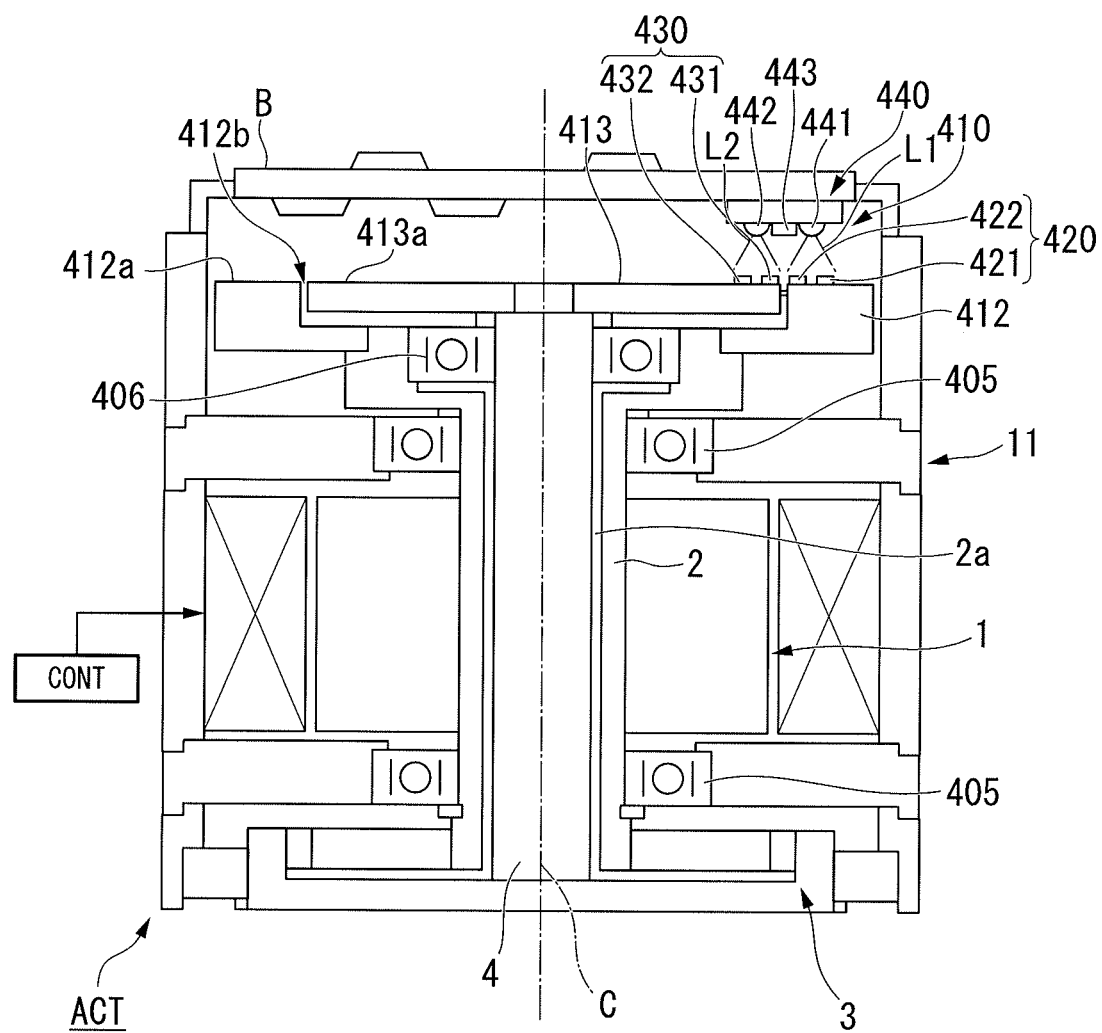
FIG. 27 is a cross-sectional view illustrating the schematic configuration of a driving device according to a twelfth embodiment.

FIG. 27 is a cross-sectional view illustrating the schematic configuration of a driving device according to the twelfth embodiment.

As illustrated in FIG. 27, in this embodiment, a driving device ACT includes the motor 1, the motor shaft (first rotating shaft member, motor rotating shaft member) 2, the reducer (power transmission unit) 3, the output shaft (second rotating shaft member, power rotating shaft member) 4, and an encoder 410.

Even in this embodiment, the motor shaft 2 is formed in a hollow, substantially cylindrical shape, is rotated about the rotation axis line C by the rotational driving of the motor 1, and is rotatably supported by the casing 311 via a bearing 405. In this embodiment, the end portion on the +Z side of the motor shaft 2 is provided with an encoder disk (first encoder disk, first scale, first rotating member) 412 substantially in parallel to the XY plane. Details of the encoder disk 412 will be described later.

The output shaft 4 is formed in a substantially columnar shape and is rotated about the rotation axis line C by the rotational driving of the motor 1. In addition, the output shaft 4 is inserted into the hollow portion 2a of the motor shaft 2 coaxially with the motor shaft 2 (in a coaxial state). The end portion on the +Z side of the output shaft 4 is rotatably supported by the motor shaft 2 via the bearing 406. The end portion on the +Z side of the output shaft 4 is provided with an encoder disk (second encoder disk, second scale, second rotating member) 413 substantially in parallel to the XY plane. Details of the encoder disk 413 will be described later.

The motor shaft 2 and the output shaft 4 are connected to each other via the reducer 3. As the reducer 3, for example, a wave gear reducer is used. The rotation of the motor shaft 2 is output from the output shaft 4 via the reducer 3 as rotation with a reduced speed.

The encoder 410 includes a first index portion 420 provided on a surface 412a on the +Z side of the encoder disk 412, a second index portion 430 provided on a surface 413a on the +Z side of the encoder disk 413, and a detection unit 440 provided in the detection signal control board (fixing member) B to oppose the first and second index portions 420 and 430.

The encoder disk 413 is disposed in a recessed portion 412b formed on the +Z side of the encoder disk 412 so that the surfaces 412a and 413a are at heights substantially flush with each other.

The first index portion 420 includes an incremental pattern 421 (hereinafter, referred to as an INC pattern 421) positioned on the outer peripheral side and an absolute pattern 422 (hereinafter, referred to as an ABS pattern 422) positioned on the inner peripheral side. Similarly, the second index portion 430 includes an incremental pattern 431 (hereinafter, referred to as an INC pattern 431) positioned on the outer peripheral side and an absolute pattern 432 (hereinafter, referred to as an ABS pattern 432) positioned on the inner peripheral side.

Figure 28:
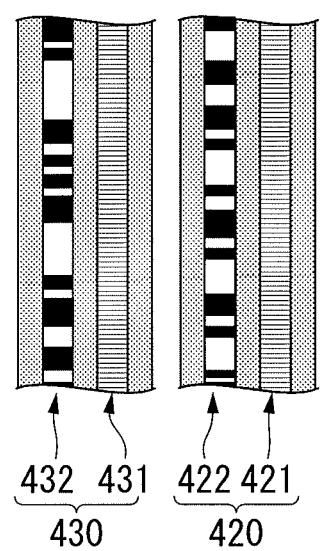
FIG. 28 is an enlarged view illustrating the structures of a first index portion and a second index portion according to this embodiment.

FIG. 28 is an enlarged view illustrating the structures of the first index portion 420 and the second index portion 430. In this embodiment, the patterns 421, 422, 431, and 432 of the first index portion 420 and the second index portion 430 have scales (codes) having substantially the same intervals. That is, the scale pitches (pitches) of the patterns 421, 422, 431, and 432 are equal to each other.

The ABS patterns 422 and 432 represent absolute position information in the rotational directions in the respective disks 412 and 413 and are configured as, for example, ninth-order M-series codes. The INC patterns 421 and 431 represent relative position information in the rotational directions in the respective disks 412 and 413 and are configured as, for example, patterns of 9 bits and 512 pulses. Such a pattern is formed of light-reflecting portions having a code of 1 (H) and light-absorbing portions having a code of 0 (L). The light-reflecting portion may be formed of a member having high reflectance such as gold, aluminum, chromium, or copper. The light-absorbing portion may be formed of a layer that absorbs light such as a layer coated with a black paint, a black alumite layer, a plated layer (for example, nickel plated layer), or a chromium oxide layer.

Figure 29:
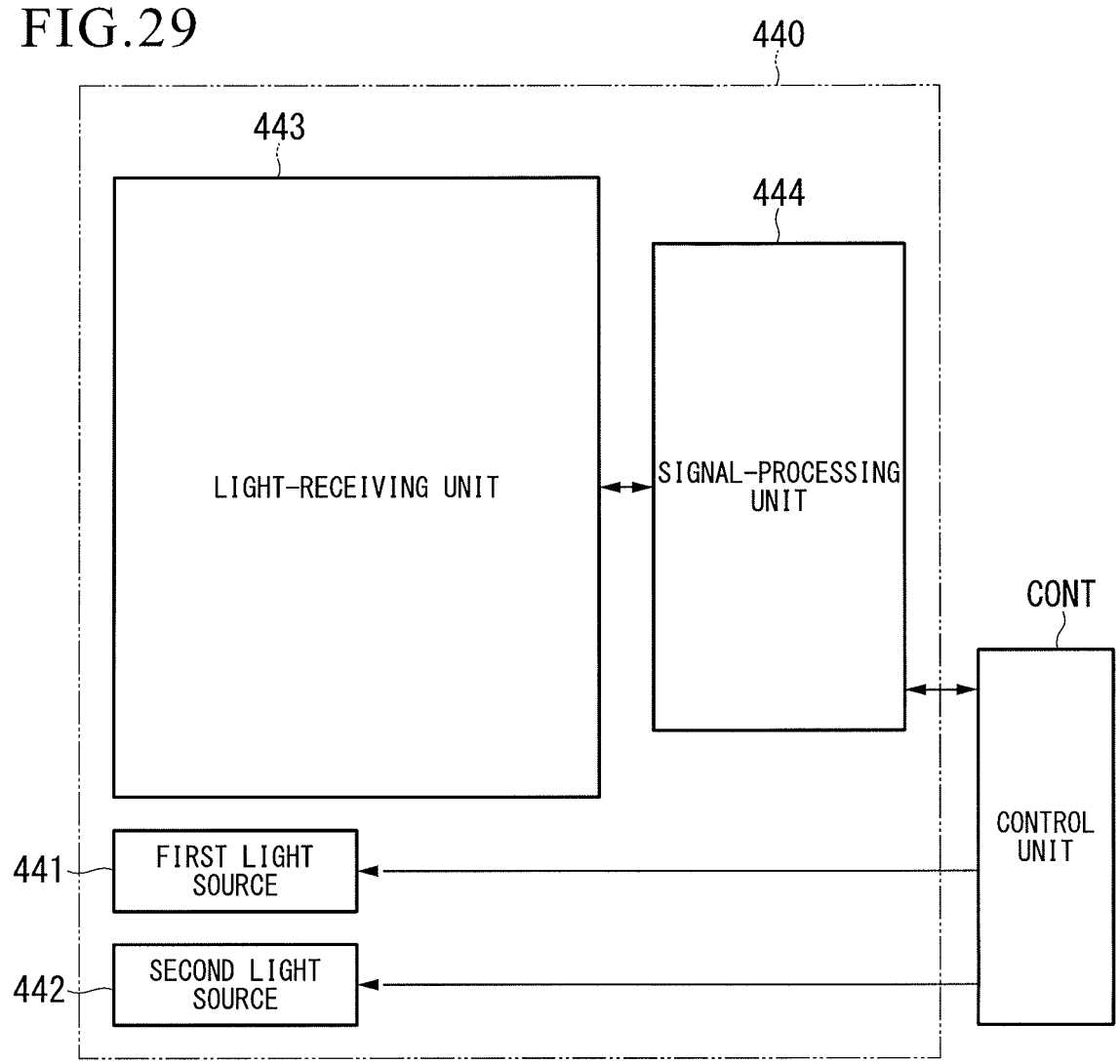
FIG. 29 is a block diagram illustrating the configuration of a detection unit according to this embodiment.

FIG. 29 is a block diagram illustrating the configuration of the detection unit 440. As illustrated in FIG. 27, the detection unit 440 includes a first light source (first light source) 441 configured by a LED or the like provided at a position opposing the first index portion 420 (for example, a position separated by 1 to 3 mm), a second light source (second light source) 442 configured by a LED or the like provided at a position opposing the second index portion 430, a light-receiving unit 443 that selectively receives reflected light (hereinafter, referred to as first light) L1 of the first light source 441 via the first index portion 420 and reflected light (hereinafter, referred to as second light) L2 of the second light source 442 via the second index portion 430, and a signal-processing unit (processing unit) 444. In addition, as illustrated in FIG. 29, the first light source 441 and the second light source 442 are electrically connected to the control unit CONT that controls the driving of each member of the driving device ACT such that the timings of tuning on and off thereof are controlled.

Here, for example, the detection unit 440 separates the first light L1 and the second light L2 in a temporal manner so that the same light-receiving unit 443 is able to selectively receive the beams of the light L1 and L2. Here, in order to separate the first light L1 and the second light L2 in a temporal manner, the irradiation timings of the first light source 441 and the second light source 442 may be set to be relatively different from each other. Accordingly, the light-receiving unit 443 is irradiated with the first light L1 and the second light L2 at different timings.

Therefore, as the detection unit 440 separates the two beams of light in a temporal manner, the single light-receiving unit 443, that is, the same light-receiving region can receive the beams of the light. In this embodiment, the first light source 441 and the second light source 442 are turned on at different timings. That is, the second light source 442 is turned off during turning on of the first light source 441, and the first light source 441 is turned off during turning on of the second light source 442.

The light-receiving unit 443 is configured as a light-receiving element such as a photodiode array and outputs light-receiving signals to the signal-processing unit 444. The signal-processing unit 444 is configured by a semiconductor device such as an ASIC (Application Specific Integrated Circuit) including a binarization unit, a filter, an A/D (analog-digital) conversion unit, an operation-processing unit, and the like, performs a first process (a process of calculating the position information on the motor shaft 2) based on the light-receiving result of the first light L1 by the light-receiving unit 443, and performs a second process (a process of calculating the position information on the output shaft 4) based on the light-receiving result of the second light L2 by the light-receiving unit 443.

The signal-processing unit 444 performs predetermined signal processing on the light-receiving signals of the first light L1 and the second light L2, thereby detecting information regarding the rotation of each of the disks 412 and 413, that is, information on the rotation of the motor shaft 2 and the output shaft 4. The signal-processing unit 444 outputs the detected information regarding the rotation of the motor shaft 2 and the output shaft 4 to the control unit CONT. The control unit CONT controls the driving of the motor 1 according to the output information regarding each rotation.

However, as described above, since the pitches of the patterns 421, 422, 431, and 432 of the first index portion 420 and the second index portion 430 are the same, the number of pulses that divides 360 degrees (the number of pulses of the driving signal of the first light source 441) is greater in the first index portion 420 formed in the encoder disk 412 on the outer side.

As an example, in this embodiment, the control unit CONT reduces the number of pulses of the driving signal of the first light source 441. As a method of reducing the number of pulses, a method disclosed in Japanese Patent No. 3175054 can be employed. Accordingly, the signal-processing unit 444 (ASIC) can use the same polynomial that generates the patterns of the first index portion 420 and the second index portion 430. In addition, the same operation method can be used for the detection of the position information from the two encoder disks 412 and 413 without depending on the difference in the number of pulses.

Next, the operations of the encoder 410 will be described.

First, during a start-up at which the encoder 410 is powered on, for example, the first light source 441 is turned on and thus the first light L1 is received by the light-receiving unit 443. Subsequently, when the second light source 442 is turned on, the second light L2 is received by the light-receiving unit 443. Here, the light-receiving unit 443 outputs the light-receiving signals based on the received light to the signal-processing unit 444.

The signal-processing unit 444 performs amplification, binarization, noise removal, and the like on the light-receiving signal by the ABS pattern 422 in the first light L1 and obtains pattern information configured of logic signals. In addition, the signal-processing unit 444 obtains absolute position information P1 in one rotation of the encoder disk 412, that is, the motor shaft 2 corresponding to the pattern information. Similarly, the signal-processing unit 444 performs binarization, noise removal, and the like on the light-receiving signal by the ABS pattern 432 in the second light L2 and obtains pattern information configured of logic signals. In addition, the signal-processing unit 444 obtains absolute position information P2 in one rotation of the encoder disk 413, that is, the output shaft 4 corresponding to the pattern information.

Figure 30:
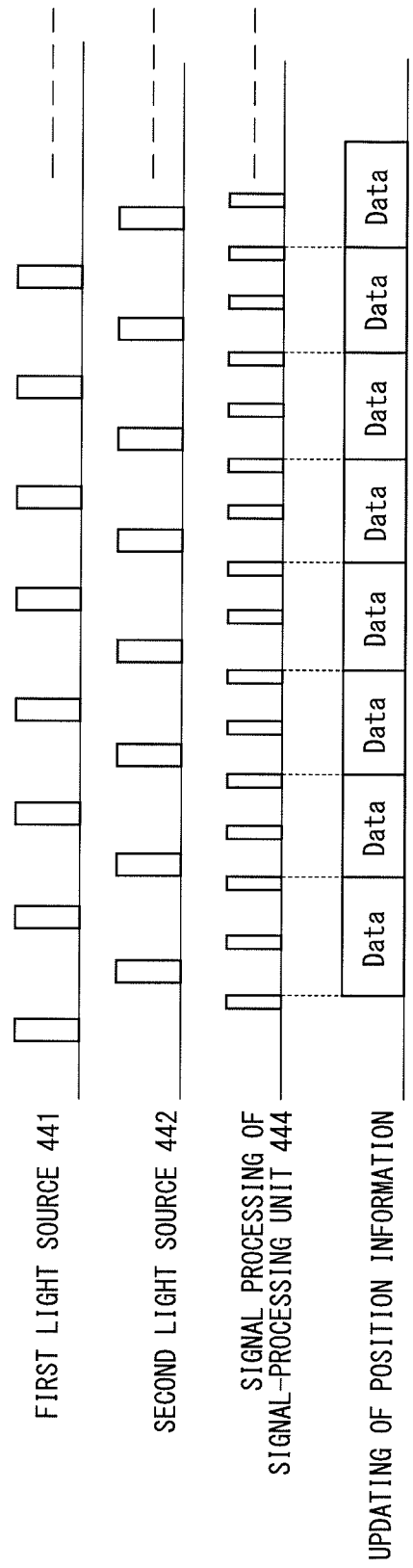
FIG. 30 is a diagram illustrating a timing chart according to this embodiment.

Next, the normal operation of the encoder 410 after obtaining the absolute position information P1 and P2 during the start-up will be described using FIGS. 29 and 30. FIG. 30 is a timing chart illustrating irradiation timings of the first light source 441 and the second light source 442, timings of the signal processing performed in the signal-processing unit 444, and timings of updating the position information. During the normal operation, the control unit CONT alternately turns on the first light source 441 and the second light source 442 by shifting the irradiation timings. For example, as illustrated in FIG. 30, first, when the first light source 441 is turned on, the light-receiving unit 443 receives the light via the INC pattern 421 and the ABS pattern 422 as the first light and outputs the light-receiving signal to the signal-processing unit 444. The signal-processing unit 444 performs amplification, binarization, noise removal, and the like on the output light-receiving signal to calculate high-resolution position information on the motor shaft 2, and stores the position information as data. The signal-processing unit 444 can detect the rotational direction of the motor shaft 2 on the basis of the absolute position information P1 during the start-up and the position information on the motor shaft 2. In addition, the signal-processing unit 444 can obtain a position in the rotational direction of the encoder disk 412, that is, the motor shaft 2 on the basis of the information. The signal-processing unit 444 stores position information in the rotational direction of the motor shaft 2.

Subsequently, when the second light source 441 is turned on, the light-receiving unit 443 receives the light via the INC pattern 431 and the ABS pattern 432 as the second light L2 and outputs the light-receiving signal to the signal-processing unit 444. The signal-processing unit 444 performs amplification, binarization, noise removal, and the like on the output light-receiving signal to calculate high-resolution position information on the output shaft 4, and stores the position information as data. The signal-processing unit 444 can detect the rotational direction of the output shaft 4 on the basis of the absolute position information P2 during the start-up and the position information on the output shaft 4. In addition, the signal-processing unit 444 can obtain a position in the rotational direction of the encoder disk 413, that is, the output shaft 4 on the basis of the information. The signal-processing unit 444 stores position information in the rotational direction of the output shaft 4.

As such, in this embodiment, the position information in the rotational directions of the motor shaft 2 and the output shaft 4 calculated by alternately turning on the first light source 441 and the second light source 442 is stored in the signal-processing unit 444. In addition, the control unit CONT may cause the signal-processing unit 444 to, at a timing at which one of the light sources 441 and 442 is turned on, perform signal processing on the reflected light of the other of the light sources 441 and 442. Accordingly, a signal processing time taken for the signal-processing unit 444 to calculate the position information in the rotational directions of the motor shaft 2 and the output shaft 4 can be reduced. In addition, in this embodiment, since the signal-processing unit 444 (ASIC) uses the same polynomial that generates the patterns of the first index portion 420 and the second index portion 430, an operation speed at which the position information on the motor shaft 2 and the output shaft 4 is calculated can be increased.

As described above, the control unit CONT alternately turns on the first light source 441 and the second light source 442 by shifting the timings thereof. When the first light source 441 is turned on, the light-receiving unit 443 receives again the first light L1 via the INC pattern 421 and the ABS pattern 422 and outputs the light-receiving signal to the signal-processing unit 444, and the signal-processing unit 444 calculates the position in the rotational direction of the motor shaft 2. Similarly, when the second light source 442 is turned on, the light-receiving unit 443 receives again the second light L2 via the INC pattern 431 and the ABS pattern 432 and outputs the light-receiving signal to the signal-processing unit 444, and the signal-processing unit 444 calculates the position in the rotational direction of the output shaft 44.

Here, for example, as illustrated in FIG. 30, the signal-processing unit 444 collectively and sequentially updates the position information in the rotational directions of the motor shaft 2 and the output shaft 4 newly calculated by turning on each of the first light source 441 and the second light source 442. Accordingly, the latest position information is stored in the signal-processing unit 444.

In addition, a configuration in which the position information is updated at a timing at which each of the first light source 441 and the second light source 442 is turned on may be employed. That is, only the position information in the rotational direction of the motor shaft 2 in the signal-processing unit 444 may be updated at the timing at which the first light source 441 is turned on, and only the position information in the rotational direction of the output shaft 4 in the signal-processing unit 444 may be updated at the timing at which the second light source 442 is turned on. In this configuration, the control unit CONT can control the driving of the driving device ACT or the motor 1 on the basis of the position information in the rotational directions of the motor shaft 2 and the output shaft 4 sequentially updated in the signal-processing unit 444.

As such, the encoder 410 in this embodiment enables the same light-receiving region (the light-receiving unit 443) of the detection unit 440 to selectively receive the reflected light (first light) from the first index portion 420 and the reflected light (second light) from the second index portion 430, and thus the reductions in the size and cost of the device can be realized compared to the case where the motor shaft 2 and the output shaft 4 are respectively provided with detection units. Therefore, even in the driving device ACT including the encoder 410 of this embodiment, the reductions in the size and cost of the device can be realized.

Modified Example

In addition, in this embodiment, the example in which the detection unit 440 separates the first light and the second light in a temporal manner so as to cause the single light-receiving unit 443 to selectively receive the beams of the light is described. However, for example, a configuration in which the detection unit 440 optically separates the first light and the second light so as to cause the same light-receiving unit 443 to selectively receive the beams of the light may be employed. Here, in order to optically separate the first light and the second light, the wavelengths of the beams of the light irradiated by the first light source 441 and the second light source 442 may be set to be different, and accordingly, the light-receiving unit 443 is irradiated with the first light and the second light having different wavelengths.

As an example, irradiation of red light of 630 nm as the first light source 441 is used, and irradiation of green light of 530 nm as the second light source 442 is used.

Figure 31A:
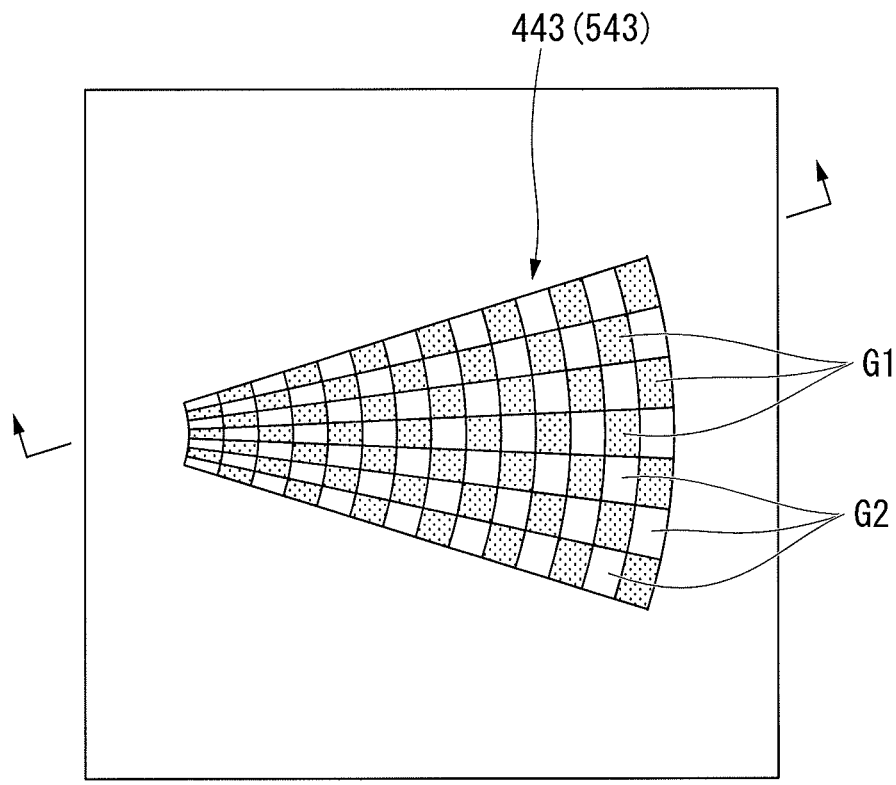
FIG. 31A is a diagram illustrating the configuration of a light-receiving unit according to a modified example.
Figure 31B:
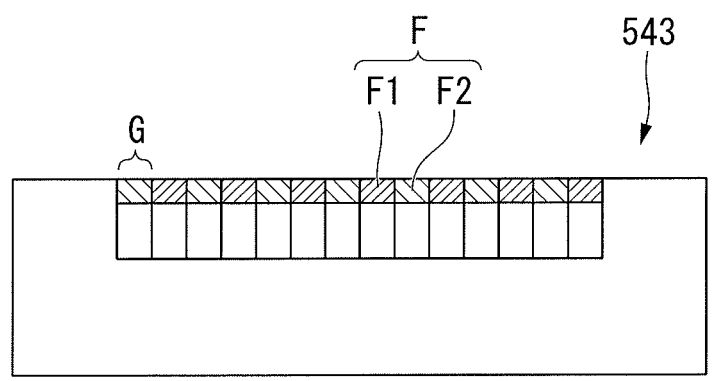
FIG. 31B is a diagram illustrating the configuration of the light-receiving unit according to the modified example.

FIGS. 31A and 31B are diagrams illustrating the configuration of the light-receiving unit 443 that receives the light separated by wavelengths. FIG. 31A illustrates a planar configuration, and FIG. 31B illustrates a cross-sectional configuration. In this configuration, as illustrated in FIGS. 31A and 31B, an imaging element 543 including a CCD having a plurality of pixels G is used as the light-receiving unit 443. In addition, the size of each pixel G is set to be sufficiently smaller than the first index portion 420 (the INC pattern 421 and the ABS pattern 431) and the second index portion 430 (the INC pattern 422 and the ABS pattern 432).

Each pixel G of the imaging element 543 is provided with a wavelength selective filter F which selectively receives the reflected light (the first light L1) from the first index portion 420 by the first light source 441 and the reflected light (the second light L2) from the second index portion 430 by the second light source 442. As illustrated in FIG. 31B, the wavelength selective filter F has first filter units F1 that transmit only the first light and reflect the second light and second filter units F2 that transmit only the second light and reflect the first light.

The first filter units F1 and the second filter units F2 are arranged in a zigzag form for the pixels G as illustrated in FIG. 31A. Accordingly, the first light and the second light are substantially uniformly irradiated over the entirety of the imaging surface of the imaging element 543. Therefore, the plurality of pixels G are constituted by a first pixel group (first light-receiving element group) G1 that is provided with the first filter units F1 so as to receive only the first light and a second pixel group (second light-receiving element group) G2 that is provided with the second filter units F2 so as to receive only the second light.

On the basis of such a configuration, the light-receiving unit 443 (imaging element 543) selectively receives the first light and the second light having different wavelengths by the first pixel group G1 and the second pixel group G2 and outputs the light-receiving signal to the signal-processing unit 444.

Next, the operations of the encoder 410 according to this modified example will be described.

First, during the start-up at which the encoder 410 is powered on, the first light source 441 and the second light source 442 are turned on at the same time. Here, the first light L1 is transmitted through the first filter unit F1 of the wavelength selective filter F and is received by the first pixel group G1 of the imaging element 543, and the second light L2 is transmitted through the second filter unit F2 of the wavelength selective filter F and is received by the second pixel group G2 of the imaging element 543. Here, the light-receiving unit 443 outputs a light-receiving signal based on the received light to the signal-processing unit 444.

The signal-processing unit 444 performs amplification, binarization, noise removal, and the like on the light-receiving signal by the ABS pattern 422 in the first light L1, obtains pattern information configured of logic signals, and obtains absolute position information P1 in one rotation of the encoder disk 412, that is, the motor shaft 2 corresponding to the pattern information. Similarly, the signal-processing unit 444 performs binarization, noise removal, and the like on the light-receiving signal by the ABS pattern 432 in the second light L2, obtains pattern information configured of logic signals, and obtains absolute position information P2 in one rotation of the encoder disk 413, that is, the output shaft 4 corresponding to the pattern information.

Next, the normal operation of the encoder 410 after obtaining the absolute position information P1 and P2 during the start-up will be described. During the normal operation, the control unit CONT turns on the first light source 441 and the second light source 442 at the same time. For example, the first light source 441 and the second light source 442 are in a state of being always turned on during the rotation of the motor shaft 2.

In this embodiment, each of the first light source 441 and the second light source 442 is turned on and the light-receiving element 543 of the light-receiving unit 443 is irradiated with the first light L1 and the second light L2 at the same time. The light-receiving element 543 can cause the first pixel group G1 and the second pixel group G2 to receive the first light L1 and the second light L2 in a state of being separated from each other and output the light-receiving signal based on the received light to the signal-processing unit 444.

The signal-processing unit 444 performs amplification, binarization, noise removal, and the like on the output light-receiving signal to calculate high-resolution position information on the motor shaft 2 and the output shaft 4. The signal-processing unit 444 can detect the rotational directions of the motor shaft 2 and the output shaft 4 on the basis of the absolute position information P1 and P2 during the start-up and the position information on the motor shaft 2 and the output shaft 4. The signal-processing unit 444 stores position information in the rotational directions of the motor shaft 2 and the output shaft 4. In addition, in the above description, the case where the position information on the motor shaft 2 and the output shaft 4 is calculated at the same time is described, and the information may also be calculated by being temporally shifted. In this case, the configuration of a circuit unit that performs an operation process can be simplified.

Hereinafter, similarly, the control unit CONT outputs the light-receiving signal received by the light-receiving unit 443 on the basis of the first light L1 and the second light L2 from the first light source 441 and the second light source 442 that are always turned on, to the signal-processing unit 444. The signal-processing unit 444 sequentially updates the position information in the rotational directions of the motor shaft 2 and the output shaft 4 that is newly calculated. The control unit CONT can control the driving of the driving device ACT or the motor 1 on the basis of the position information in the rotational directions of the motor shaft 2 and the output shaft 4 that is sequentially updated in the signal-processing unit 444.

As such, according to this modified example, the same light-receiving region (the light-receiving unit 543) of the detection unit 440 is able to selectively receive the light by optically separating the reflected light (the first light L1) from the first index portion 420 and the reflected light (the second light L2) from the second index portion 430 using the wavelength selective filter F. Therefore, compared to the case where the motor shaft 2 and the output shaft 4 are provided with respective detection units, the reductions in the size and cost of the device can be realized. Consequently, even in the driving device ACT including the encoder 410 of this embodiment, the reductions in the size and cost of the device can be realized.

In addition, in the first embodiment, it is described on the premise that there is no difference between the heights of the encoder disks 412 and 413 (a gap in the axial direction of the rotation axis line C), but it is difficult to dispose the encoder disks 412 and 413 on completely the same plane. In addition, as described above, when the pitches of the patterns 421, 422, 431, and 432 of the first index portion 420 and the second index portion 430 are the same, the first index portion 420 disposed on the outer side has a greater number of pulses when the patterns 421 and 422 of the encoder disk 412 is divided by 360 degrees. That is, the driving pulse for causing the first light source 441 to emit light needs a greater number of pulses than that of the driving pulse for causing the second light source 442 to emit light.

Figure 32:
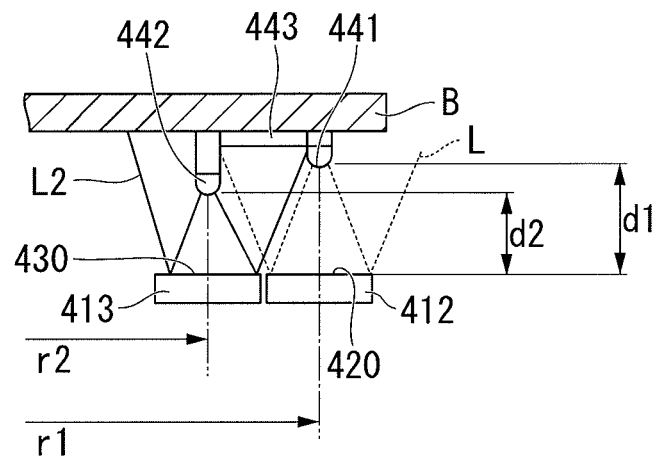
FIG. 32 is an explanatory view of distance adjustment of a first light source and a second light source according to this embodiment.

Here, it is preferable that the pitches of the patterns 421 and 422 of the first index portion 420 be greater than the pitches of the patterns 431 and 432 of the second index portion 430. In order for the same light-receiving unit 443 to image the first index portion 420 and the second index portion 430 having such patterns, the pitches of the images by the first light and the second light projected onto the light-receiving unit 443 need to be substantially the same. In this case, as illustrated in FIG. 32, by adjusting the distances from the first and second index portions 420 and 430 to the first light source 441 and the second light source 442, the magnifications of the reflected images by the first light L1 and the second light L2 imaged by the light-receiving unit 443 can be caused to be the same.

In addition, the reflective encoder 410 in this embodiment has an advantage that by causing the distance between the light source and the disk and the distance between the light-receiving unit and the disk to be the same, the size of the reflected image on the light-receiving unit can be maintained constant even in a case where the gap in the axial direction of the rotation axis line C varies. For this, the encoder disk 413 in the encoder 410 of this embodiment as in FIG. 32 is directly connected to the reducer 3 and thus has smaller variations in the gap (thrust variations) than those of the encoder disk 412. Therefore, changes in the size of the reflected image on the light-receiving unit in the encoder 410 in this embodiment are small.

Here, an example of the case of setting the distances from the first and second index portions 420 and 430 to the first light source 441 and the second light source 442 will be described. In this description, it is assumed that the radius of the encoder disk 412 is 18 mm and the radius of the encoder disk 413 is 15 mm. Here, the pitch of the encoder disk 412 is $2 \times 18 \times \pi/29 = 0.221$ mm on the disk and the pitch of the encoder disk 413 is $2 \times 15 \times \pi/29 = 0.184$ mm. The pitch on the light-receiving unit 443 of the encoder disk 412 is $0.221 \times 2 = 0.442$ mm. On the other hand, when the pitch on the light-receiving unit 443 of the encoder disk 413 is the same as that of the encoder disk 412, the pitch is 0.368 mm and is different from 0.442 mm of the encoder disk 412. Here, the gap between the encoder disk 413 and the second light source 442 is reduced to a value obtained by multiplying the percentage obtained by the following expression by the gap of the encoder disk 412.

In a case where the radius of the encoder disk 412 is $r_1$ and the radius of the encoder disk 413 is $r_2$, $r_2/(2 r_1 - r_2) \times 100\% = 76\%$ is satisfied. In a case where the distance (gap d1) between the first light source 441 and the first index portion 420 is 3 mm, when the distance (gap d2) between the second light source 442 and the second index portion 430 is set to $3 \times 0.76 = 2.3$, the pattern pitches on the detection unit 440 (pitches of images) are the same.

Accordingly, even in the state where there is a difference between the heights of the encoder disks 412 and 413, the pattern pitches of the reflected light by the first light and the second light on the detection unit 440 can be caused to be the same. Therefore, the positions in the rotational directions of the motor shaft 2 and the output shaft 4 can be detected with good accuracy, and thus the driving of the driving device ACT or the motor 1 can be appropriately controlled.

Thirteenth Embodiment

Next, a thirteenth embodiment will be described.

In the following description, like elements that are the same as or equivalent to the elements of the above embodiments are denoted by like reference numerals, and descriptions thereof will be omitted or simplified.

Figure 33:
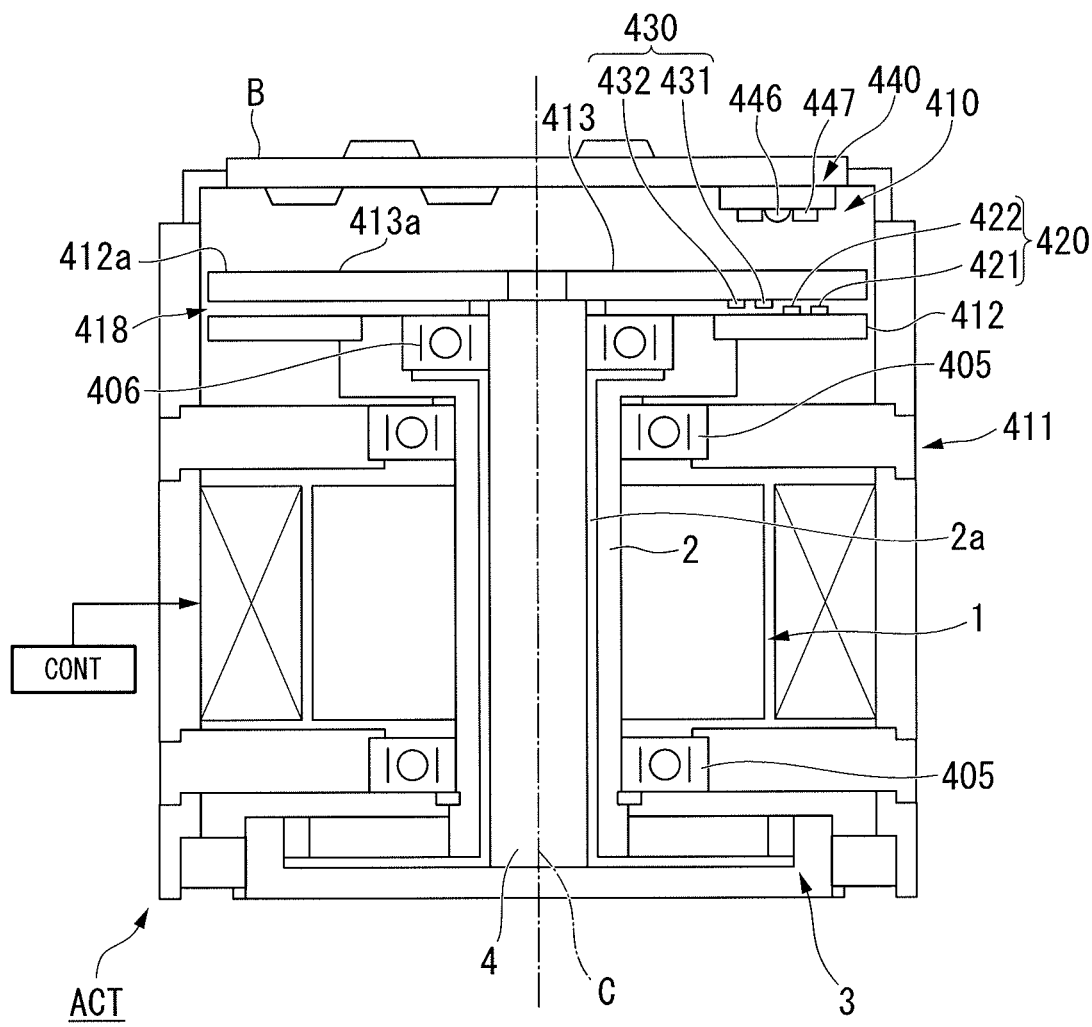
FIG. 33 is a cross-sectional view illustrating the schematic configuration of a driving device according to a thirteenth embodiment.

FIG. 33 is a cross-sectional view illustrating the schematic configuration of a driving device according to the thirteenth embodiment.

In this embodiment, as illustrated in FIG. 33, an encoder 410 includes a single light source 446 that illuminates both the first and second indexes 420 and 430 and a light-receiving unit (sensor) 447. In addition, in this embodiment, a first encoder disk (first scale, first rotating member) 412 and a second encoder disk (second scale, second rotating member) 413 are disposed to overlap each other along the axial direction via a gap 418.

In this embodiment, the index portion 420 is provided on the surface in the encoder disk 412 close to the gap 418, and the index portion 430 is provided on the surface in the encoder disk 13 close to the gap 418. As a result, the patterns 421 and 422 of the index portion 420 on the encoder disk 412 are covered with the encoder disk 413. In addition, the patterns 431 and 432 of the index portion 430 on the encoder disk 413 are covered with the encoder disk 412. In the embodiment, the size of the gap 418 can be smaller than the thickness of the encoder disk 413 or the encoder disk 412. For example, the size of the gap 418 can be 10, 9, 8, 7, 6, 5, 4, 3, 2, 1, 0.9, 0.8, 0.7, 0.6, 0.5, 0.4, 0.3, 0.2, or 0.1 or equal to or smaller than 0.05 mm. As the index portions 420 and 430 are disposed inside the gap 418, adhesion of impurities to the patterns 421, 422, 431, and 432 of the index portions 420 and 430 is prevented.

In this embodiment, at least a part of the encoder disk 412 and the encoder disk 413 is made of a transmissive member. As the transmissive member, various well-known materials as well as glass can be used. In another embodiment, at least a part of the encoder disk 413 that is relatively close to the light source 446 may be made of a transmissive member and the encoder disk 412 may be made of a non-transmissive member.

Figure 34:
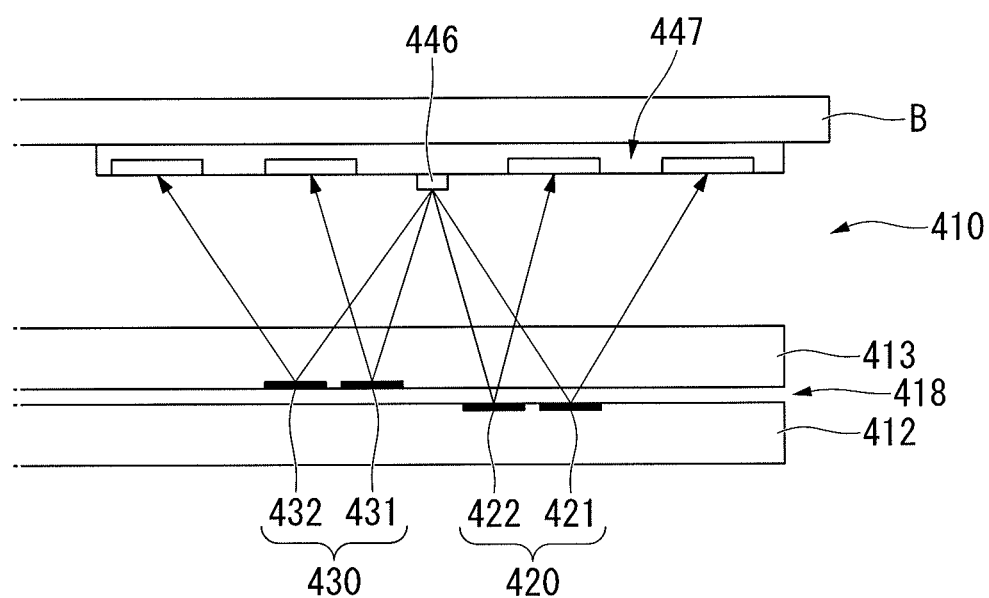
FIG. 34 is an enlarged schematic diagram for explaining an example of light propagation according to this embodiment.

FIG. 34 is an enlarged schematic diagram for explaining an example of light propagation.

As illustrated in FIG. 34, in this embodiment, a part of light from the light source 446 is transmitted through the encoder disk 413 and is reflected from the patterns 431 and 432 of the index portion 430. The light reflected from the index portion 430 is transmitted through the encoder disk 413 again and is incident onto the light-receiving unit 447. In addition, another part of the light from the light source 446 is transmitted through the encoder disk 413 and is reflected from the patterns 421 and 422 of the index portion 420 via the gap 418. The light reflected from the index portion 420 is incident onto the light-receiving unit 447 via the gap 418 and the encoder disk 413.

In this embodiment, both the light incident onto the index portion 430 and the light incident onto the index portion 420 are transmitted through the encoder disk 413. Equalization of optical distances for detection is advantageous in simplifying pattern design.

Alternatively and/or additionally, at least a part of the surface of the encoder disk 412 and/or the encoder disk 413 can be provided with an optical functional film. In the embodiment, an anti-reflection film can be used as the optical functional film. Appropriately controlling optical characteristics such as reflection characteristics of the surfaces of the encoder disks 412 and 413 is advantageous in enhancing detection accuracy.

Figure 35:
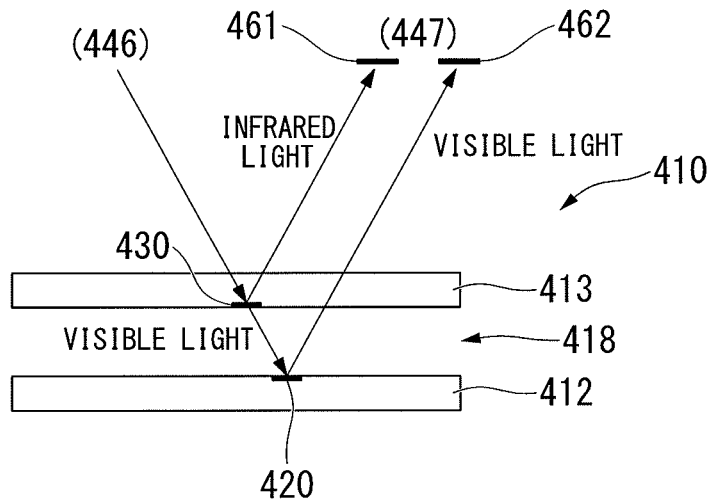
FIG. 35 is a schematic diagram illustrating an example in which a wavelength filter is disposed according to this embodiment.
Figure 36:
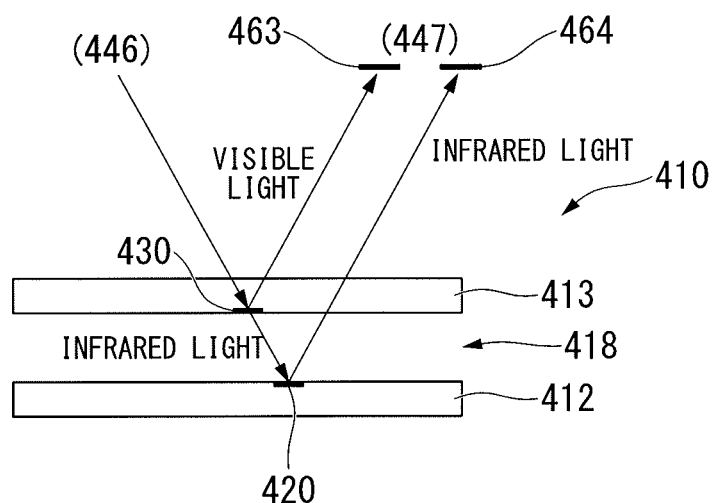
FIG. 36 is a schematic diagram illustrating another example in which a wavelength filter is disposed according to this embodiment.

In another embodiment, as illustrated in FIGS. 35 and 36, at least a part of the surface of the encoder disk 412 and/or the encoder disk 413 can be provided with a wavelength filter. By appropriately selecting and controlling light wavelengths, it is possible to dispose the two index portions 420 and 430 to overlap each other on a single optical axis. This is advantageous in simplifying in design and reducing size.

In an example illustrated in FIG. 35, the index portion 430 and the index portion 420 are disposed on the same light path. In the embodiment, the pattern of the index portion 430 relatively close to the light source 446 has a selection function for infrared light, and the pattern of the index portion 420 has a selection function for visible light. That is, the pattern of the index portion 430 has a reflection portion that reflects infrared light and transmits visible light, and an absorption portion that absorbs infrared light and transmits visible light. The pattern of the index portion 420 has a reflection portion that reflects visible light and an absorption portion that absorbs visible light. The infrared light reflected from the pattern of the index portion 430 is incident onto a predetermined region of the light-receiving unit 447. In a light-receiving region for detecting infrared light, an infrared transmitting filter 461 can be disposed as necessary. On the other hand, the visible light reflected from the pattern of the index portion 420 is incident onto a predetermined region of the light-receiving unit 447. In a light-receiving region for detecting visible light, an infrared cutoff filter 432 can be disposed as necessary.

In another example illustrated in FIG. 36, the index portion 430 and the index portion 420 are disposed on the same light path. The pattern of the index portion 430 relatively close to the light source 446 has a selection function for visible light, and the pattern of the index portion 420 has a selection function for infrared light. That is, the pattern of the index portion 430 has a reflection portion that reflects visible light and transmits infrared light, and an absorption portion that absorbs visible light and transmits infrared light. The pattern of the index portion 420 has a reflection portion that reflects infrared light and an absorption portion that absorbs infrared light. The visible light reflected from the pattern of the index portion 430 is incident onto a predetermined region of the light-receiving unit 447. In a light-receiving region for detecting visible light, an infrared cutoff filter 463 can be disposed as necessary. On the other hand, the infrared light reflected from the pattern of the index portion 420 is incident onto a predetermined region of the light-receiving unit 447. In a light-receiving region for detecting infrared light, an infrared transmitting filter 464 can be disposed as necessary.

In the above configuration in which a plurality of the index portions 420 and 430 are disposed on the same light path using a wavelength selective filter, a single or a plurality of light sources can be used. For example, the encoder 410 can have a single or a plurality of light sources that are able to emit light having broad wavelengths. In addition, a single or a plurality of the light-receiving unit (sensor) 447 can be provided. For example, the light-receiving unit 447 can have a plurality of light-receiving regions that are substantially partitioned. Otherwise, the light-receiving unit 447 can have a color image sensor such as a CCD.

Returning to FIG. 34, alternatively and/or additionally, the encoder disk 412 and/or the encoder disk 413 can be provided with an additional optical function. In this embodiment, at least a part of the encoder disk 413 can have a shape having a curvature. For example, at least a part of the light from the light source 446 is collected by the pattern through the encoder disk 413. Appropriately controlling transmission characteristics of the encoder disks 412 and 413 is advantageous in enhancing detection accuracy and increasing the accuracy of the pattern.

Figure 37:
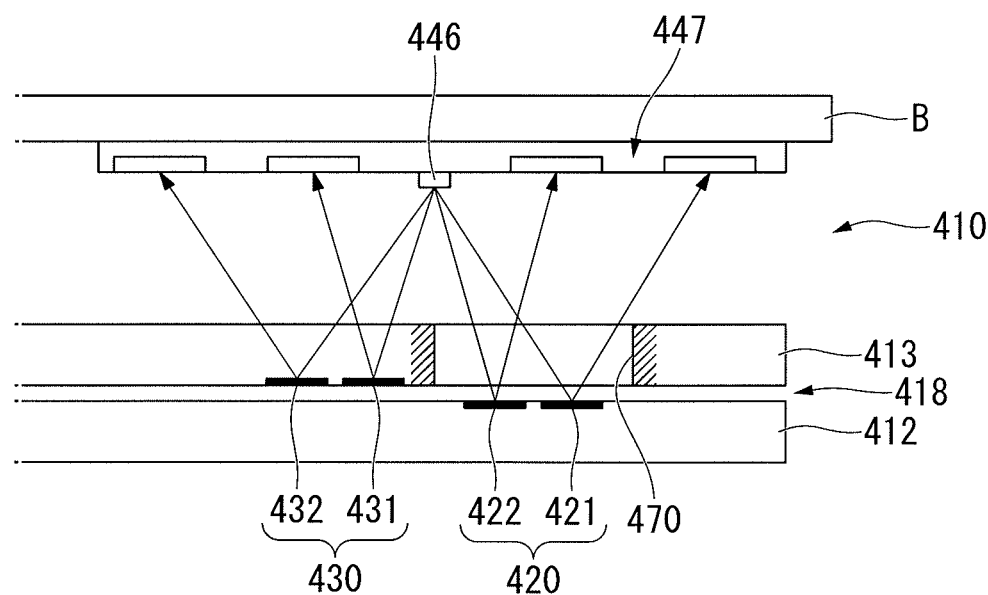
FIG. 37 is a schematic diagram illustrating a modified example of the embodiment illustrated in FIG. 34.

In another embodiment, as illustrated in FIG. 37, a configuration in which a part of light for detection is not substantially transmitted through the encoder disk 413 can be employed. In FIG. 37, the encoder disk 413 has an opening (through-hole) 470 provided at a position corresponding to the index portion 420. In FIG. 37, a part of light from the light source 446 is reflected from the pattern of the index portion 420 through the opening 470 of the encoder disk 413. The light reflected from the index portion 420 is incident onto the light-receiving unit 447 through the opening 470 again.

Fourteenth Embodiment

Next, a fourteenth embodiment will be described.

In the following description, like elements that are the same as or equivalent to the elements of the above embodiments are denoted by like reference numerals, and descriptions thereof will be omitted or simplified.

Figure 38:
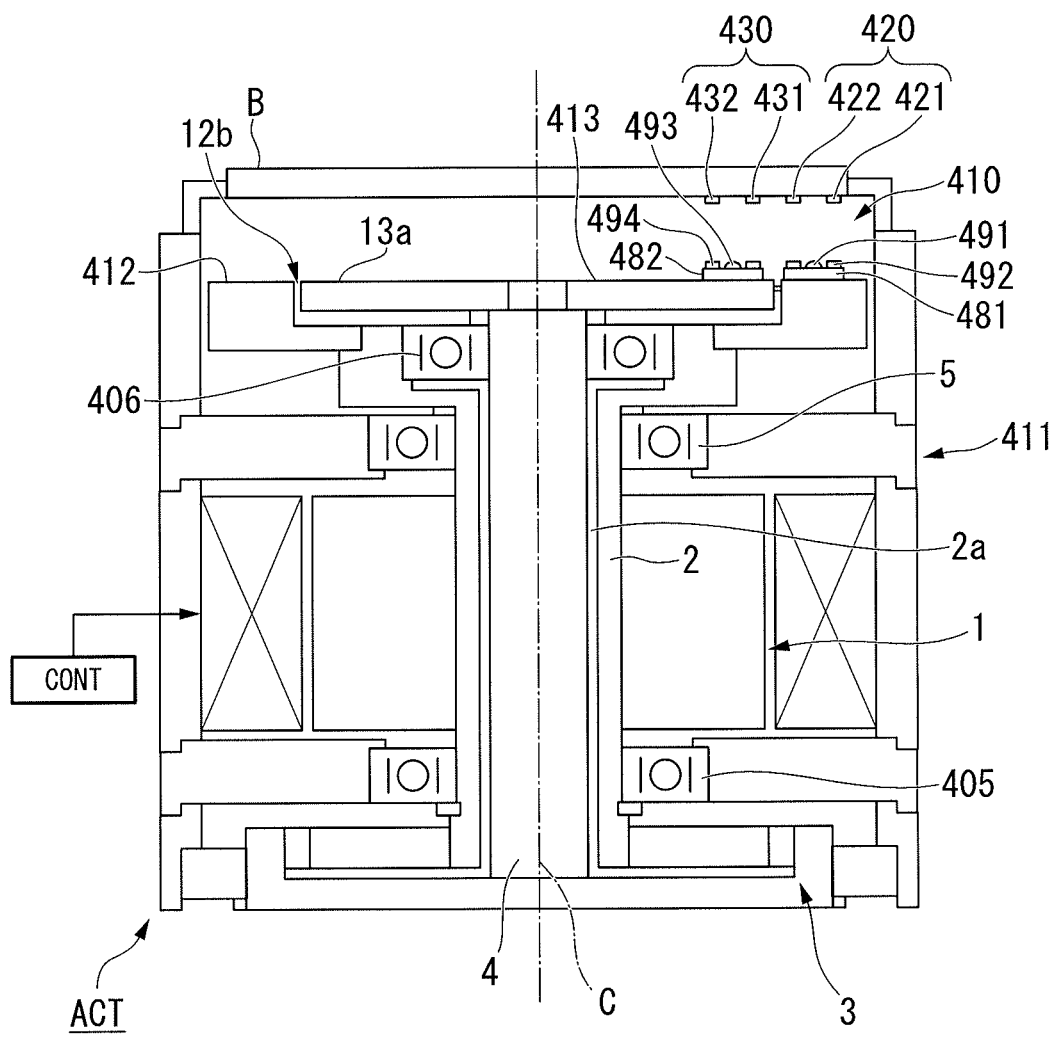
FIG. 38 is a cross-sectional view illustrating the schematic configuration of a driving device according to a fourteenth embodiment.

FIG. 38 is a cross-sectional view illustrating the schematic configuration of a driving device according to the fourteenth embodiment.

In this embodiment, as illustrated in FIG. 38, a first index portion (first scale) 420 and a second index portion (second scale) 430 are provided in a member (board B) on the fixing side, and a detection unit 440 (a light-receiving unit 492, a light-receiving unit 494) is provided in members (the first encoder disk 412, the second encoder disk 413) on the rotation side. In addition, as in the above embodiments, the motor shaft 2 may have a configuration including the hollow portion 2*a*, and the output shaft 4 may have a configuration including a hollow portion.

Figure 39:
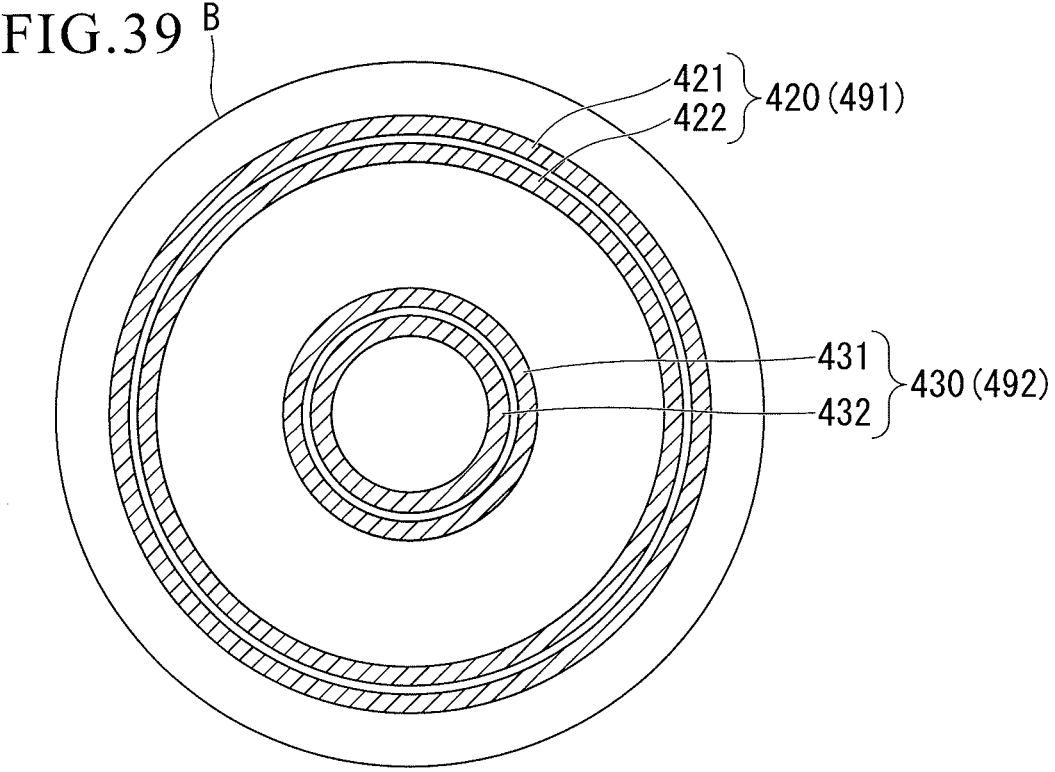
FIG. 39 is a schematic plan view illustrating index portions provided on a board on a fixing side according to this embodiment.

FIG. 39 is a schematic plan view illustrating the index portions 420 and 430 provided in the board B on the fixing side.

As illustrated in FIG. 39, on the same member, a first scale 491 having the first index portion 420 (INC pattern 421, ABS pattern 422) and a second scale 492 having the second index portion 430 (INC pattern 431, ABS pattern 432) are provided. In the embodiment, the patterns of the index portions 420 and 430 are disposed in a plurality of annular regions that are arranged concentrically with each other.

Returning to FIG. 38, in the embodiment, a first control board 481 is mounted on the first encoder disk 412, and a second control board 482 is mounted on the second encoder disk 413. The control board 481 has a light source 491 and a light-receiving unit 492. A part of light from the light source 491 is reflected from the first index portion 420. The reflected light from the first index portion 420 is incident onto the light-receiving unit 492. Similarly, the control board 482 has a light source 493 and a light-receiving unit 494. A part of light from the light source 493 is reflected from the second index portion 430. The reflected light from the second index portion 430 is incident onto the light-receiving unit 494. A first signal from the light-receiving unit 492 and a second signal from the light-receiving unit 494 are sent to a signal-processing unit (not shown). Even in this embodiment, the signal-processing unit can include common units that are used in common for processing regarding the first signal and processing regarding the second signal, for example, as in the detection units 42 and 52 illustrated in FIG. 9 and the signal-processing unit 344. For example, the common units in the signal-processing unit are mounted in one of the first control board 481 and the second control board 482. By providing the common units, the reductions in the size and cost of the device are achieved.

In addition, in the embodiment and the modified example, the case where the detection unit 440 detects each of the beams of the reflected light of the first light source 441 and the second light source 442 from the first index portion 420 and the second index portion 430 is exemplified, but the present invention is not limited thereto. A transmissive encoder having a configuration in which beams of light that are transmitted through the first index portion 420 and the second index portion 430 are deflected so as to be incident onto the same detection unit 440 can also be applied. In addition, the encoder 410 in this embodiment may be configured so that a predetermined pattern (for example, patterns 421 and 422 and the like) is formed on a side surface of the encoder disk 412 other than the surface 412*a* and a predetermined pattern (for example, patterns 431 and 432 and the like) is formed on a side surface of the encoder disk 413 other than the surface 413*a*. In this case, the detection unit 440 of the encoder 410 in this embodiment may be configured to be disposed to oppose each of the side surfaces.

For example, in this embodiment, the configuration in which the signal-processing unit 444 performs signal processing on both the light-receiving signals by the first light and the second light is employed, but the embodiment is not limited thereto. A configuration in which signal-processing units are respectively provided for the first light and the second light to individually detect information regarding the rotations of the motor shaft 2 and the output shaft 4 may be employed. In this case, for example, a configuration in which absolute position information detected by the one signal-processing unit is output to the other signal-processing unit, and the other signal-processing unit obtains each of positions in the rotational directions of the motor shaft 2 and the output shaft 4 on the basis of both pieces of the absolute position information may be employed, or a configuration in which the absolute position information detected by each of the signal-processing units is output to the control unit CONT and the control unit CONT obtains each of the positions in the rotational directions of the motor shaft 2 and the output shaft 4 using such absolute position information may be employed.

In addition, for example, in the above embodiment, the control board B may be configured so that both a first detection unit and a second detection unit are mounted therein, or may be constituted by a first control board having the first detection unit mounted therein and a second control board having the second detection unit mounted therein and disposed in parallel to the first control board. In this case, the first control board and the second control board are disposed to be lined up at a predetermined interval in a predetermined direction (for example, the radial direction or the axial direction of a shaft member such as the motor shaft 2 or the output shaft 4) in a state of being electrically connected to each other. For example, the encoder in this embodiment described above includes a first scale that has a first index portion and is rotated integrally with a first rotating shaft member rotated about a predetermined axis line, a second scale that has a second index portion and is rotated integrally with a second rotating shaft member connected to the first rotating shaft member via a power transmission unit, a first control board having a first detection unit that outputs a first signal based on the first index portion, a second control board having a second detection unit that outputs a second signal based on the second index portion, and a signal-processing unit that is provided in one board of the first control board and the second control board and calculates information regarding the rotation of the first scale based on the first signal and calculates information regarding the rotation of the second scale based on the second signal, and the first control board and the second control board are disposed to be parallel to each other in a predetermined direction (for example, the radial direction or the axial direction of a shaft member such as the motor shaft 2 or the output shaft 4).

Next, a robot apparatus including the driving device ACT described in any of the above embodiments will be described.

Figure 40:
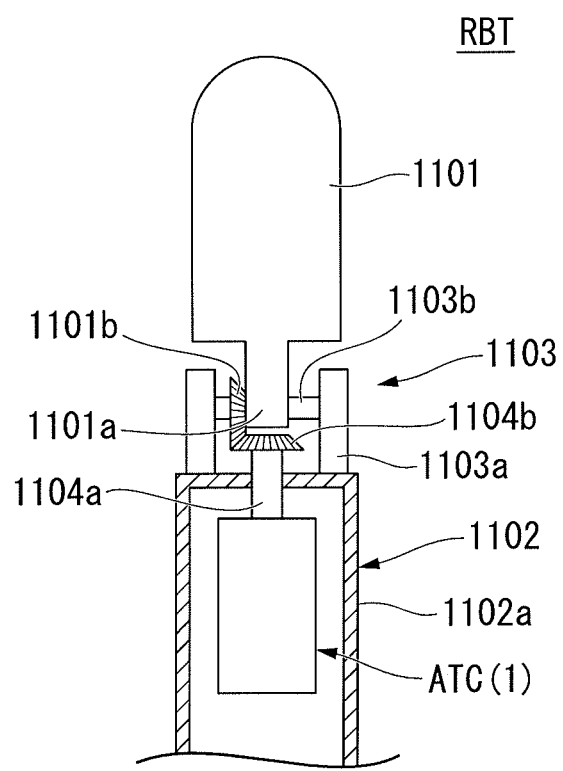
FIG. 40 is a schematic diagram illustrating the configuration of a robot hand according to this embodiment.

FIG. 40 is a diagram illustrating the configuration of a part of a robot apparatus RBT (the tip end of a finger part) including the driving device ACT described in any of the above embodiments. In addition, the driving device ACT described in the embodiments may be used as a driving unit that drives the arm portion of the robot apparatus RBT.

As illustrated in FIG. 40, the robot apparatus RBT has a distal phalanx portion 1101, a middle phalanx portion 1102, and a joint portion 1103, and the distal phalanx portion 1101 and the middle phalanx portion 1102 are configured to be connected via the joint portion 1103. The joint portion 1103 is provided with a shaft support portion 1103*a* and a shaft portion 1103*b*. The shaft support portion 1103*a* is fixed to the middle phalanx portion 1102. The shaft portion 1103b is supported in a state of being fixed to the shaft support portion 1103a.

The distal phalanx portion 1101 has a connection portion 1101a and a gear 1101b. The connection portion 1101a is in a state in which the shaft portion 1103b of the joint portion 1103 penetrates therethrough, and the distal phalanx portion 1101 is able to rotate about the shaft portion 1103b as the rotating shaft. The gear 1101b is a bevel gear fixed to the connection portion 1101a. The connection portion 1101a is rotated integrally with the gear 1101b.

The middle phalanx portion 1102 has a housing 1102a and a driving device ACT. The driving device ACT can use the driving devices ACT described in the above embodiments. The driving device ACT is provided inside the housing 1102a. A rotating shaft member 1104a is mounted to the driving device ACT. The tip end of the rotating shaft member 1104a is provided with a gear 1104b. The gear 1104b is a bevel gear fixed to the rotating shaft member 1104a. The gear 1104b is in a stage of being engaged with the gear 1101b.

In the robot apparatus RBT configured as described above, the rotating shaft member 1104a is rotated by the driving of the driving device ACT, and the gear 1104b is rotated integrally with the rotating shaft member 1104a. The rotation of the gear 1104b is transmitted to the gear 1101b engaged with the gear 1104b, and thus the gear 1101b is rotated. As the gear 1101b is rotated, the connection portion 1101a is also rotated. Accordingly, the distal phalanx portion 1101 is rotated about the shaft portion 1103b.

As such, according to this embodiment, by mounting the driving device ACT, for example, the distal phalanx portion 1101 can be rotated.

While the embodiments according to the present invention have been described above with reference to the accompanying drawings, it should be noted that the present invention is not limited to the associated examples. The shapes, combinations, and the like of the constituent members illustrated in the examples described above are only examples, and various modifications thereof can be made without departing from the gist of the present invention.

What is claimed is:

1. An encoder comprising:
a first sensor that receives a first light via a first index pattern provided in a first rotating member that rotates about an axis line;
a second sensor that receives a second light via a second index pattern provided in a second rotating member that is connected to the first rotating member via a reducer; and
a holding board which holds the first sensor and the second sensor, the holding board having a discontinuous portion that includes an opening or a recess, wherein
a position of the first rotating member in an axial direction of the axis line is different from a position of the second rotating member in the axial direction of the axis line,
one of the first sensor and the second sensor is located at the discontinuous portion and the other of the first sensor and the second sensor is located at a surface of the holding board,
a position of a light receiving part of the first sensor in the axial direction of the axis line is different from a position of a light receiving part of the second sensor in the axial direction of the axis line, and the light receiving part of the first sensor and the light receiving part of the second sensor oppose the first and the second index patterns.

2. The encoder according to claim 1,
wherein the first sensor and the second sensor are disposed in the holding board so that at least a part of the first sensor overlaps a part of the second sensor when viewed in the axial direction of the axis line.

3. The encoder according to claim 2, further comprising:
a fastener which is inserted through a through-hole formed in the holding board and that holds the first sensor and the second sensor to the holding board.

4. The encoder according to claim 1,
wherein the holding board has a first side and a second side that faces in an opposite direction of the first side, the first sensor is disposed on the first side of the holding board, and the second sensor is disposed on the second side of the holding board.

5. The encoder according to claim 1,
wherein the first sensor is shifted relative to the second sensor on the holding board in a rotational direction about the axis line when viewed in the axial direction of the axis line.

6. The encoder according to claim 1,
wherein at least a part of the first sensor overlaps a part of the second sensor in a circumferential direction relative to the axis line when viewed in the axial direction of the axis line.

7. The encoder according to claim 4, wherein
the discontinuous portion is the opening, and
a thickness of the holding board is set based on a position shift amount between the first index pattern and the second index pattern in the axial direction of the axis line.

8. The encoder according to claim 1,
wherein the discontinuous portion is the recess located at least on a side of the holding board onto which the first light and the second light is incident from the first and second index patterns.

9. A driving device comprising:
a motor which rotates a motor rotating shaft about an axis line;
a reducer which has a power rotating shaft and which is connected to a load side of the motor via the motor rotating shaft; and
the encoder of claim 1 which detects information regarding rotation of the motor and information regarding rotation of the reducer.

10. The driving device according to claim 9,
wherein the motor rotating shaft and the power rotating shaft are coaxial.

11. A robot apparatus comprising:
a shaft; and
the driving device of claim 9 which drives the shaft.

12. The encoder according to claim 1,
wherein the first sensor further includes a light emitting part and the second sensor further includes a light emitting part, and the light emitting part and the light receiving part of the one of the first sensor and the second sensor that is located at the discontinuous portion are arranged together at the discontinuous portion.

13. An encoder comprising:
a first rotating member that rotates about an axis line;
a second rotating member that rotates about the axis line and is connected to the first rotating member via a reducer;

a sensor which is fixed on a holding board that is connected to a housing of the encoder and which has (i) a first light-receiving region that receives light reflected at a first index pattern provided in the first rotating member, and (ii) a second light-receiving region that receives light reflected at a second index pattern provided in the second rotating member and which detects information regarding rotation of the first rotating member and information regarding rotation of the second rotating member, wherein the first rotating member has a hollow portion, and the first index pattern is provided in an inner peripheral surface of the hollow portion of the first rotating member, the second rotating member is inserted into the hollow portion of the first rotating member, and the second index pattern is provided in an outer peripheral surface of the second rotating member, and the sensor is disposed between the inner peripheral surface of the first rotating member and the outer peripheral surface of the second rotating member so that the first and second light-receiving regions oppose the first and second index patterns.

14. The encoder according to claim 13, wherein the sensor includes (a) a first signal-processor which performs signal processing based on a result of receiving light using the first light-receiving region and (b) a second signal-processor which performs signal processing based on a result of receiving light using the second light-receiving region.

15. The encoder according to claim 13, wherein the sensor includes a signal-processor which performs both signal processing based on a result of receiving light using the first light-receiving region and signal processing based on a result of receiving light using the second light-receiving region.

16. The encoder according to claim 13, wherein the first light-receiving region is provided on a surface opposing the first index pattern, and the second light-receiving region is provided on a surface opposing the second index pattern.

17. The encoder according to claim 13, further comprising:

a first light source which illuminates the first index pattern; and a second light source which illuminates the second index pattern.

18. A driving device comprising:

a motor which rotates a motor rotating shaft about an axis line;

a reducer which has a power rotating shaft and which is connected to a load side of the motor via the motor rotating shaft; and the encoder of claim 13 which detects information regarding rotation of the motor and information regarding rotation of the reducer.

19. The driving device according to claim 18, wherein the motor rotating shaft and the power rotating shaft are coaxial.

20. A robot apparatus comprising:

a shaft; and the driving device of claim 18.

21. An encoder comprising:

a first sensor having a first light receiving part that receives a first light via a first index pattern provided in a first rotating member that rotates about an axis line;

a second sensor having a second light receiving part that receives a second light via a second index pattern provided in a second rotating member that is connected to the first rotating member via a reducer; and a holding board which holds the first sensor and the second sensor, the holding board having a discontinuous portion that includes an opening or a recess, wherein a position of the first rotating member in an axial direction of the axis line is different from a position of the second rotating member in the axial direction of the axis line, one of the first light receiving part and the second light receiving part is located at the discontinuous portion and the other of the first light receiving part and the second light receiving part is located at a surface of the holding board, a position of the first light receiving part of the first sensor in the axial direction of the axis line is different from a position of the second light receiving part of the second sensor in the axial direction of the axis line, and the first and the second light receiving parts oppose the first and the second index patterns.

* * * * *